United States Patent
Akiyama et al.

(10) Patent No.: US 8,311,215 B2
(45) Date of Patent: Nov. 13, 2012

(54) ENCRYPTION APPARATUS, DECRYPTION APPARATUS, KEY GENERATION APPARATUS, AND STORAGE MEDIUM

(75) Inventors: Koichiro Akiyama, Tokyo (JP); Yasuhiro Goto, Hakodate (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 657 days.

(21) Appl. No.: 12/560,895

(22) Filed: Sep. 16, 2009

(65) Prior Publication Data

US 2010/0226496 A1     Sep. 9, 2010

(30) Foreign Application Priority Data

Mar. 4, 2009 (JP) ................................. 2009-050976

(51) Int. Cl.
*H04L 29/06* (2006.01)
(52) U.S. Cl. .......................................................... 380/30
(58) Field of Classification Search .................. None
See application file for complete search history.

(56) References Cited

U.S. PATENT DOCUMENTS

| | | |
|---|---|---|
| 2005/0271203 A1 | 12/2005 | Akiyama et al. |
| 2006/0251247 A1 | 11/2006 | Akiyama et al. |
| 2007/0110232 A1 | 5/2007 | Akiyama et al. |
| 2007/0230692 A1 | 10/2007 | Akiyama et al. |
| 2008/0019511 A1 | 1/2008 | Akiyama et al. |
| 2008/0037776 A1 | 2/2008 | Akiyama et al. |
| 2009/0185680 A1 | 7/2009 | Akiyama et al. |

OTHER PUBLICATIONS

U.S. Appl. No. 12/266,027, filed Nov. 6, 2008, Koichiro Akiyama et al.

Koichiro Akiyama et al., "An Algebraic Surface Public-Key Cryptosystem", IEICE Technical Report (ISEC2004-80), vol. 104, No. 421, pp. 13-20, Nov. 2004.

Koichiro Akiyama et al., "A Security Analysis for a Public-Key Cryptosystem using Algebraic Surfaces", Proceedings of the 2005 Symposium on Cryptography and Information Security 2A3-1, Jan. 17-20, 2006, 6 pages.

Koichiro Akiyama et al., "A Public-Key Cryptosystem using Algebraic Surfaces (Extended Abstract)", Proceedings of International Workshop on Post-Quantum Cryptography, 2006, pp. 119-138.

Koichiro Akiyama et al., "An Algebraic Surface Cryptosystem", Public Key Cryptography 2009—PKC2009, pp. 425-442.

Koichiro Akiyama, et al., "An Improvement of the Algebraic Surface Public-Key Cryptosystem", The 2008 Symposium on Cryptography and Information Security Miyazaki, Japan, The Institute of Electronics, Information and Communication Engineers, SCIS 2008, Jan. 22-25, 2008, pp. 1-6.

Koichiro Akiyama, et al., "A Construction of an Algebraic Surface Public-Key Cryptosystem", The 2005 Symposium on Cryptography and Information Security Maiko Kobe, Japan, The Institute of Electronics Information and Communication Engineers, SCIS 2005, Jan. 25-28, 2005, pp. 925-930.

*Primary Examiner* — Oscar Louie
(74) *Attorney, Agent, or Firm* — Oblon, Spivak, McClelland, Maier & Neustadt, L.L.P.

(57) ABSTRACT

A decryption apparatus includes a section assignment unit which assigns a section D to a plurality of encrypted texts $F_i(x,y,t)$ ($i=1, \ldots, k$), a one-variable polynomial arithmetic unit which subtracts L pairs of polynomials $h_e(t)$ and $h_w(t)$ after the assignment, and a greatest common divisor arithmetic unit which obtains the greatest common divisor $\phi(t)$ of L polynomials $g_j(t)(=h_e(t)-h_w(t))$ ($j=1, \ldots, L$) as a result of the subtraction.

30 Claims, 11 Drawing Sheets

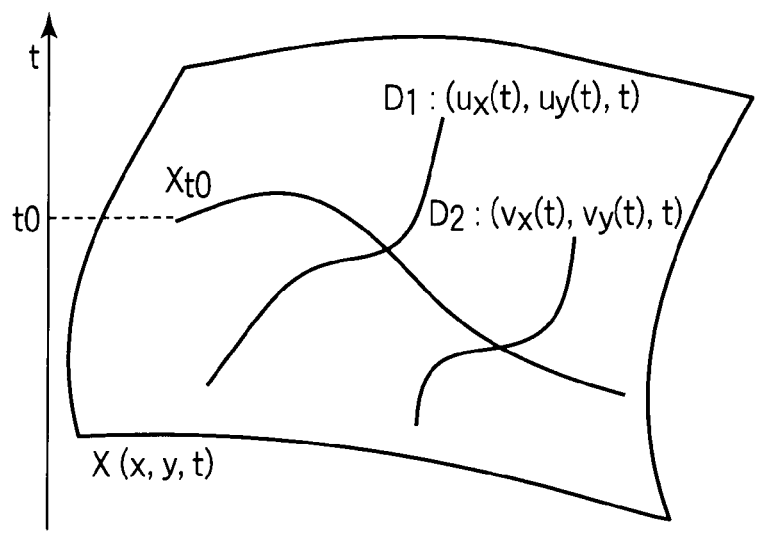
F I G. 1
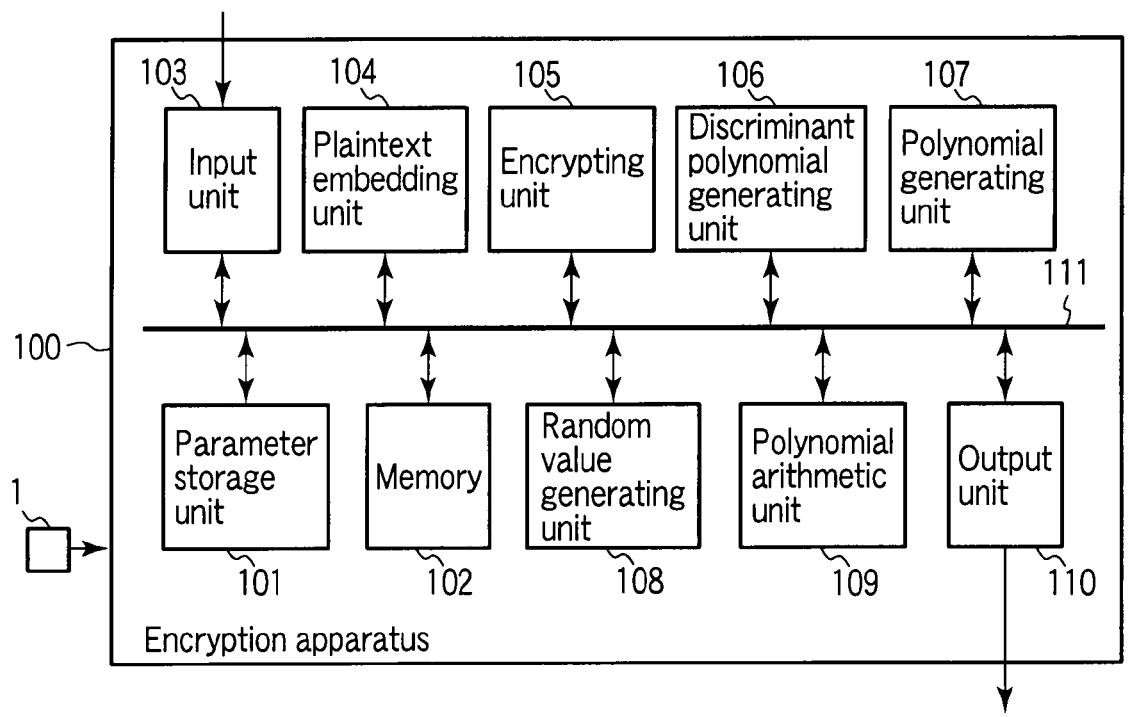
F I G. 2

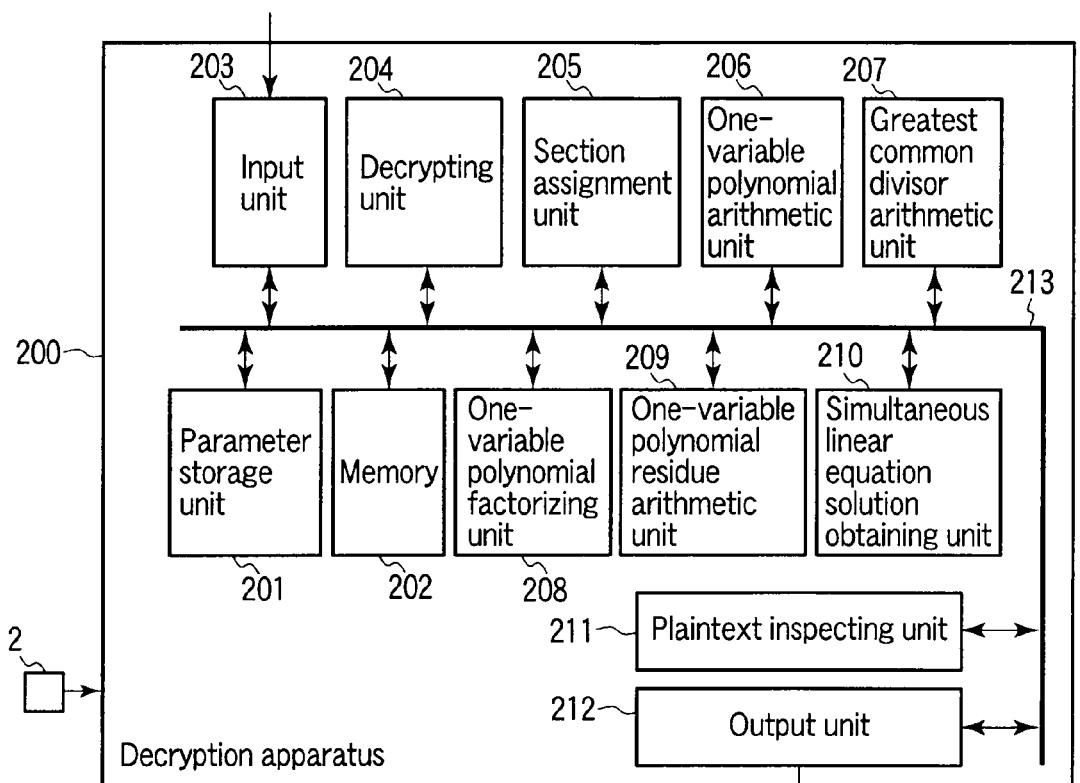
F I G. 3
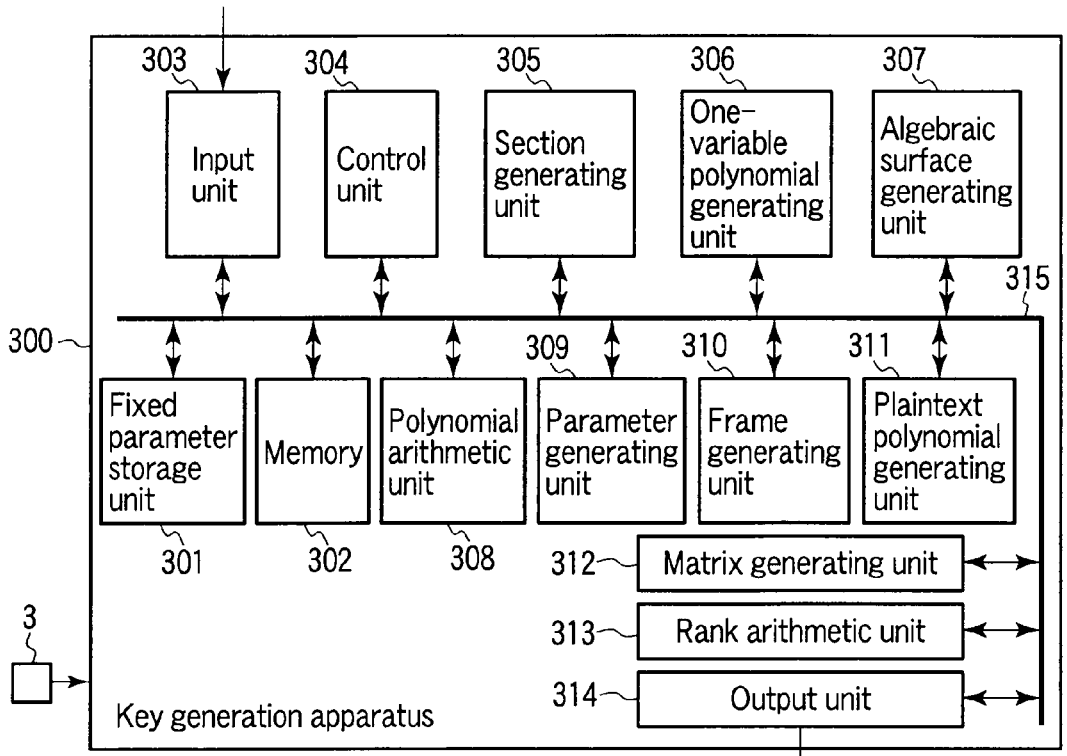
F I G. 4

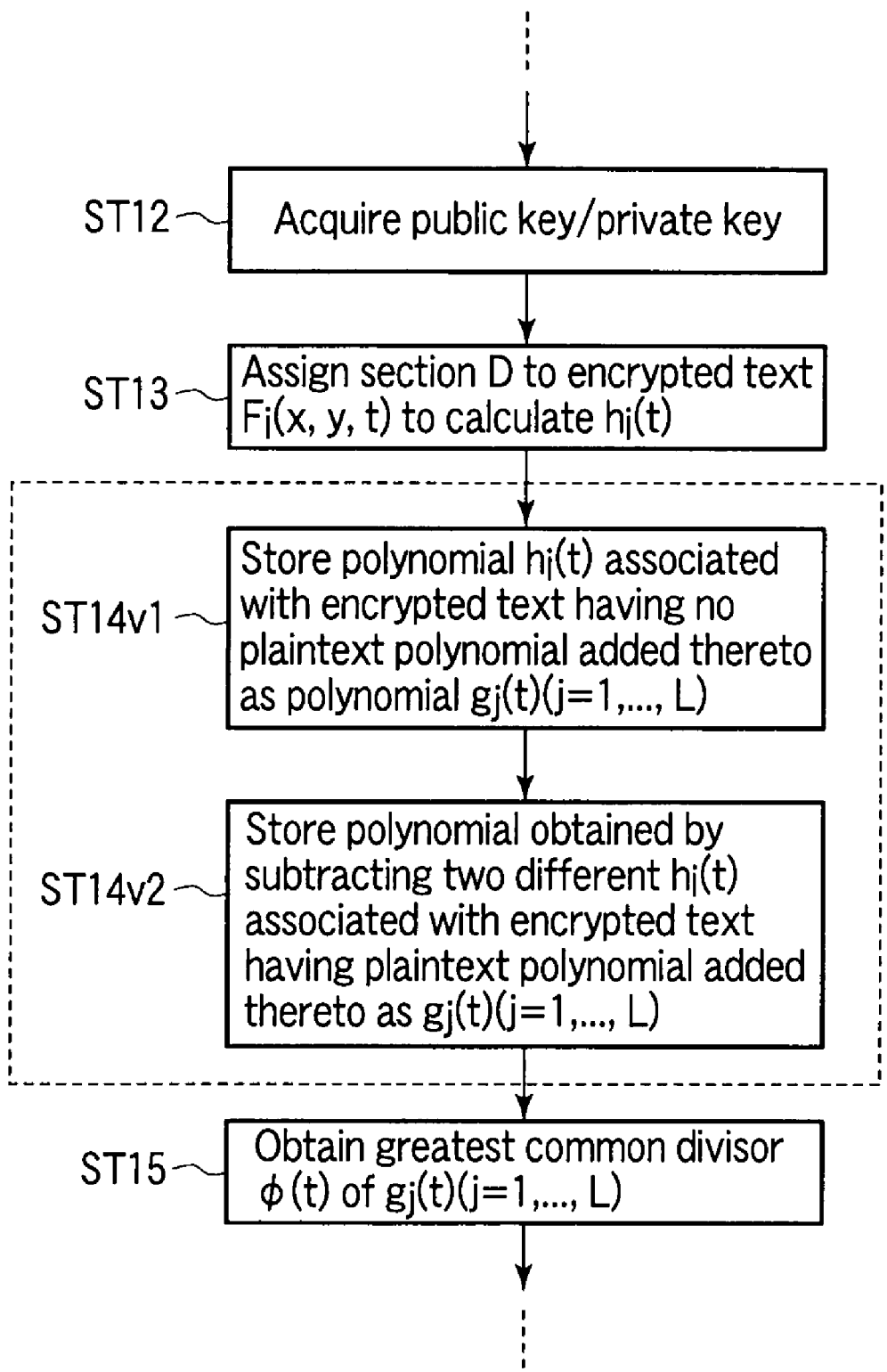
F I G. 9

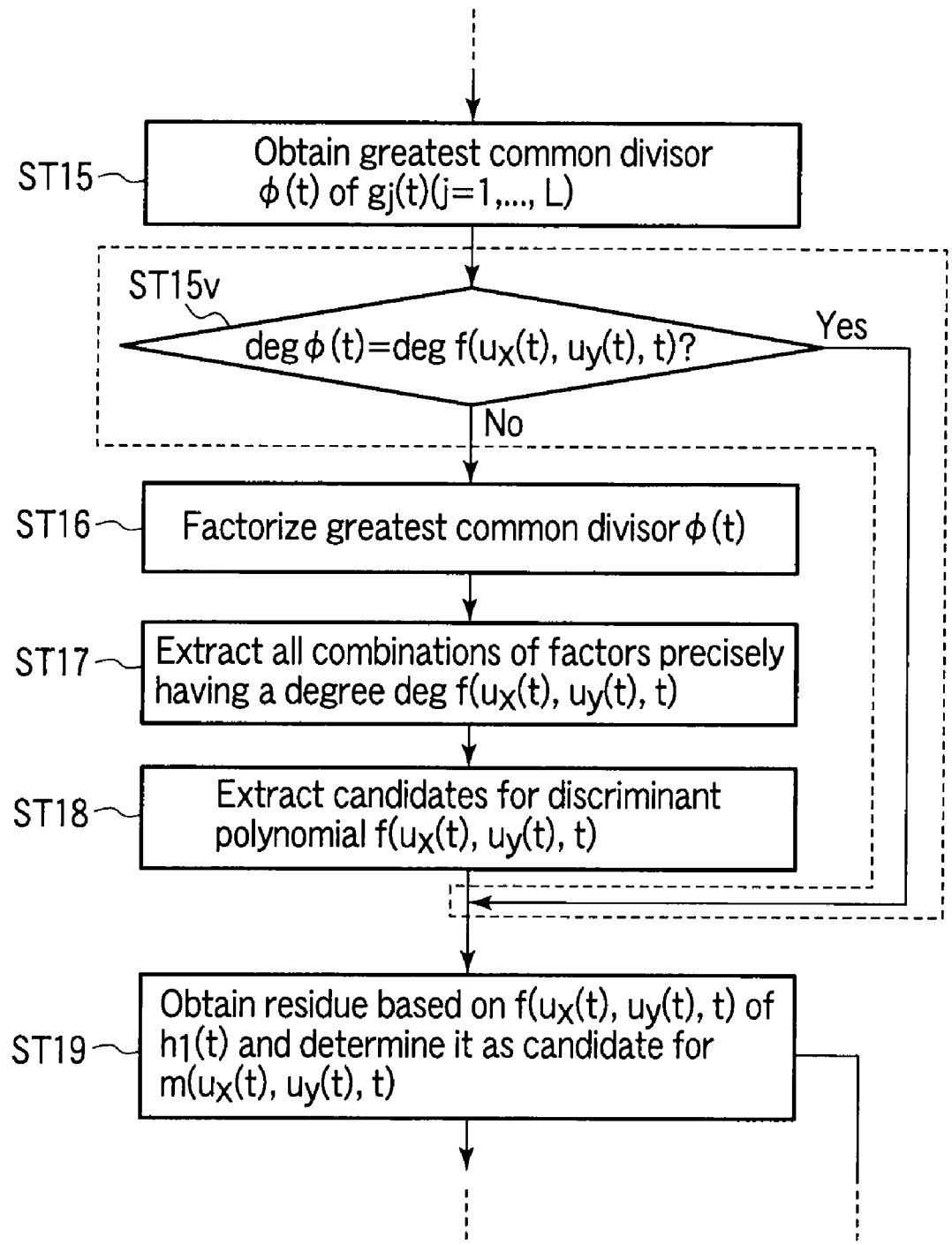
F I G. 10

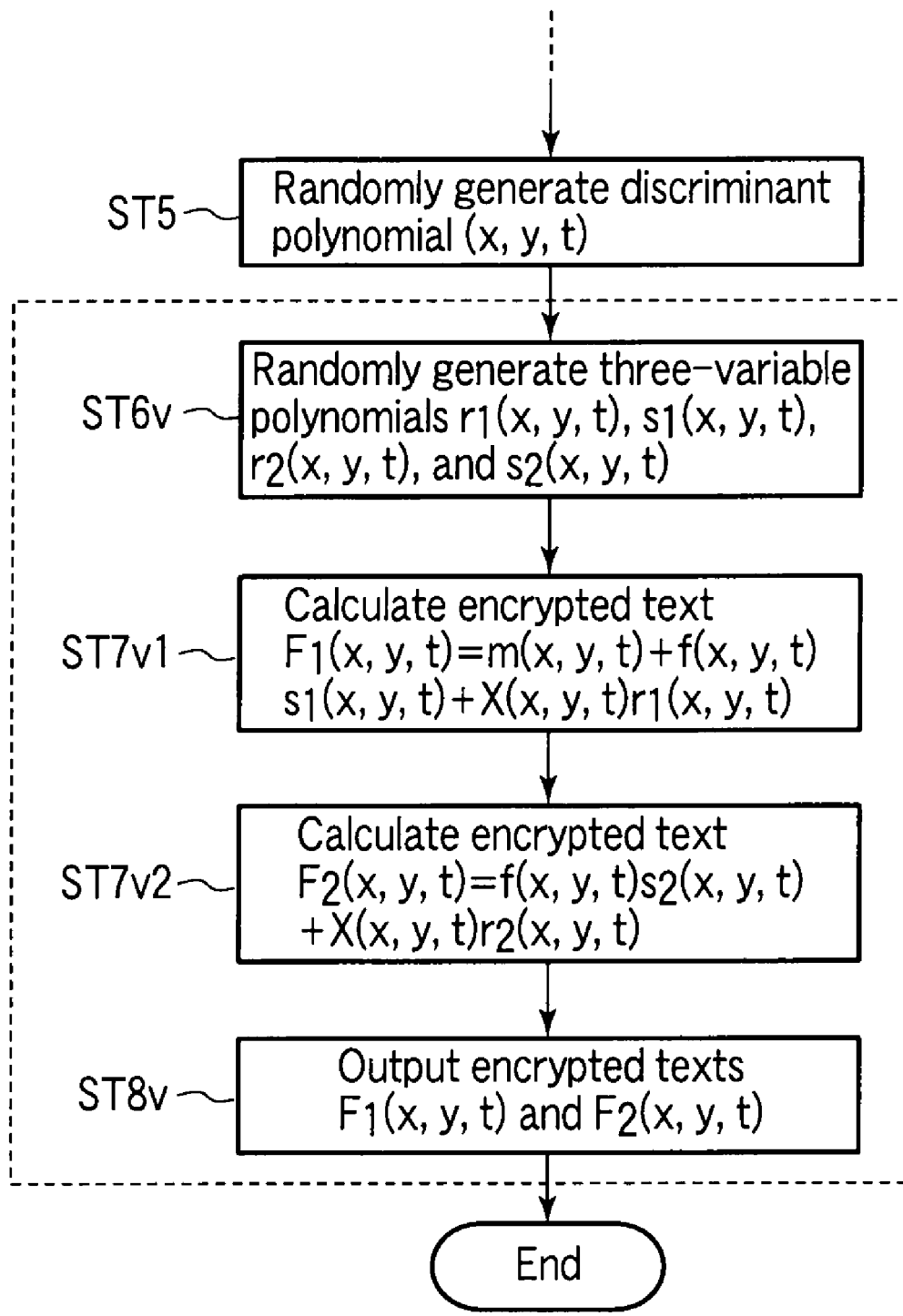
F I G. 13

ENCRYPTION APPARATUS, DECRYPTION APPARATUS, KEY GENERATION APPARATUS, AND STORAGE MEDIUM

CROSS-REFERENCE TO RELATED APPLICATIONS

This application is based upon and claims the benefit of priority from prior Japanese Patent Application No. 2009-050976, filed Mar. 4, 2009, the entire contents of which are incorporated herein by reference.

BACKGROUND OF THE INVENTION

1. Field of the Invention

The present invention relates to public key cryptography using an algebraic surface.

2. Description of the Related Art

In recent years, as public key cryptography that may not be possibly efficiently decrypted by a quantum computer and can be processed at a high speed even in a low-power environment, public key cryptography using an algebraic surface has been suggested (see, e.g., K. Akiyama, Y. Goto, "An improvement of the algebraic surface public-key cryptosystem", Symposium on Cryptography and Information Security 2008, IF1-2 (2008)), hereinafter referred to as AG08.

According to the public key cryptography using an algebraic surface, assuming that a private key is two sections associated with an algebraic surface $X(x,y,t)$ and a public key is the algebraic surface $X(x,y,t)$, encryption processing that generates two encrypted texts $F_i(x,y,t)=E(m,s_i,r_i,f,X)$ $(i=1,2)$ from a plaintext polynomial $m(x,y,t)$ is executed based on processing of embedding a plaintext m in the plaintext polynomial $m(x,y,t)$, processing of randomly generating a factor polynomial $f(x,y,t)$, polynomial generation processing of generating a set of two random polynomials $s_i(x,y,t)r_i(x,y,t)$ $(i=1,2)$ having three variables x, y, and t, and processing of performing addition or subtraction with respect to the set of respective polynomials $s_i(x,y,t)r_i(x,y,t)$ $(i=1,2)$ and a definition expression $X(x,y,t)$.

Further, in decryption processing, a section $D:(x,y,t)=(u_x(t),u_y(t),t)$ as the private key is assigned to two encrypted texts $F_1(x,y,t)$ and $F_2(x,y,t)$ to obtain respective one-variable polynomials $h_1(t)$ and $h_2(t)$, a result obtained by subtracting these polynomials is factorized, and a factor having deg $f(u_x(t),u_y(t),t)$ as a degree is extracted from a result of this factorization. This factor may not be necessarily uniquely extracted. However, when a correct factor polynomial $f(u_x(t),u_y(t),t)$ can be extracted, dividing one of the one-variable polynomials $h_1(t)$ and $h_2(t)$ by the factor polynomial $f(u_x(t),u_y(t),t)$ enables extracting a plaintext polynomial candidate $m(u_x(t),u_y(t),t)$ that is correct as a residue, thereby restoring the correct plaintext m.

On the other hand, when a factor that is not the factor polynomial $f(u_x(t),u_y(t),t)$ is extracted, a wrong plaintext m' is restored by the same arithmetic operation, and an error detecting code or the like previously embedded in the plaintext can be used to find the error.

However, the above-described public key cryptography using an algebraic surface usually has no problem, but realizing the efficiency of entire processing thereof is demanded according to the examination conducted by the present inventor.

For example, in the decryption processing, a major part of a processing time is used for factorization processing and factor extraction processing of extracting a factor having deg $f(u_x(t),u_y(t),t)$ as a degree from a result of the factorization. In particular, the number of combinations in the factor extraction processing may become tremendous depending on a result of the factorization, whereby the decryption processing time considerably differs. Therefore, in the public key cryptography using an algebraic surface, reducing a burden on the factorization processing and the factor extraction processing that take the major part of the decryption processing time and realizing the efficiency of the entire processing have been demanded.

Moreover, in the decryption processing, an arithmetic processing performed to create two encrypted texts is constituted of 4 times of multiplication and 4 times of addition. Additionally, in the decryption processing, the polynomials $h_1(t)$ and $h_2(t)$ after the section assignment must be subtracted, and a result of the subtraction must be factorized. Here, in the encryption processing or the decryption processing, reducing a burden on at least one arithmetic processing is desirable.

As explained above, according to the examination performed by the present inventor, in the public key cryptography using an algebraic surface, realizing the efficiency of the entire processing is demanded by reducing the burden on the arithmetic processing in the encryption processing or the decryption processing.

BRIEF SUMMARY OF THE INVENTION

A first aspect of the present invention is an encryption apparatus including: an embedding device configured to embed a message m as a coefficient of a three-variable plaintext polynomial $m(x,y,t)$ when encrypting the message m if a fibration $X(x,y,t)$ of an algebraic surface X is a public key and one or more sections corresponding to the fibration $X(x,y,t)$ are private keys; a first generation device configured to generate a three-variable discriminant polynomial $f(x,y,t)$ in such a manner that a degree of a one-variable polynomial obtained when assigning the section becomes larger than a degree of a one-variable polynomial obtained when assigning the section to the plaintext polynomial; a second generation device configured to randomly generate three or more pairs of polynomials $r_i(x,y,t)$ and $s_i(x,y,t)$ $(i=1, \ldots, k)$; and an encryption device configured to generate three or more encrypted texts $F_i(x,y,t)=E(m,s_i,r_i,f,X)$ $(i=1, \ldots, k)$ by processing of adding or subtracting a multiplication result $f(x,y,t)s_i(x,y,t)$ of the discriminant polynomial $f(x,y,t)$ and the polynomial $s_i(x,y,t)$ and a multiplication result $X(x,y,t)r_i(x,y,t)$ of the fibration $X(x,y,t)$ and the polynomial $r_i(x,y,t)$ with respect to the plaintext polynomial $m(x,y,t)$.

A second aspect of the present invention is a decryption apparatus including: an input device configured to receive three or more encrypted texts $F_i(x,y,t)=E(m,s_i,r_i,f,X)$ $(i=1, \ldots, k)$ generated by processing of adding or subtracting a multiplication result $f(x,y,t)s_i(x,y,t)$ of a three-variable discriminant polynomial $f(x,y,t)$ and a polynomial $s_1(x,y,t)$ and a multiplication result $X(x,y,t)r_i(x,y,t)$ of a fibration $X(x,y,t)$ and a polynomial $r_i(x,y,t)$ with respect to a three-variable polynomial $m(x,y,t)$ having a message m embedded therein as a coefficient when the fibration $X(x,y,t)$ of an algebraic surface X is a public key and one or more sections associated with the fibration $X(x,y,t)$ are private keys; an assignment device configured to generate three or more one-variable polynomials $h_i(t)$ $(i=1, \ldots, k)$ by assigning the sections to the respective input encrypted texts $F_i(x,y,t)$ $(i=1, \ldots, k)$; a subtraction device configured to subtract two pairs of different polynomials in respective one-variable polynomials $h_i(t)$ $(i=1, \ldots, k)$ to obtain a plurality of polynomials $g_j(t)$ $(j=1, \ldots, L)$ as a subtraction result; an arithmetic device configured to obtain the greatest common divisor $\phi(t)$ of two or more polynomials in each polynomial $g_j(t)$ ($j=1, \ldots, L$); a factorization device configured to factorize the greatest common divisor $\phi(t)$; an extraction device configured to extract all discriminant polynomial candidates $f(u_x(t),u_y(t),t)$ precisely having deg $f(u_x(t),u_y(t),t)$ as a degree by combining factors generated as a result of the factorization; a residue arithmetic device configured to obtain a plaintext polynomial candidate $m(u_x(t),u_y(t),t)$ as a residue by dividing at least one one-variable polynomial $h_i(t)$ in the one-variable polynomials $h_i(t)$ ($i=1, \ldots, k$) by the discriminant polynomial candidate $f(u_x(t),u_y(t),t)$; a first candidate generation device configured to derive a simultaneous linear equation having a coefficient of the plaintext polynomial $m(x,y,t)$ as a variable based on the plaintext polynomial candidate $m(u_x(t),u_y(t),t)$ and a previously disclosed frame of the plaintext polynomial $m(x,y,t)$, and generate a plaintext candidate M by solving the simultaneous linear equation; an inspection device configured to inspect whether the plaintext candidate M is a true plaintext by using an error detecting code included in the plaintext candidate M; and an output device configured to output the plaintext candidate M as a plaintext when the plaintext candidate M as the true plaintext is present as a result of the inspection.

A third aspect of the present invention is a key generation apparatus including: an input device configured to receive a degree $\deg_t X'$ of a term other than a constant term of a fibration $X(x,y,t)$ and a coefficient set $\Lambda_X$ of two variables x and y in the fibration $X(x,y,t)$ when the fibration $X(x,y,t)$ of an algebraic surface X is a public key and one or more sections associated with the fibration $X(x,y,t)$ are private keys; a section generation device configured to randomly generate the sections; a first generation device configured to generate the term other than the constant term by randomly generating a coefficient of the term other than the constant term when the fibration $X(x,y,t)$ of the algebraic surface is regarded as a polynomial of the variables x and y based on the generated section and the input degree $\deg_t X'$ and coefficient set $\Lambda_X$; a first calculation device configured to calculate the constant term by adding a negative sign to an assignment result obtained by assigning the section to the term other than the constant term; a second generation device configured to determine a larger one of the degree $\deg_t X'$ of the term other than constant term and a degree $\deg_t a_{00}$ of the constant term as a degree $\deg_t X$ of the fibration and generate the fibration $X(x,y,t)$ including the term other than the constant term and the constant term; a third generation device configured to randomly generate a degree $\deg_t f$ of a discriminant polynomial and the coefficient set $\Lambda_f$ of the two variables x and y under conditions that "$\deg_t X < \deg_t m < \deg_t f$" and "$(\deg_x f, \deg_y f) \in \Lambda_f$" based on the degree $\deg_t X$ of the fibration and the coefficient set $\Lambda_X$ (where $\deg_t m$ is a degree of a variable t in a plaintext polynomial, $\deg_t f$ is a degree of a variable t in the discriminant polynomial, $\deg_x f$ is a degree of a variable x in the discriminant polynomial, and $\deg_y f$ is a degree of a variable y in the discriminant polynomial); a first determination device configured to calculate a product $\Lambda_f \Lambda_X$ of the coefficient sets $\Lambda_f$ and $\Lambda_X$ and determine a coefficient set $\Lambda_m$ of two variables x and y in a plaintext polynomial in a partial set of a result of the calculation under a condition that "$(\deg_x m, \deg_y m, \deg_t m) \in \Gamma_m$" (where $\Gamma_m$ is a set of non-zero monomials (an exponent x, an exponent y, and an exponent t) included in a plaintext polynomial $m(x,y,t)$); a second determination device configured to determine a $\deg_t m$ of the plaintext polynomial under a condition "$\deg_t X < \deg_t m < \deg_t f$"; a third determination device configured to determine a frame $FR_f$ of the discriminant polynomial including the coefficient set $\Lambda_f$ and the degree $f_{ij}(t)$ by determining a degree $f_{ij}(t)$ of a coefficient of the discriminant polynomial as $\deg f_{ij}(t) = \deg_t f$ in case of an element $(i,j)=(\deg_x f, \deg_y f)$ based on each element $(i,j)$ included in the coefficient set $\Lambda_f$ and randomly determining the degree $f_{ij}(t)$ in the range of $0 \leq \deg f_{ij}(t) \leq \deg_t f$ in case of the element $(i,j) \neq (\deg_x f, \deg_y f)$; a fourth generation device configured to extract the coefficient set $\Lambda_X$ and a degree $\deg a_{ij}(t)$ of a coefficient associated with the element $(i,j)$ in $\Lambda_X$ from the algebraic surface and generate a frame $FR_X$ of the algebraic surface from the coefficient set $\Lambda_X$ and the degree $\deg a_{ij}(t)$ of the coefficient; a fifth generation device configured to integrate the respective frames $FR_f$ and $FR_X$ to generate a frame $FR_g (=FR_f FR_X)$; a fourth determination device configured to determine a degree $\deg m_{ij}(t)$ of a coefficient associated with the element $(i,j)$ included in the coefficient set $\Lambda_m$ of the plaintext polynomial as $\deg m_{ij}(t) = \min\{\deg_t m, \deg g_{ij}(t)\}$; an assignment device configured to assign the section to a frame of the plaintext polynomial having a coefficient $m_{ijk}$ as a variable which is a frame including the coefficient set $\Lambda_m$ and the degree $\deg m_{ij}(t)$; a sixth generation device configured to generate a variable vector $(m_{000}, m_{001}, \ldots, m_{ijk}, \ldots)$ by ordering the variables $m_{ijk}$ obtained as a result of the assignment; an extraction device configured to organize a one-variable polynomial $m(u_x(t),u_y(t),t)$ obtained as a result of the assignment in regard to t and extract a polynomial that becomes a coefficient $m_{ijk} u_x(t)^i u_y(t)^j$ of t; a seventh generation device configured to generate a coefficient matrix in such a manner that a product of the variable matrix $(m_{000}, m_{001}, \ldots, m_{ijk}, \ldots)$ precisely becomes the coefficient $m_{ijk} u_x(t)^i u_y(t)^j$ of t; a second calculation device configured to calculate a rank of the coefficient matrix; an adjustment device configured to set some variables $m_{ijk}$ in the one-variable polynomial $m(u_x(t),u_y(t),t)$ as constants when the rank does not coincide with a dimension number of the variable vector; and an output device configured to output as a frame $FR_m$ of the plaintext polynomial a frame of the three-variable polynomial $m(x,y,t)$ associated with the one-variable polynomial $m(u_x(t),u_y(t),t)$ when the rank coincides with the dimension number of the variable vector.

A fourth aspect of the present invention is an encryption apparatus including: an embedding device configured to embed a message m as a coefficient of a three-variable plaintext polynomial $m(x,y,t)$ when encrypting the message m if a fibration $X(x,y,t)$ of an algebraic surface X is a public key and one or more sections corresponding to the fibration $X(x,y,t)$ are private keys; a first generation device configured to generate a three-variable discriminant polynomial $f(x,y,t)$ in such a manner that a degree of a one-variable polynomial obtained when assigning the section becomes larger than a degree of a one-variable polynomial obtained when assigning the section to the plaintext polynomial; a second generation device configured to randomly generate two pairs of polynomials $r_1(x,y,t)$, $s_1(x,y,t)$, $r_2(x,y,t)$, and $s_2(x,y,t)$; a first encryption device configured to generate one encrypted text $F_1(x,y,t)=E(m,s_1,r_1,f,X)$ by processing of adding or subtracting a multiplication result $f(x,y,t)s_1(x,y,t)$ of the discriminant polynomial $f(x,y,t)$ and the polynomial $s_1(x,y,t)$ and a multiplication result $X(x,y,t)r_1(x,y,t)$ of the fibration $X(x,y,t)$ and the polynomial $r_1(x,y,t)$ with respect to the plaintext polynomial $m(x,y,t)$; and a second encryption device configured to generate one encrypted text $F_2(x,y,t)=E(s_2,r_2,f,X)$ by processing of adding or subtracting a multiplication result $f(x,y,t)s_2(x,y,t)$ of the discriminant polynomial $f(x,y,t)$ and the polynomial $s_2(x,y,t)$ and a multiplication result $X(x,y,t)r_2(x,y,t)$ of the fibration $X(x,y,t)$ and the polynomial $r_2(x,y,t)$ without using the plaintext polynomial $m(x,y,t)$.

A fifth aspect of the present invention is a decryption apparatus including: a first input device configured to receive one encrypted text $F_1(x,y,t)=E(m,s_1,r_1,f,X)$ generated by processing of adding or subtracting a multiplication result $f(x,y,t)s_1(x,y,t)$ of a three-variable discriminant polynomial $f(x,y,t)$ and a polynomial $s_1(x,y,t)$ and a multiplication result $X(x,y,t)r_1(x,y,t)$ of a fibration $X(x,y,t)$ and a polynomial $r_1(x,y,t)$ with respect to a three-variable polynomial $m(x,y,t)$ having a message m embedded therein as a coefficient when the fibration $X(x,y,t)$ of an algebraic surface X is a public key and one or more sections associated with the fibration $X(x,y,t)$ are private keys; a second input device configured to receive one encrypted text $F_2(x,y,t)=E(s_2,r_2,f,X)$ generated by processing of adding or subtracting a multiplication result $f(x,y,t)s_2(x,y,t)$ of the discriminant polynomial $f(x,y,t)$ and the polynomial $s_2(x,y,t)$ and a multiplication result $X(x,y,t)r_2(x,y,t)$ of the fibration $X(x,y,t)$ and the polynomial $r_2(x,y,t)$ without using the plaintext polynomial $m(x,y,t)$; an assignment device configured to generate two one-variable polynomials $h_1(t)$ and $h_2(t)$ by assigning the section to the respective input encrypted texts $F_1(x,y,t)$ and $F_2(x,y,t)$; a factorization device configured to factorize a one-variable polynomial $h_2(t)$ generated from the encrypted text $F_2(x,y,t)$ in the respective one-variable polynomials $h_1(t)$ and $h_2(t)$; an extraction device configured to extract all discriminant polynomial candidates $f(u_x(t),u_y(t),t)$ precisely having deg $f(u_x(t),u_y(t),t)$ as a degree by combining factors generated as a result of the factorization; a residue arithmetic device configured to obtain a plaintext polynomial candidate $m(u_x(t),u_y(t),t)$ as a residue by dividing the one-variable polynomial $h_1(t)$ generated from the encrypted text $F_1(x,y,t)$ in the one-variable polynomials $h_1(t)$ and $h_2(t)$ by the discriminant polynomial candidate $f(u_x(t),u_y(t),t)$; a first candidate generation device configured to derive a simultaneous linear equation having a coefficient of the plaintext polynomial $m(x,y,t)$ as a variable based on the plaintext polynomial candidate $m(u_x(t),u_y(t),t)$ and a previously disclosed frame of the plaintext polynomial $m(x,y,t)$, and generate a plaintext candidate M by solving the simultaneous linear equation; an inspection device configured to inspect whether the plaintext candidate M is a true plaintext by using an error detecting code included in the plaintext candidate M; and an output device configured to output the plaintext candidate M as a plaintext when the plaintext candidate M as the true plaintext is present as a result of the inspection.

It is to be noted that each of first to fifth aspects is described as an apparatus, but it is not restricted to the apparatus and may be represented as a method, a program, or a computer-readable storage medium having a program stored therein.

In the first to third aspects, as different from a convention example where a polynomial $\{h_1(t)-h_2(t)\}$ having a high degree is factorized to extract a factor, an encryption apparatus, a decryption apparatus, and a key generation apparatus that obtain the greatest common divisor $\phi(t)$ having a low degree from a polynomial $h_i(t)$ having a high degree and factorize the greatest common divisor $\phi(t)$ having the low degree to extract a factor are realized.

Therefore, according to the first to third aspects, in the public key cryptography scheme using an algebraic surface, when the greatest common divisor $\phi(t)$ having the low degree is used to reduce the burden on the factorization processing and the factor extraction processing, and the burden on the arithmetic processing in the decryption processing can be decreased, thereby realizing the efficiency of the entire processing.

According to the fourth aspect, in the public key cryptography scheme using an algebraic surface, as different from the conventional example, since a second encrypted text $F_2(x,y,t)$ is generated without using a plaintext polynomial $m(x,y,t)$, a single addition or subtraction operation with respect to the plaintext polynomial $m(x,y,t)$ can be omitted, and the burden on the arithmetic processing in the encryption processing can be reduced, thus realizing the efficiency of the entire processing.

According to the fifth aspect, in the public key cryptography scheme using an algebraic surface, as different from the conventional example, since a polynomial $h_2(t)$ generated from the second encrypted text $F_2(x,y,t)$ which does not use the plaintext polynomial $m(x,y,t)$ is factorized, subtraction processing $\{h_1(t)-h_2(t)\}$ that cancels a conventional plaintext polynomial $m(u_x(t),u_y(t),t)$ can be omitted and the factorization can be executed, and hence the burden on the arithmetic processing in the decryption processing can be decreased, thereby realizing the efficiency of the entire processing.

BRIEF DESCRIPTION OF THE SEVERAL VIEWS OF THE DRAWING

FIG. 1 is a schematic view for explaining a general algebraic surface;

FIG. 2 is a view showing an encryption apparatus according to a first embodiment of the present invention;

FIG. 3 is a view showing a decryption apparatus according to the first embodiment;

FIG. 4 is a view showing a key generation apparatus according to the first embodiment;

FIGS. 9 and 10 are flowcharts of the decryption apparatus in each variation of the first embodiment;

FIG. 13 is a flowchart of the encryption apparatus according to the second embodiment.

DETAILED DESCRIPTION OF THE INVENTION

Figure 5:
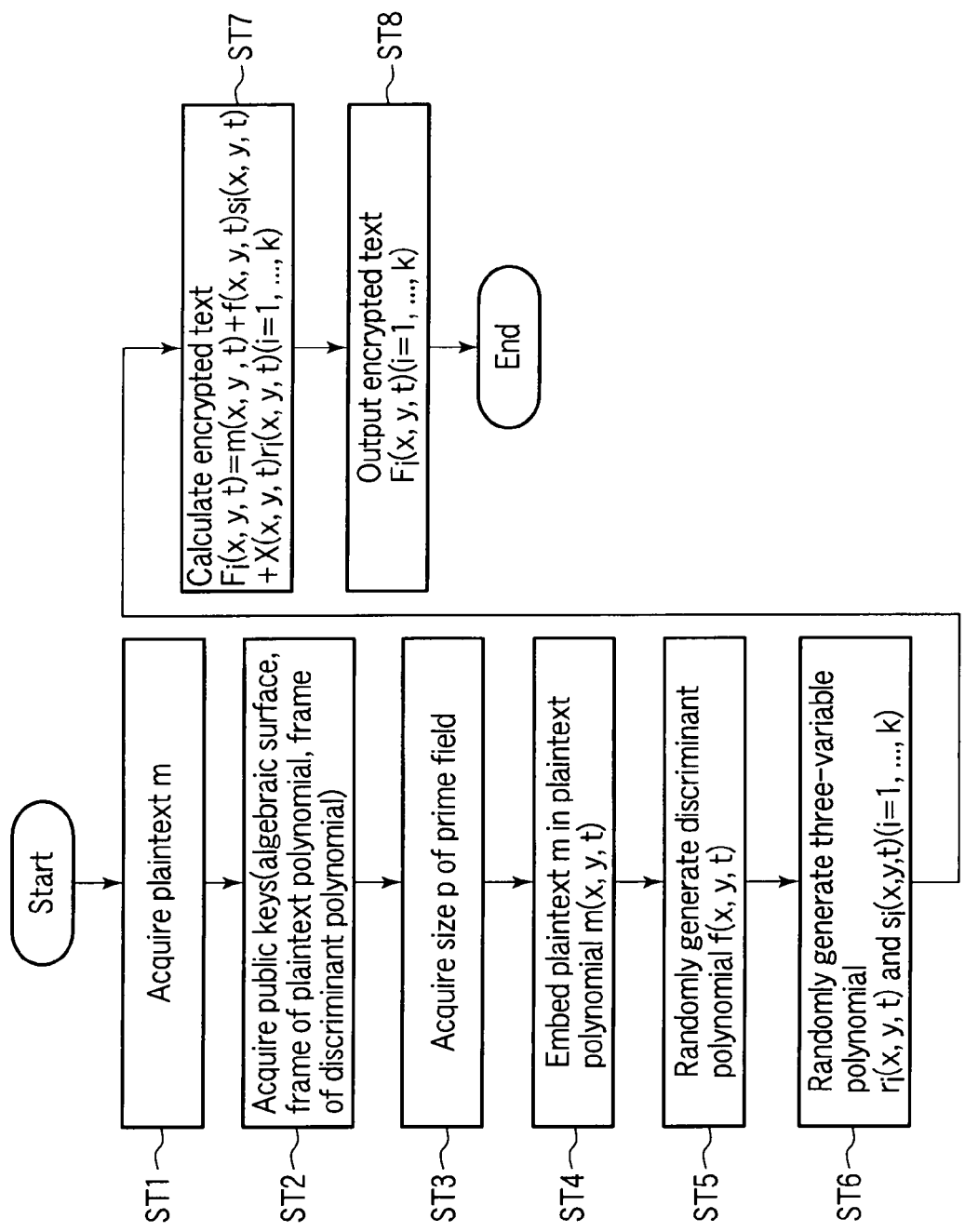
FIG. 5 is a flowchart of the encryption apparatus according to the first embodiment.

Each embodiment according to the present invention will now be described with reference to the accompanying drawings.

An algebraic surface in each embodiment is defined as one having a two-dimensional freedom degree in a set of solutions of a simultaneous (algebraic) equation defined in a field K. For example, since a simultaneous equation in the field K represented as the following Expression (1) has three equations that constrain five variables, it has a two-dimensional freedom degree, and hence it is an algebraic surface.

$$\begin{cases} f_1(x, y, z, v, w) = 0 \\ f_2(x, y, z, v, w) = 0 \\ f_3(x, y, z, v, w) = 0 \end{cases} \quad (1)$$

In particular, as represented by Expression (2), a space defined as a set of solutions of an algebraic equation in the field K having three variables is also an algebraic surface in the field K.

$$f(x,y,z)=0 \quad (2)$$

It is to be noted that a definitional equation of the algebraic surface represented by Expressions (1) and (2) is an equation in an affine space. A definitional equation of an algebraic surface in a projective space (in case of Expression (2)) is $f(x,y,z,w)=0$.

However, in each embodiment, the algebraic surface is not processed in the projective space, and hence a definitional equation of the algebraic surface is determined as Expression (1) or Expression (2). However, even if this definitional equation is expressed in the projective space, each embodiment can be achieved as it is.

On the other hand, an algebraic curve is one having a one-dimensional freedom degree in a set of solutions of a simultaneous (algebraic) equation defined in the field K. Therefore, the algebraic curve is defined by, e.g., the following expression.

$$g(x,y)=0$$

In this embodiment, since an algebraic surface that can be written in one expression like Expression (2) is used, Expression (2) is used like a definitional equation of the algebraic surface in the following explanation.

The field is a set in which addition, subtraction, multiplication, and division can be freely carried out. A real number, a rational number, and a complex number correspond to the field. A set including an element that cannot be divided except by zero, e.g., the set of integer or the set of matrix does not correspond to the field. Of the fields, there is a field constituted of a finite number of elements called a finite field. For example, a residue class $Z/pZ$ having a modulo p with respect to a prime number p forms a field. Such a field is called a prime field, and is written as $F_p$ or the like. As finite fields, there is, e.g., a field $Fq(q=p^r)$ having elements obtained by raising a prime number. However, in this embodiment, a prime field $F_p$ alone is mainly used for the sake of convenience. In general, p in the prime field $F_p$ is called a characteristic of the prime field $F_p$.

On the other hand, even in the case of coping with a general finite field, each embodiment can be likewise achieved by carrying out a self-evident modification. It is often the case that public key cryptography is constituted in a finite field because a message is embedded as digital data. In this embodiment, likewise, an algebraic surface defined in a finite field (a prime field in particular in this embodiment) $F_P$ is used.

As shown in FIG. 1, a plurality of algebraic curves are usually present on an algebraic surface $f(x,y,z)=0$. Such an algebraic curve is called a factor on an algebraic surface.

In general, a problem of finding a (non-self-evident) divisor when a definitional equation of an algebraic surface is given is a difficult problem that is unsolvable even in contemporary mathematics. Except for a primitive method, e.g., solving such a system of multivariate equations as described later or a round-robin solution, a general solving method is unknown. In particular, in an algebraic surface defined by such a finite field as used in this embodiment, there are not so many clues as compared with an infinite field (a field constituted of an infinite number of elements), e.g., a rational number field, and it is known that it is a very difficult problem.

In this embodiment, this problem is called a divisor finding problem on an algebraic surface, or simply a divisor finding problem, and a public key cryptography system having a divisor finding problem on an algebraic surface as a basis for security is constituted.

Next, on an algebraic surface $X:f(x,y,z)=0$ in a field K, x and y are defined by the following expression and called sections:

$$h(x,y,t)=0$$

An algebraic curve expressed in a form in which a curve represented by the following expression obtained by parameterizing x,y with t exists is called a fibration of an algebraic surface X and expressed as $X_t$ or the like:

$$(x,y,t)=(u_x(t),u_y(t),t)$$

Here, a state where x is parameterized by t means that a variable x is represented by an algebraic expression which is defined on a field k and has t as a variable, like $x=u_x(t)$. It is to be noted that the term algebraic expression means a polynomial in this embodiment. Moreover, since a fibration is apparent in the following explanation, such an algebraic surface is simply represented as X.

Further, an algebraic surface obtained by assigning an element t0 of the field K to a parameter t is called a fiber, and is expressed as, e.g., $X_{t0}$. Both the fiber and the section are divisors of the algebraic surface $X_t$.

In general, when a fibration of an algebraic surface is given, a corresponding fiber can be immediately obtained (by assigning an element of a field to t). However, finding a corresponding section is very difficult. Therefore, it can be said that the fiber is a trivial divisor and the section is a non-trivial divisor.

A public key cryptography system in each embodiment determines a problem of obtaining a section as a basis for security when especially a fibration $X_t$ of an algebraic surface X is given in a problem of finding divisors on an algebraic surface.

In order to obtain a section from a fibration, only a method based on the following procedure from (i) to (iv) is known even in contemporary mathematics.

(i) A section $(u_x(t), u_y(t),t)$ is assumed as deg $u_x(t)<r_x$, deg $u_y(t)<r_y$, and $u_x(t)$ and $u_y(t)$ are then set, as in the following expressions:

$$u_x(t)=\alpha_0+\alpha_1 t+\ldots+\alpha_{r_x-1}t^{r_x-1}$$

$$u_y(t)=\beta_0+\beta_1 t+\ldots+\beta_{r_y-1}t^{r_y-1}$$

(ii) $u_x(t)$ and $u_y(t)$ are assigned to $X(x,y,t)=$ to obtain the following expression:

$$X(u_x(t), u_y(t), t) = \sum_i c_i t^i = 0$$

(iii) The left-hand side of the above expression is developed to express a coefficient of $t_i$ by using a function $c_i(\alpha_0, \ldots, \alpha_{r_x-1}, \beta_0, \ldots, \beta_{r_y-1})$ of $\alpha_0, \ldots, \alpha_{r_x-1}, \beta_0, \ldots, \beta_{r_y-1}$, thereby achieving the following system of multivariate equations:

$$\begin{cases} c_0(\alpha_0, \ldots, \alpha_{r_x-1}, \beta_0, \ldots, \beta_{r_y-1}) = 0 \\ c_1(\alpha_0, \ldots, \alpha_{r_x-1}, \beta_0, \ldots, \beta_{r_y-1}) = 0 \\ \vdots \\ c_{r_x+r_y-2}(\alpha_0, \ldots, \alpha_{r_x-1}, \beta_0, \ldots, \beta_{r_y-1}) = 0 \end{cases}$$

(iv) The system of equations is solved.

Public key cryptography according to this embodiment based on a problem of finding sections on an algebraic surface will now be described specifically.

Public Key Cryptography According to Each Embodiment

Definition of Terms

First, terms will be defined. A degree concerning a variable x in a three-variable polynomial $\xi(x,y,t)$ is represented as $\deg_x \xi(x,y,t)$, a degree concerning a variable y is represented as $\deg_y \xi(x,y,t)$, and a degree concerning a variable t is represented as $\deg_t \xi(x,y,t)$.

When representing $\xi(x,y,t)$, the following two expression methods are used:

$$\xi(x, y, t) = \sum_{(i,j,k) \in \Gamma_\xi} \tau_{ijk} x^i y^j t^k$$

$$\xi(x, y, t) = \sum_{(i,j) \in \Lambda_\xi} c_{ij}(t) x^i y^j$$

where $\Gamma_\xi$ is defined as a set of (an exponent x, an exponent y, and an exponent t) of non-zero monomials included in the polynomial $\xi(x,y,t)$, and it is called a (three-variable) coefficient set of $\xi$. $\Lambda_\xi$ is defined as a set of (the exponent x and the exponent y) of non-zero terms when the polynomial $\xi(x,y,t)$ is regarded as a polynomial of x and y, and it is called a (two-variable) coefficient set of $\xi$.

Furthermore, a product $\Lambda_\xi \Lambda_\eta$ of the (two-variable) coefficient set $\Lambda_\xi$ and the (two-variable) coefficient set $\Lambda_\eta$ is defined as follows:

$$\Lambda_\xi \Lambda_\eta = \{(i_1+i_2, j_1+j_2) | (i_1, j_1) \in \Lambda_\xi, (i_2, j_2) \in \Lambda_\eta\}$$

This product means a (two-variable) coefficient set of a three-variable polynomial $\xi(x,y,t)\eta(x,y,t)$. A product set of the (three-variable) coefficient set is likewise defined.

A frame $FR_\xi$ in the three-variable polynomial $\xi(x,y,t)$ means that the maximum degree $\deg \xi_{ij}(t)$ alone of a coefficient $\xi_{ij}(t)$ associated with each element $(i,j)$ in the (two-variable) coefficient set $\Lambda_\xi$ and the coefficient set $\Lambda_\xi$ is determined in the following expression:

$$\xi(x, y, t) = \sum_{(i,j) \in \Lambda_\xi} \xi_{ij}(t) x^i y^j$$

Moreover, a product $FR_\xi FR_\eta$ of the frame $FR_\xi$ and the frame $FR_\eta$ is defined as follows:

$$\psi(x, y, t) = \sum_{(i,j) \in \Lambda_\psi} c_{ij}(t) x^i y^j$$

where $$\Lambda_\psi = \Lambda_\xi \Lambda_\eta (i,j) \in \Lambda_\psi \Rightarrow \deg \psi_{ij}(t) = \deg \xi_{ij}(t) + \deg \eta_{ij}(t)$$

(Outline of First Embodiment)

The public key cryptography according to this embodiment has the following two system parameters p and d:
1. a size of a finite field: p; and
2. the highest degree of a section (as a private key):

$$d = \max\{\deg u_x(t), \deg u_y(t)\} \tag{3}$$

Additionally, the following 3 public keys are provided:
1. a fibration on an algebraic surface X in $F_p$:

$$X(x, y, t) \sum_{(i,j) \in \Lambda_X} a_{ij}(t) x^i y^j;$$

2. a frame of a plaintext polynomial:

$$m(x, y, t) = \sum_{(i,j) \in \Lambda_m} m_{ij}(t) x^i y^j;$$

and
3. a frame of a discriminant polynomial:

$$f(x, y, t) = \sum_{(i,j) \in \Lambda_f} f_{ij}(t) x^i y^j;$$

A private key is the following section D:
1. a section on the algebraic surface X in $$F_p: D: (x,y,t) = (u_x(t), u_y(t), t)$$

However, a frame of each of the plaintext polynomial and the discriminant polynomial is defined to satisfy the following condition (4) and a condition (5):

$$\begin{cases} \deg_x X(x,y,t) < \deg_x m(x,y,t) < \deg_x f(x,y,t) \\ \deg_y X(x,y,t) < \deg_y m(x,y,t) < \deg_y f(x,y,t) \\ \deg_t X(x,y,t) < \deg_t m(x,y,t) < \deg_t f(x,y,t) \end{cases} \tag{4}$$

and $$(\deg_x m, \deg_y m, \deg_t m) \in \Gamma_m$$

$$(\deg_x f, \deg_y f) \in \Lambda_f$$

The condition (5) is as follows:

$$\Lambda_m \subset \Lambda_f \Lambda_X \tag{5}$$

These are the conditions that realize the expected security. Additionally, it can be understood that the following condition for decryption is necessarily met with respect to all sections based on a degree relationship if the condition (4) is satisfied.

$$\deg m(u_x(t), u_y(t), t) < \deg f(u_x(t), u_y(t), t) \tag{6}$$

These parameters can be readily obtained by a later-explained method (a key generation method).

An outline of encryption processing will now be described. In the encryption processing, a message which is to be encrypted (which will be referred to as a plaintext hereinafter) is first divided into blocks to provide $m = m_{00} \| m_{10} \| \ldots \| m_{ij}$. It is to be noted that $\|$ represents a conjunction. Here, assuming that $L = \deg m_{ij}(t)$, the following expression is provided:

$$|m_{ij}| \leq (|p|-1)(L+1)$$

where a coefficient $m_{ijk}$ of $t^k$ in $m_{ij}(t)$ is obtained by dividing $m_{ij}$ in accordance with $|p|-1$ bit. That is, the following expression is achieved:

$$m_{ij} = m_{ij0} \| m_{ij1} \| \ldots \| m_{ijL}$$

Here, $|p|$ represents a bit length of p. In this manner, the plaintext is embedded in the following plaintext polynomial $m(x,y,t)$ represented by the following Expression:

$$m(x, y, t) = \sum_{(i,j)\in\Lambda_m} m_{ij}(t)x^i y^j$$

It is to be noted that a message in each embodiment includes an error detecting code. The error detecting code has a function of detecting that a message is partially prejudiced due to, e.g., an influence of noise produced during transmission. As the error detecting code, a hash value based on a hash function may be taken in particular.

Then, a discriminant polynomial $f(x,y,t)$ in $F_p$ is randomly generated in a determined frame. Subsequently, polynomials $r_i(x,y,t)$ and $s_i(x,y,t)$ are randomly generated, and three or more encrypted texts $F_i(x,y,t)$ are calculated from three-variable polynomials $m(x,y,t)$ and $f(x,y,t)$ and a fibration $X(x,y,t)$ of an algebraic surface X as the public key.

$$F_i(x,y,t)=m(x,y,t)+f(x,y,t)s_i(x,y,t)+X(x,y,t)r_i(x,y,t) \quad (7)$$

where $i=1 \ldots k$, and k is 3 or above.

It is to be noted that an encryption scheme disclosed in AG08 is k=2. This scheme narrows down a degree of a polynomial to be factorized and thereby reduces a time for the factorization processing and the factor extracting processing that take the decryption processing time by setting $k \leq 3$.

A receiver who has received the encrypted text $F_i(x,y,t)$ ($i=1 \ldots k$) utilizes the section D as his/her private key to perform decryption as follows. First, the section D is assigned to the encrypted text $F(x,y,t)$. Here, the section D is assigned to the algebraic surface $X(x,y,t)$. It is to be noted that the following relationship is present:

$$X(u_x(t),u_y(t),t)=0,$$

Then, it can be understood that k expressions $h_i(t)$ ($i=1 \ldots k$) having the following relationship can be obtained:

$$h_i(t)=F_i(u_x(t),u_y(t),t)=m(u_x(t),u_y(t),t)+f(u_x(t),u_y(t),t)s_i(u_x(t),u_y(t),t)$$

Subsequently, different two expressions in the k polynomials are subjected to subtraction to calculate a plurality of polynomials $g_j(t)$.

$$g_j(t)=f(u_x(t),u_y(t),t)\{s_a(u_x(t),u_y(t),t)-s_b(u_x(t),u_y(t),t)\} \quad (8)$$

where $1 \leq a \neq b \leq k$.

Then, the greatest common divisor $\phi(t)$ of the plurality of polynomials $g_j(t)$ is obtained, and this expression is factorized to extract a factor $f(u_x(t),u_y(t),t)$ having deg $f(u_x(t),u_y(t),t)$ as a degree. Here, such a factor is not necessarily uniquely obtained. However, when the correct factor $f(u_x(t),u_y(t),t)$ is obtained, dividing any $h_i(t)$ ($i=1 \ldots k$) by the factor $f(u_x(t),u_y(t),t)$ under the condition (6) enables extracting a plaintext polynomial candidate $m(u_x(t),u_y(t),t)$ which is correct as a residual.

When the correct plaintext polynomial candidate $m(u_x(t),u_y(t),t)$ is obtained, a plaintext m is derived by using the following means. A coefficient $m_{ijk}$ of the following plaintext polynomial $m(x,y,t)$ is determined as a variable:

$$\sum_{i,j,k} m_{ijk} x^i y^j t^k$$

That is, $m_{ijk}$ is determined as the variable, and the following expression is provided:

$$m(x, y, t) = \sum_{(i,j,k)\in\Gamma_m} m_{ijk} x^i y^j t^k$$

Since the plaintext candidate polynomial $m(u_x(t),u_y(t),t)$ is equal to $m_{ijk}u_x(t)^i u_y(t)^j t^k$, a simultaneous linear equation having $m_{ijk}$ as the variable can be obtained based on comparison with the coefficient $t^k$.

In fact, a variable other than $m_{ijk}$ on both sides of the following expression is t alone:

$$m(u_x(t),u_y(t),t)=m_{ijk}u_x(t)^i u_y(t)^j t^k$$

Coefficients of the variable t are compared based on the following expression:

$$\sum_{0\leq\tau\leq K} c_\tau t^\tau = \sum_{0\leq\tau\leq K} a_\tau(\ldots, m_{ijk}, \ldots) t^\tau$$

As a result, the following simultaneous linear equation can be obtained:

$$a_\tau(\ldots, m_{ijk}, \ldots)=c_\tau (1\leq\tau\leq K)$$

Solving this equation can obtain $m_{ijk}$. Here, $m_{ijk}$ may not be uniquely determined depending on a relationship between the number of expressions and the number of variables. This problem is solved by a method of determining a frame of a plaintext polynomial as one of the public keys, which will be explained in detail in a section of a key generation technique.

Here, the error detecting code embedded in the plaintext is used to confirm whether the obtained plaintext is correct.

However, when a plurality of candidates for the discriminant polynomial $f(u_x(t),u_y(t),t)$ are present, the plaintext obtained here is not necessarily a true plaintext. Thus, the error detecting code is used to check the extracted plaintext based on the above-described technique, and a candidate which has passed the check (i.e., which has not been determined as an error by the error detecting code) is determined as the plaintext.

On the other hand, when a factor that is not the discriminant polynomial $f(u_x(t),u_y(t),t)$ is extracted, an erroneous plaintext m' is restored by the same arithmetic operation as explained above, and the error detecting code or the like previously embedded in the plaintext can be used to find this error.

In the decryption processing, although a plurality of candidates for the factor appear, the decryption scheme according to this embodiment is more efficient than the decryption scheme disclosed in AG08. That is because the decryption scheme disclosed in AG08 is constituted of two encrypted texts $F_1$ and $F_2$, one subtraction result $g_1(t)=h_1(t)-h_2(t)$ alone is derived, and hence the maximum common expression cannot be calculated. Therefore, factorizing $g_1(t)$ itself is the only solution. In general, since a degree of $g_1(t)$ is higher than a degree of the greatest common divisor $\phi(t)$, the factorization processing takes time. Further, since the number of factors as a result of the factorization is large, the factor extraction processing takes time. In particular, since the latter factor extraction processing extracts polynomials having deg $f(u_x(t),u_y(t),t)$ as a degree, many combinations are produced like the following example.

For example, when deg $f(u_x(t),u_y(t),t)=5$, the following expression is set:

$$g_1(t)=(t^3+1)(t^2+t+1)t(t+1)(t+2)(t+3)(t+4)$$

Since types of the degrees are 3, 2, 1, 1, 1, 1, and 1, the following can be considered as combinations of the degrees:

5=3+2,3+1+1,2+1+1+1,1+1+1+1+1

This problem generally becomes a partial sum problem of obtaining a partial sum having a predetermined value from a numerical sequence, and hence it is a very difficult problem. Therefore, in the encryption scheme disclosed in AG08, the calculation is sufficiently possible, but executing the arithmetic operation at a high speed is impossible (depending on a factor extraction result).

On the other hand, since the decryption scheme according to this embodiment uses three or more encrypted texts Fi (i= 1 . . . k) in the encryption scheme, a plurality of subtraction results gj(t) (j=1, . . . , L) can be derived, and a polynomial having a lower degree can be obtained from the greatest common divisor φ(t) of these results, thereby performing decryption at a higher speed than the encryption scheme disclosed in AG08.

It is to be noted that the greatest common divisor can be calculated based on an arithmetic operation called an Euclidean algorithm here, and this arithmetic operation can be executed at a very high speed. Furthermore, since the polynomial as a target of the factorization is a one-variable polynomial, it is known that the factorization is easy and the processing can be performed within a sufficiently effective time.

Meanwhile, when a plurality of candidates for the discriminant polynomial $f(u_x(t), u_y(t), t)$ are present, the plaintext obtained here is not necessarily a true plaintext. Thus, the error detecting code is used to check plaintexts extracted from all the candidates for the discriminant polynomial $f(u_x(t), u_y(t), t)$ by the above-described technique, and a candidate which has passed the check (i.e., which has not been determined as an error by the error detecting code) is determined as the plaintext.

When there is no candidate which has passed this examination, which case is processed as a decryption failure. Although such a case is impossible in theory, it may possibly occur when an incorrect encrypted text is received for any reason, e.g., miscalculation on a transmission side or falsification in a transmission path.

Finally, the key generation method according to this embodiment will now be described. The key generation method according to this embodiment includes generation of an algebraic surface and parameters, generation of a frame of a discriminant polynomial, and generation of a frame of a plaintext polynomial which are executed in this order.

A technique of generating an algebraic surface and parameters will be first described. Inputs in this generation method are system parameters p, d, $\deg_t X'$, and $\Lambda_x$. Here, $\deg_t X'$ is a degree of a polynomial $X'(=X-a_{00}(t))$ obtained by excluding a constant term from an algebraic surface X. They are parameters of the algebraic surface as the public key and selected in such a manner that a section obtaining problem becomes sufficiently difficult. A technique of generating an algebraic surface will be first described. An algebraic surface is generated by randomly selecting a section D and calculating a fibration associated with this section.

First, based on the system parameters p, d, $\deg_t X'$, and $\Lambda_x$, a coefficient $a_{ij}(t)$ (where (i,j) is included in $\Lambda_x$) other than a constant term $a_{00}(t)$ in the following fibration of an algebraic surface is randomly determined in the range of the degree $\deg_t X'$ or below:

$$X(x, y, t) = \sum_{(i,j) \in \Lambda_X} a_{ij}(t) x^i y^j$$

Then, the constant term $a_{00}(t)$ is determined based on the following expression:

$$a_{00}(t) = - \sum_{(i,j) \in \Lambda_X - \{(0,0)\}} a_{ij}(t) u_x(t)^i u_y(t)^j$$

Moreover, $\deg_t X$ is determined based on the following expression:

$$\deg_t X = \max\{\deg_t X', \deg a_{00}(t)\}$$

A technique of generating parameters of a discriminant polynomial and a plaintext polynomial will now be described. First, parameters $\deg_t f$ and $\Lambda_f$ of a discriminant polynomial are randomly generated based on $\deg_t X$ and $\Lambda_X$ in the range of the condition (4). Then, $\Lambda_f \Lambda_X$ is calculated, and a coefficient set $\Lambda_m$ of a plaintext polynomial is determined to satisfy a subset thereof and the condition (4). Here, when the coefficient set $\Lambda_m$ satisfying the condition (4) is not present, the processing is again performed from generation of the parameters $\deg_t f$ and $\Lambda_f$. Then, $\deg_t m$ is determined in the range of the following expression:

$$\deg_t X < \deg_t m < \deg_t f$$

Here, when $\deg_t m$ satisfying the condition is not determined since, e.g., $\deg_t f = (\deg_t X) + 1$, the processing is again performed from determination of $\deg_t f$ and $\Lambda_f$.

This is the end of the description on the method of generating the algebraic surface and the parameters.

A technique of generating a frame of a discriminant polynomial will now be described. A frame of a discriminant polynomial is generated by determining $\deg f_{ij}(t)$ with respect to each element (i,j) included in the coefficient set $\Lambda_f$. However, $\deg f_{ij}(t) = \deg_t f$ is determined when the element (i,j)= ($\deg_x f, \deg_y f$), and $\deg f_{ij}(t)$ is randomly generated in the range of $0 \leq \deg f_{ij}(t) \leq \deg_t f$ in other cases. In this manner, a frame $FR_f$ of a discriminant polynomial is determined.

A technique of generating a frame of a plaintext polynomial will now be described. Since the algebraic surface has been already generated, a frame $FR_X$ of the algebraic surface is derived by extracting a degree $\deg a_{ij}(t)$ of coefficients associated with the coefficient set $\Lambda_X$ and the element (i,j) of $\Lambda_X$ from this algebraic surface. Then, $FR_g(=FR_f FR_X)$ is calculated from the respective frames $FR_f$ and $FR_X$. Here, the coefficient set $\Lambda_m$ is a subset of a coefficient set $\Lambda_g(=\Lambda_X \Lambda_f)$ associated with this frame $FR_g$. Thus, the degree $\deg m_{ij}(t)$ of the coefficient associated with the element (i,j) included in the coefficient set $\Lambda_m$ is determined as $\deg m_{ij}(t) = \min\{\deg_t m, \deg g_{ij}(t)\}$. As a result, the condition (4) can be realized.

An important point in the generation of the plaintext polynomial m(x,y,t) is giving a unique solution to a simultaneous linear equation formed based on a section. Therefore, the following processing is executed based on a section $(x,y,t) = (u_x(t), u_y(t), t)$ of the generated algebraic surface. First, as explained above, the section is assigned to a predetermined frame $FR_m$ to derive the following expression:

$$m(x, y, t) = \sum_{(i,j,k) \in \Gamma_m} m_{ijk} u_x(t)^i u_y(t)^j t^k$$

When this expression is organized with respect to t, a simultaneous linear equation is obtained by comparison of coefficients thereof.

$$A \begin{pmatrix} m_{000} \\ m_{0001} \\ m_{002} \\ \vdots \\ m_{ijk} \\ \vdots \end{pmatrix} = \begin{pmatrix} c_0 \\ c_1 \\ c_2 \\ \vdots \\ c_K \end{pmatrix}$$

where $c_0, c_1, \ldots, c_K$ are coefficients of a variable $t^\tau$ in the following expression produced in the decryption processing and they are a source of the finite field $F_p$:

$$m(u_x(t), u_y(t), t) = \sum_{\tau=0}^{K} c_\tau t^\tau$$

Additionally, in a case where a variable $m_{ijk}$ is represented as a Kth element in a variable vector $(m_{000}, m_{001}, \ldots, m_{ijk}, \ldots)$, a matrix A is a matrix that a coefficient is represented with respect to a component $(\tau, K)$ in the matrix A when $m_{ijk}$ as the coefficient of $t^\tau$ appears as a non-zero source and 0 is represented with respect to the component $(\tau, K)$ when it does not appear. That is, with respect to the variable vector the following $(m_{000}, m_{001}, m_{002}, m_{010}, m_{011}, m_{012})$, expression is provided:

$$\begin{cases} m_{000} + 3m_{001} + 2m_{010} = c_0 \\ 2m_{001} + m_{002} + m_{011} = c_1 \\ 3m_{000} + 2m_{011} + m_{012} = c_2 \end{cases}$$

In this case, the following expression can be achieved:

$$A = \begin{pmatrix} 1 & 3 & 0 & 2 & 0 & 0 \\ 0 & 2 & 1 & 0 & 1 & 0 \\ 3 & 0 & 0 & 0 & 2 & 1 \end{pmatrix}$$

Meanwhile, a necessary and sufficient condition that this simultaneous linear equation must have a unique solution no mater what the produced coefficients $c_0, c_1, \ldots, c_K$ are is that a dimension number of the variable vector $(m_{000}, m_{001}, m_{002}, m_{010}, m_{011}, m_{012})$ becomes equal to a rank of the matrix A based on the theory of linear algebra.

Therefore, when a rank of the matrix A is calculated and the rank does not coincide with a dimension number of the variable vector, a constant number such as 0 is assigned to $m_{ijk}$ associated with a high degree of t to gradually reduce the number of variables, thereby achieving the uniqueness. Actually, since the simultaneous linear equation has a solution, the rank of the matrix A generated in this embodiment does not exceed the dimension number of the variable vector. That is because, when the rank exceeds the dimension number of the variable vector, the corresponding simultaneous linear equation does not have a solution based on the theory of linear algebra. Thus, to conform the rank to the dimension number of the variable vector, adjustment of gradually reducing the dimension number of the variable vector must be carried out. Here, since the plaintext cannot be embedded in the variable $m_{ijk}$ determined as 0, a maximum value of k in $m_{ijk}$ that can be a non-zero value in each (i,j) is determined as a degree of $m_{ij}(t)$. As a result, a frame of the plaintext polynomial is determined. However, any higher term in $m_{ij}(t)$ must be determined as a non-zero value to meet the condition (4).

Now, both the description on the technique of determining a frame of the plaintext polynomial and the description on the key generation technique are terminated.

<Variations of First Embodiment>

Several variations of this embodiment will be finally described. Although respective variations can be simultaneously carried out in arbitrary combinations, an example where each variation is individually carried out will be described for the convenience's sake. It is to be noted that a simple representation r(x,y,t) is used in a common event where $r_i(x,y,t)$ (i=1, ..., k) does not have to be discriminated, and a simple representation s(x,y,t) is used in a common event where $s_i(x,y,t)$ (i=1, ..., k) does not have to be discriminated in the following description. Such representations are likewise applied to the encrypted text $F_i(x,y,t)$.

A first variation is a variation concerning a modification of Expression (7) that generates an encrypted text in the encryption processing. For example, encryption/description can be executed even if Expression (7) is modified as follows:

$$F(x,y,t) = m(x,y,t) - f(x,y,t)s(x,y,t) - X(x,y,t)r(x,y,t)$$

The expression for the encryption can be modified without departing from the spirit of the present invention, the decryption processing can be thereby changed, and such changes are included in the scope of the present invention.

A second variation is a scheme of determining the discriminant polynomial f(x,y,t) as an irreducible polynomial in the encryption processing.

Although a restriction of an irreducible polynomial is not provided to the discriminant polynomial in this embodiment, not only the irreducible polynomial has a possibility that $f(u_x(t), u_y(t), t)$ is extracted as an irreducible polynomial based on the factorization from $f(u_x(t), u_y(t), t)\{s_1(u_x(t), u_y(t), t) - s_2(u_x(t), u_y(t), t)\}$ which can be calculated from two one-variable polynomials obtained by assigning the section to two encrypted texts but also the number of factors is stochastically reduced, thus facilitating extraction of $f(u_x(t), u_y(t), t)$.

A third variation is a scheme of also embedding the plaintext m in the discriminant polynomial f(x,y,t) in the encryption processing. Although the scheme of randomly generating the discriminant polynomial has been described in the foregoing embodiment, since the public key cryptography according to this embodiment has properties that obtaining f(x,y,t) without a private key is difficult, the scheme of also embedding plaintext information in the discriminant polynomial can be realized. Contrary, when embedding a plaintext in f(x,y,t) like this variation, there can be obtained an effect that a plaintext having a larger size can be encrypted at a time. However, when this variation is carried out together with the second variation, f(x,y,t) as a result of embedding must be determined as an irreducible polynomial, and hence specific coefficients must be preset so that random coefficients are embedded in these coefficients. Since very many irreducible polynomials are present, even if a plaintext is embedded in some of coefficients, the irreducible polynomials can be obtained in most cases.

A fourth variation is a scheme of generating random polynomials s(x,y,t) and r(x,y,t) in the encryption processing in such a manner that a term f(x,y,t)s(x,y,t) and a term X(x,y,t)r(x,y,t) include the same similar terms as polynomials of x and y and degrees of one-variable polynomials having a variable t that becomes a coefficient of these terms can coincide with each other. According to this variation, since the term f(x,y,t)s(x,y,t) and the term X(x,y,t)r(x,y,t) cannot be distinguished from each other in an encrypted text, security can be improved. Further, in a case where m(x,y,t) is likewise considered as a polynomial of x and y, m(x,y,t) cannot be distinguished from the term X(x,y,t)r(x,y,t) when m(x,y,t) is included in the similar term of X(x,y,t)r(x,y,t) (or f(x,y,t)s(x,y,t)) and a degree of coefficients thereof is lower than a degree of the similar term included in the X(x,y,t)r(x,y,t), thus improving security.

A fifth variation is associated with a case where two or more correct plaintexts are calculated in the decryption processing. In this embodiment, the greatest common divisor $\phi(t)$ is factorized, and factors are combined in such a manner that a degree precisely becomes deg $f(u_x(t),u_y(t),t)$, thereby obtaining candidates for the discriminant polynomial $f(u_x(t), u_y(t),t)$. Then, a plaintext candidate M associated with these candidates is calculated, whether this plaintext candidate is correct is judged by using an error detecting code included in the plaintext candidate M, and the processing is stopped to output a plaintext when it is determined that the plaintext candidate is correct. On the other hand, in this variation, plaintext candidates are calculated from all the discriminant polynomials, the above-described examination is performed, and a plaintext candidate which has been successful in the examination (i.e., from which an error has not been detected by using the error detecting code) alone is recorded.

At this time, when the processing involved in all the discriminant polynomial candidates is terminated, a situation where the plurality of candidates are present or the number of candidates is zero is handled as a decryption failure. When such a configuration is adopted, it is possible to provide against an error in a case where two or more plaintexts are calculated due to a low capability of the error detecting code or accidental coincidence.

A sixth variation is a scheme of unitizing a plurality of sections in the decryption processing. Although one section alone is used in this embodiment, utilizing a plurality of sections enables calculating a correct plaintext without using the error detecting code. When the plurality of sections are utilized, the decryption processing according to this embodiment can be executed in accordance with each section, and a plaintext that is a common part in a set of output plaintext candidates can be output as a correct plaintext. On the other hand, (although stochastically negligible) the following expression can be provided in the decryption operation depending on a section and even a single plaintext candidate may not be possibly obtained:

$$s_i(u_x(t),u_y(t),t)-s_j(u_x(t),u_y(t),t)=0$$

In such a case, this variation is useful. It is to be noted that this variation can be carried out together with the fifth variation.

Here, a technique of generating an algebraic surface having a plurality of sections to realize the sixth variation must be described. A key generation technique of generating an algebraic surface having two sections $D_1$ and $D_2$ will now be explained hereinafter.

This key generation is carried out by randomly selecting the sections $D_1$ and $D_2$ and calculating a fibration associated therewith. However, to provide the generated algebraic surface with the two sections at the same time, the following ingenuity must be exercised. The (fibration of) algebraic surface is represented by the following expression:

$$X(x, y, t) = \sum_{(i,j)\in \Lambda_x} a_{ij}(t) x^i y^j$$

Here, the sections $D_1$ and $D_2$ are represented as follows:

$$D_1: (x,y,t)=(u_x(t),u_y(t),t),$$

$$D_2: (x,y,t)=(v_x(t),v_y(t),t)$$

These sections are assigned to the algebraic surface X to obtain the following expressions:

$$\Sigma_{(i,j)} a_{ij}(t) u_x(t)^i u_y(t)^j = 0$$

$$\Sigma_{(i,j)} a_{ij}(t) v_x(t)^i v_y(t)^j = 0$$

When these expressions are subjected to subtraction, a constant term $a_{00}(t)$ which is common to both expressions is eliminated, and Expression (10) is obtained:

$$a_{10}(t)(u_x(t) - v_x(t)) = - \sum_{(i,j)\neq (0,0),(1,0)} a_{ij}(t)(u_x(t)^i u_y(t)^j - v_x(t)^i v_y(t)^j) \quad (10)$$

Here, $a_{10}(t)$ that serves as a polynomial is generated based on the following relational expression:

$$u_x(t)^i u_y(t)^j - v_x(t)^i v_y(t)^j = (u_x(t)^i - v_x(t)^i) u_y(t)^j + v_x(t)^i (u_y(t)^j - v_y(t)^j) \quad (11)$$

In this case, setting the following expression can suffice:

$$u_x(t)-v_x(t) | u_y(t)-v_y(t)$$

(where the notation A|B means that B is dividable by A, i.e., B is a multiple (a multiple equation) of A.) This is apparent from Expression (11) and the following expressions:

$$(u_x(t)-v_x(t))|(u_x(t)^i-v_x(t)^i)$$

$$(u_y(t)-v_y(t))|(u_y(t)^j-v_y(t)^j)$$

Utilizing the above-described relationship enables performing the key generation based on the following algorithm. First, two polynomials that achieve $\lambda_x(t)|\lambda_y(t)$ are randomly selected.

Specifically, to obtain such a pair of polynomials $\lambda_x(t)$ and $\lambda_y(t)$, when d is determined as a maximum degree of a section, $\lambda_x(t)$ having a dth or lower degree can be randomly given, and a random polynomial c(t) having a degree of d-deg $\lambda_x(t)$ or below can be used to calculate $\lambda_y(t)=c(t)\lambda_x(t)$.

Here, $\lambda_x(t)=u_x(t)-v_x(t)$ and $\lambda_y(t)=u_y(t)-v_y(t)$ are assumed. Subsequently, a polynomial $v_x(t)$ is randomly selected, and $u_x(t)$ is calculated based on the following expression:

$$u_x(t)=\lambda_x(t)+v_x(t)$$

Since degrees of $\lambda_x(t)$ and $v_x(t)$ are d or below, a degree of $u_x(t)$ is also d or below.

Likewise, a polynomial $v_y(t)$ is randomly selected, and $u_y(t)$ is calculated based on the following expression:

$$u_y(t)=\lambda_y(t)+v_y(t)$$

Likewise, since degrees of $\lambda_y(t)$ and $v_y(t)$ are d or below, a degree of $u_y(t)$ is d or below.

Then, a coefficient $a_{ij}(t)((i,j)\neq(0,0),(1,0))$ other than $a_{00}(t)$ and $a_{10}(t) \times$ is randomly generated, and $u_x(t)$, $v_x(t)$, $u_y(t)$, and $v_y(t)$ calculated as described above are utilized to calculate $a_{10}(t)$ based on Expression (10). Further, calculating the following expression can obtain the polynomial $a_{00}(t)$:

$$a_{00}(t) = -\sum_{(i,j)\neq(0,0)} a_{ij}(t)(u_x(t)^i u_y(t)^j - v_x(t)^i v_y(t)^j) \quad (12)$$

To obtain an algebraic surface having 3 or more sections, a section represented by the following expression is randomly determined:

$$D_n:(x,y,t)=(u_{x_n}(t),u_{y_n}(t),t)$$

Then, the following factors are generated from the polynomials:

$$(x-u_{x_n}(t)),(y-u_{y_n}(t))$$

Subsequently, multiplication is executed in such a manner that the factors associated with the same n are separately provided on both sides, thereby generating one equation. For example, the following expression is an equation satisfying the above-described conditions, and spreading this equation enables obtaining an algebraic surface as a public key:

$$(x-u_{x_1}(t))(x-u_{x_2}(t))\ldots(x-u_{x_n}(t))=(y-u_{y_n}(t))(y-u_{y_1}(t))\ldots(y-u_{y_2}(t)) \quad (13)$$

On the other hand, in Expression (13), since the factor of x is provided on a right-hand side and a factor of y is provided on a left-hand side, performing the factorization to obtain a section is easy. Thus, for example, it is desirable to generate an algebraic surface as the public key cryptography by randomly and separately providing the factor of x and the factor of y on both sides like the following expression:

$$(x-u_{x_1}(t))(y-u_{y_2}(t))\ldots(x-u_{x_n}(t))=(y-u_{y_1}(t))(x-u_{x_2}(t))\ldots(y-u_{y_n}(t))$$

When the public key and the private key are generated in this manner, the algebraic surface having n or more sections can be generally produced.

A seventh variation is a variation concerning a modification of Expression (7) that generates an encrypted text. For example, the decryption can be executed even though Expression (7) is modified as follows:

$$F_1(x,y,t)=m(x,y,t)+f(x,y,t)s_1(x,y,t)+X(x,y,t)r_1(x,y,t)$$

$$F_2(x,y,t)=f(x,y,t)s_2(x,y,t)+X(x,y,t)r_2(x,y,t)$$

$$F_3(x,y,t)=f(x,y,t)s_3(x,y,t)+X(x,y,t)r_3(x,y,t)$$

At this time, since polynomials $h_2(t)$ and $h_3(t)$ which are obtained by assigning a section to $F_2$ and $F_3$ do not include a term $m(x,y,t)$, the greatest common divisor $\phi(t)$ can be obtained while regarding these polynomials as some of a polynomial $g_j(t)$ (j=1, ..., L) obtained as a result of subtraction processing without performing the subtraction processing, and $m(u_x(t),u_y(t),t)$ can be obtained as a residue when dividing $h_1(t)$ by the greatest common divisor $\phi(t)$. In this manner, when at least one encrypted text includes the term $m(x,y,t)$ and the other encrypted text does not include the term $m(x,y,t)$, the subtraction processing can be omitted, thus increasing a speed. Further, this configuration is also effective when eliminating the addition in the encryption processing.

An eighth variation is a scheme that can realize a further increase in speed by skipping the factorization processing and the factor extraction processing when a degree of the greatest common divisor $\phi(t)$ of $g_j(t)$ (j=1, ..., L) derived in the decryption processing coincides with deg $f(u_x(t),u_y(t),t)$. The coincidence of the degree of $\phi(t)$ and deg $f(u_x(t),u_y(t),t)$ means $f(u_x(t),u_y(t),t)=\phi(t)$, and $m(u_x(t),u_y(t),t)$ that is correct as a residue can be extracted by directly dividing any $h_i(t)$ (i=1, ..., k) by $f(u_x(t),u_y(t),t)$. Although this variation cannot be necessarily always carried out, a probability that deg $\phi(t)$=deg $f(u_x(t),u_y(t),t)$ is attained rises as a size p of a basic field increases, thus leading to an increase in speed. It is to be noted that this variation can be applied to the seventh variation.

(Outline of Second Embodiment)

Although an outline of a second embodiment will now be described, a detailed explanation on the same parts as those in the first embodiment will be omitted, and different parts alone will be mainly explained.

First, in the second embodiment, preconditions such as system parameters, public keys, a private key, frame conditions are the same as those in the first embodiment. Moreover, key generation processing in the second embodiment is the same as that in the first embodiment.

An outline of encryption processing according to the second embodiment will now be described.

In the encryption processing according to the second embodiment, the processing from the beginning to embedding a plaintext in a plaintext polynomial is as described above. Additionally, an error detecting code is as explained above.

However, as different from the first embodiment, the encryption processing according to the second embodiment generates two encrypted texts $F_1(x,y,t)$ and $F_2(x,y,t)$ as follows.

That is, a discriminant polynomial $f(x,y,t)$ in $F_p$ is randomly generated by using a determined frame, then four polynomials $r_1(x,y,t)$, $s_1(x,y,t)$, $r_2(x,y,t)$, and $s_2(x,y,t)$ are randomly generated, and the two encrypted texts $F_1(x,y,t)$ and $F_2(x,y,t)$ are calculated from three-variable polynomials $m(x,y,t)$ and $f(x,y,t)$ and a fibration $X(x,y,t)$ of an algebraic surface X as a public key.

$$F_1(x,y,t)=m(x,y,t)+f(x,y,t)s_1(x,y,t)+X(x,y,t)r_1(x,y,t)$$

$$F_2(x,y,t)=f(x,y,t)s_2(x,y,t)+X(x,y,t)r_2(x,y,t) \quad (7)'$$

In the encryption processing according to the second embodiment, processing of adding the plaintext polynomial $m(x,y,t)$ in the second encrypted text $F_2(x,y,t)$ is reduced as compared with the encryption scheme disclosed in AG08, and hence addition is executed for 3 times and multiplication is performed for 4 times in the entire processing, resulting in a high speed/efficiency.

An outline of decryption processing according to the second embodiment will now be described.

A receiver who has received the encrypted texts $F_1(x,y,t)$ and $F_2(x,y,t)$ utilizes a second D as his/her private key to execute decryption as follows. First, the section D is assigned to the encrypted texts $F_1(x,y,t)$ and $F_2(x,y,t)$. Here, the section D is assigned to the algebraic surface $X(x,y,t)$. It is to be noted that the following relationship is present:

$$X(u_x(t),u_y(t),t)=0,$$

Then, it can be understood that two polynomials $h_1(t)$ and $h_2(t)$ having the following relationships can be obtained:

$$h_1(t)=F_1(u_x(t),u_y(t),t)=m(u_x(t),u_y(t),t)+f(u_x(t),u_y(t),t)s_i(u_x(t),u_y(t),t)$$

$$h_2(t)=F_2(u_x(t),u_y(t),t)=f(u_x(t),u_y(t),t)s_2(u_x(t),u_y(t),t)$$

Then, the polynomial $h_2(t)$ which does not include $m(u_x(t),u_y(t),t)$ is factorized to obtain a factor $f(u_x(t),u_y(t),t)$. Such a factor cannot be necessarily uniquely obtained. However, in the event of extraction of the correct factor $f(u_x(t),u_y(t),t)$, a plaintext polynomial candidate $m(u_x(t),u_y(t),t)$ which is correct as a residue is extracted by dividing the polynomial $h_1(t)$ by the factor $f(u_x(t),u_y(t),t)$ under the condition (6).

When the correct plaintext polynomial candidate $m(u_x(t), u_y(t),t)$ is obtained, subsequent plaintext derivation processing, plaintext inspecting processing, and plaintext output processing are executed like the first embodiment.

In the decryption processing according to the second embodiment, since processing of subtracting the polynomials $h_1(t)$ and $h_2(t)$ each having the section assigned thereto is omitted, a high speed/efficiency can be realized as compared with the decryption scheme disclosed in AG08.

<Variations of Second Embodiment>

Several variations of this embodiment will be finally explained. Although the respective variations can be arbitrarily combined to be simultaneously carried out, an example where each variation is individually carried out will now be described for the convenience's sake. It is to be noted that a simple representation $r(x,y,t)$ is used in case of a common event that $r_i(x,y,t)$ (i=1, . . . , k) does not have to be discriminated and a simple representation $s(x,y,t)$ is used in case of a common event that $s_i(x,y,t)$ (i=1, . . . , k) does not have to be discriminated in the following description.

A first variation is a variation concerning a modification of Expression (7)' that generates an encrypted text in the encryption processing. For example, encryption/decryption can be executed even if Expression (7)' is modified as follows:

$$F_1(x,y,t)=m(x,y,t)-f(x,y,t)s_1(x,y,t)-X(x,y,t)r_1(x,y,t)$$

$$F_2(x,y,t)=f(x,y,t)s_2(x,y,t)-X(x,y,t)r_2(x,y,t)$$

It is to be noted that, in the decryption processing, the polynomials $h_1(t)$ and $h_2(t)$ each having the section assigned thereto becomes as follows:

$$h_1(t)=F_1(u_x(t),u_y(t),t)=m(u_x(t),u_y(t),t)-f(u_x(t),u_y(t),t)s_1(u_x(t),u_y(t),t)$$

$$h_2(t)=F_2(u_x(t),u_y(t),t)=f(u_x(t),u_y(t),t)s_2(u_x(t),u_y(t),t)$$

The expressions for encryption can be modified without departing from the spirit of the present invention in this manner, and the decryption processing can be thereby changed, which is included in the scope of the present invention.

A second variation is a scheme that determines the discriminant polynomial $f(x,y,t)$ as an irreducible polynomial in the encryption processing.

Although a restriction of an irreducible polynomial is not provided to the discriminant polynomial in this embodiment, not only the irreducible polynomial has a possibility that $f(u_x(t),u_y(t),t)$ is extracted as an irreducible polynomial based on the factorization from the one-variable polynomial $h_2(t)$ obtained by assigning the section to the second encrypted text $F_2(x,y,t)$, but also the number of factors can be stochastically reduced, thereby facilitating extraction of $f(u_x(t),u_y(t),t)$.

A third variation is a scheme of also embedding a plaintext m in the discriminant polynomial $f(x,y,t)$ in the encryption processing. Although the scheme of randomly generating the discriminant polynomial has been described in the foregoing embodiment, the public key cryptography according to this embodiment has properties that obtaining $f(x,y,t)$ without a private key is difficult, and hence the scheme of embedding plaintext information in the discriminant polynomial can be realized. Contrary, when embedding a plaintext in $f(x,y,t)$ like this variation, there can be obtained an effect that a plaintext having a larger size can be encrypted at a time. However, when this variation is carried out together with the second variation, since $f(x,y,t)$ as an embedding result must be determined as an irreducible polynomial, specific coefficients must be preset so that random coefficients can be embedded therein. Since there are very many irreducible polynomials, even if plaintexts are embedded in some of coefficients, the irreducible polynomial can be obtained in most cases.

A fourth variation is a scheme of generating random polynomials $s(x,y,t)$ and $r(x,y,t)$ in such a manner a term $f(x,y,t)s(x,y,t)$ and a term $X(x,y,t)r(x,y,t)$ include the same similar terms as polynomials of x and y and degrees of one-variable polynomials having a variable t which serves as a coefficient in these terms coincide with each other. According to this variation, since the term $f(x,y,t)s(x,y,t)$ and the term $X(x,y,t)r(x,y,t)$ cannot be distinguished from each other in an encrypted text, security can be improved. Further, in a case where $m(x,y,t)$ is likewise considered as a polynomial of x and y, $m(x,y,t)$ cannot be distinguished from the term $X(x,y,t)r(x,y,t)$ when $m(x,y,t)$ is included in the similar term of $X(x,y,t)r(x,y,t)$ (or $f(x,y,t)s(x,y,t)$) and a degree of coefficients thereof is lower than a degree of the similar term included in the $X(x,y,t)r(x,y,t)$, thus improving security.

A fifth variation is associated with a case where two or more correct plaintexts are calculated in the decryption processing. In this embodiment, the polynomial $h_2(t)$ is factorized, and factors are combined so that a degree precisely becomes deg $f(u_x(t),u_y(t),t)$, thereby obtaining each candidate for the discriminant polynomial $f(u_x(t),u_y(t),t)$. Then, a plaintext candidate M associated with this candidate is calculated, an error detecting code included in the plaintext candidate is used to judge whether the plaintext candidate is correct, and the processing is stopped to output a plaintext when it is determined that the plaintext candidate is correct. On the other hand, in this variation, plaintext candidates are calculated from all candidates for the discriminant polynomial, the above-described inspection is performed, and a plaintext candidate which has passed the examination (i.e., from which an error has not been detected by using the error detecting code) alone is recorded.

At this time, when the processing involved in all the candidates for the discriminant polynomial is terminated, a situation where the plurality of candidates are present or no candidate is present is handled as a decryption failure. Adopting such a configuration enables providing against an error when two or more plaintexts are calculated due to, e.g., a low capability of the error detecting code or accidental coincidence.

A sixth variation is a scheme that utilizes a plurality of sections in the decryption processing. Although this embodiment utilizes one section alone, adopting a plurality of sections enables calculating a correct plaintext without using the error detecting code. When a plurality of sections are used, the decryption processing according to this embodiment is executed in accordance with each section, and a plaintext as a part common in a set of output plaintext candidates can be output as a correct plaintext. On the other hand, (although stochastically substantially negligible) in the description operation, the following expression can be obtained depending on a section:

$$s_2(u_x(t),u_y(t),t)=0$$

A plaintext candidate may not be possibly obtained at all. This variation is useful even in such a case. It is to be noted that this variation can be carried out together with the fifth variation.

Here, a technique of generating an algebraic surface having a plurality of sections to realize the sixth variation is the same as the technique in the sixth variation of the first embodiment. Further, a key generation technique of generating an algebraic surface having two sections $D_1$ and $D_2$ is likewise the same as the technique in the sixth variation of the first embodiment.

<Examination of Security>

The security of the public key cryptography configured in each of the first and second embodiments will now be considered.

[1] Round Robin Attack

Respective elements m(x,y,t), f(x,y,t), s(x,y,t), and r(x,y,t) constituting an encrypted text F(x,y,t) are determined as follows with $m_{ijk}$, $f_{ijk}$, $s_{ijk}$, and $r_{ijk}$ being used as variable:

$$m(x, y, t) = \sum_{(i,j,k) \in \Gamma_m} m_{ijk} x^i y^j t^k$$

$$f(x, y, t) = \sum_{(i,j,k) \in \Gamma_f} f_{ijk} x^i y^j t^k$$

$$s(x, y, t) = \sum_{(i,j,k) \in \Gamma_s} s_{ijk} x^i y^j t^k$$

$$r(x, y, t) = \sum_{(i,j,k) \in \Gamma_r} r_{ijk} x^i y^j t^k$$

An attack that compares these elements with the encrypted text F(x,y,t) to generate the system of multivariate simultaneous equations and solves this system can be considered. In this case, however, r(x,y,t) is regarded as a polynomial of x and y, many terms are included, and degrees of polynomials serving as coefficients of the respective terms when regarded as polynomials of x and y are sufficiently increased. As a result, the number of variables is increased so that a solution cannot be readily obtained. For example, at present, a system of multivariate equations having approximately 100 variables is very difficult to be solved by the current computer throughput and processing technique. Thus, increasing degrees of terms or coefficients so that the number of variables exceeds 100 can avoid this attack.

[2] Reduction Attack

In the public key cryptography according to this embodiment, the algebraic surface X(x,y,t) alone is disclosed. Thus, whether m(x,y,t)+f(x,y,t)s(x,y,t) cannot be obtained as a residue produced when dividing the encrypted text F(x,y,t) by X(x,y,t) must be examined. However, in the case of a division of three-variable polynomials, a residue cannot be uniquely determined. That is because a divisional theory cannot be achieved in a polynomial having two or more variables as explained in a reference document (D. Cox, et al., "Ideals, Varieties, and Algorithms (Volume 1)", Springer (200), p. 94, Example 4).

[3] Assignment Attack

[3-1] Attack of Assigning Algebraic Curve on Algebraic Surface

An algebraic curve (including a section) has ω as a parameter, and can be represented as Expression (14):

$$(x,y,t) = (u_x(\omega), u_y(\omega), u_t(\omega)) \quad (14)$$

If an element included in an algebraic surface X(x,y,t) can be found from such a curve, this element can be assigned in place of the section, and the decryption can be thereby carried out by the same technique as that of the decryption using the section. Here, finding such an algebraic curve is equivalent to or more difficult than finding the given section based on the calculation. Attention is paid to deg $u_t(\omega)$ to classify such a curve.

When deg $u_t(\omega) \geq 2$

In this case, a general factor is provided, which does not become a threat because of a difficulty in a factor obtaining problem.

When deg $u_t(\omega)=1$

When this problem is solved, the section can be obtained by linear transformation, and hence obtaining such an algebraic surface is difficult on the assumption that the section obtaining problem is difficult.

When deg $u_t(\omega)=0$

This is called a singular fiber, and it is present on almost all algebraic surfaces. However, this corresponds to a special case of a general factor obtaining problem, and an efficient solving method is not known.

[3-2] Attack of Assigning Algebraic Curve outside Algebraic Surface

An algebraic curve outside an algebraic surface can be also represented as Expression (14), and it is $X(u_x(\omega), u_y(\omega), u_t(\omega)) \neq 0$. Therefore, the following expression can be obtained:

$$F(u_x(\omega), u_y(\omega), u_t(\omega)) = m(u_x(\omega), u_y(\omega), u_t(\omega)) + f(u_x(\omega), u_y(\omega), u_t(\omega))s(u_x(\omega), u_y(\omega), u_t(\omega)) + X(u_x(\omega), u_y(\omega), u_t(\omega))r(u_x(\omega), u_y(\omega), u_t(\omega))$$

However, since $X(u_x(\omega), u_y(\omega), u_t(\omega))$ is known here, an attack of reducing $F(u_x(\omega), u_y(\omega), u_t(\omega))$ by $X(u_x(\omega), u_y(\omega), u_t(\omega))$ can be considered. This is possible since the number of variables is one. However, based on the conditions (4) and (5), a degree of $m(u_x(\omega), u_y(\omega), u_t(\omega)) + f(u_x(\omega), u_y(\omega), u_t(\omega)) s(u_x(\omega), u_y(\omega), u_t(\omega))$ is larger than a degree of $X(u_x(\omega), u_y(\omega), u_t(\omega))$, thereby making it difficult to obtain a correct residue.

[3-3] Attack of Assigning Rational Point on Algebraic Surface

There is an attack of assigning a rational point (a point where X(x,y,t)=0 is achieved) on the algebraic surface X(x, y,t). That is, $m_{ijk}$, $f_{ijk}$, and $s_{ijk}$ are determined as unknown numbers, and a plaintext polynomial is set as follows:

$$m(x, y, t) = \sum_{(i,j,k) \in \Gamma_m} m_{ijk} x^i y^j t^k$$

$$f(x, y, t) = \sum_{(i,j,k) \in \Gamma_f} f_{ijk} x^i y^j t^k$$

$$s(x, y, t) = \sum_{(i,j,k) \in \Gamma_s} s_{ijk} x^i y^j t^k$$

It is known that K rational points $(x_i, y_i, t_i)$ on an algebraic surface $X_t(x,y,t)$ (as a public key) can be relatively easily obtained in massive numbers (irrespective of types of algebraic surfaces). Therefore, assigning these rational points to the cipher text F(x,y,t) can acquire the following relational expression in large numbers:

$$F(x_i, y_i, t_i) = m(x_i, y_i, t_i) + f(x_i, y_i, t_i)s(x_i, y_i, t_i)$$

Here, K means $F_p$ and its extension field.

Simultaneously achieving these relational expressions may possibly solve m(x,y,t). However, f(x,y,t) and s(x,y,t) are random polynomials. In particular, f(x,y,t)s(x,y,t) includes all similar terms contained in X(x,y,t)r(x,y,t), and coefficients in respective terms have the same degree. Therefore, sufficiently increasing the degree of each coefficient in r(x,y,t) necessarily makes the degree of each coefficient in s(x,y,t) high so that the simultaneous equations can not be solved, and hence a calculation is practically impossible. Therefore, such an attack is not a threat for the public key cryptography according to the present invention.

On the other hand, when a factor of $s_i(x,y,t)$ is eliminated from the encrypted text, the following simultaneous equation can be obtained:

$$F_1(x_i, y_i, t_i) = m(x_i, y_i, t_i) + f(x_i, y_i, t_i)$$

Solving the linear simultaneous equation enables relatively easily obtaining a coefficient. For this reason, the factor s(x, y, t) is present.

Further, when an element of the discriminant polynomial f(x,y,t) is eliminated from a cipher text, the following expression can be obtained based on this attack:

$$F_1(x_i, y_i, t_i) = m(x_i, y_i, t_i) + s_1(x_i, y_i, t_i)$$

The plaintext polynomial m(x,y,t) can be further easily obtained. For this reason, an element including the discriminant polynomial f(x,y,t) is present.

As explained above, the public key cryptography according to each embodiment is resistant to attacks. That is (conversely), each constituent element is set so that the public key cryptography according to each embodiment has resistance properties.

(Specific Structure of First Embodiment)

A first Embodiment according to the present invention will now be described. FIG. 2 is an overall block diagram of an encryption apparatus according to the first embodiment of the present invention, and FIG. 3 is an overall block diagram of a decryption apparatus according to the first embodiment. FIG. 4 is an overall block diagram of a key generation apparatus according to the first embodiment.

It is to be noted that each of an encryption apparatus 100, a decryption apparatus 200, and a key generation apparatus 300 explained below can be realized by using a hardware structure or a combined structure of a hardware resource and software. As software in the combined structure, a program that is installed in a computer in a corresponding apparatus from a network or a storage medium 1, 2, or 3 in advance to realize a function of the corresponding apparatus is used. This configuration is also applied to each of the following embodiments and variations.

Here, as shown in FIG. 2, in the encryption apparatus 100, a parameter storage unit 101, a memory 102, an input unit 103, a plaintext embedding unit 104, an encrypting unit 105, a discriminant polynomial generating unit 106, a polynomial generating unit 107, a random value generating unit 108, a polynomial arithmetic unit 109, and an output unit 110 are connected with each other through a bus 111.

The parameter storage unit 101 is a memory having information that can be read from the encrypting unit 105, and stores a characteristic p of a prime field as a system parameter.

The memory 102 is a storage apparatus from/into which information can be read/written by the respective units 103 to 109.

The input unit 103 has a function of transmitting frames $\Lambda_m$ and deg $m_{ij}(t)$ and a plaintext m of a plaintext polynomial input from the outside to the plaintext embedding unit 104 and a function of transmitting public keys X(x,y,t), $\Lambda_m$, $\Lambda_f$, deg $m_{ij}(t)$, and deg $f_{ij}(t)$ to the encrypting unit 103.

The plaintext embedding unit 104 has a function of embedding a plaintext m in a coefficient of a plaintext polynomial m(x,y,t) based on a frame of a plaintext polynomial and the plaintext m received from the input unit 103, and a function of transmitting an obtained plaintext polynomial m(x,y,t) to the encrypting unit 105.

The encrypting unit 105 has a function of controlling the respective units 102 and 106 to 109 to execute operations at ST5 to ST8 in FIG. 5 based on the public keys received from the input unit 103 and the parameter p in the parameter storage unit 101.

The discriminant polynomial generating unit 106 has a function of randomly generating a discriminant polynomial f(x,y,t) based on the frame of the discriminant polynomial f(x,y,t) received from the encrypting unit 105 and the parameter p and a function of transmitting the obtained discriminant polynomial f(x,y,t) to the encrypting unit 105.

The polynomial generating unit 107 has a function of repeatedly issuing a request to output a random value with respect to the random value generating unit 108 upon receiving an instruction of generating three or more pairs of polynomials $r_i(x,y,t)$ and $s_i(x,y,t)$ (i=1, ..., k) from the encrypting unit 105 and generating 2k polynomials $r_i(x,y,t)$ and $s_i(x,y,t)$ (i=1, ..., k) by utilizing the obtained random value, and a function of transmitting the generated polynomials $r_i(x,y,t)$ and $s_i(x,y,t)$ (i=1, ..., k) to the encrypting unit 105.

The random value generating unit 108 has a function of generating a random value in response to the output request received from the polynomial generating unit 107 and transmitting this random value to the polynomial generating unit 107.

The polynomial arithmetic unit 109 executes a polynomial arithmetic operation based on a polynomial received from the encrypting unit 105 and an instruction of calculating this polynomial and transmitting an arithmetic operation result to the encrypting unit 105.

The output unit 110 has a function of outputting an encrypted text $F_i(x,y,t)$ (i=1, ..., k) received from the encrypting unit 105.

As shown in FIG. 3, in the decryption apparatus 200, a parameter storage unit 201, a memory 202, an input unit 203, a decrypting unit 204, a section assignment unit 205, a one-variable polynomial arithmetic unit 206, a greatest common divisor arithmetic unit 207, a one-variable polynomial factorizing unit 208, a one-variable polynomial residue arithmetic unit 209, a simultaneous linear equation solution obtaining unit 210, a plaintext inspecting unit 211, and an output unit 212 are connected with each other through a bus 213.

The parameter storage unit 201 is a memory whose information can be read from the decrypting unit 204 and stores a characteristic p of a prime field as a system parameter.

The memory 202 is a storage apparatus from/into which information can be read/written by the respective units 203 to 211.

The input unit 203 has a function of transmitting an encrypted text $F_i(x,y,t)$ (i=1, ..., k) input from the outside, a public key x(x,y,t), and a section D to the decrypting unit 204.

Figure 6:
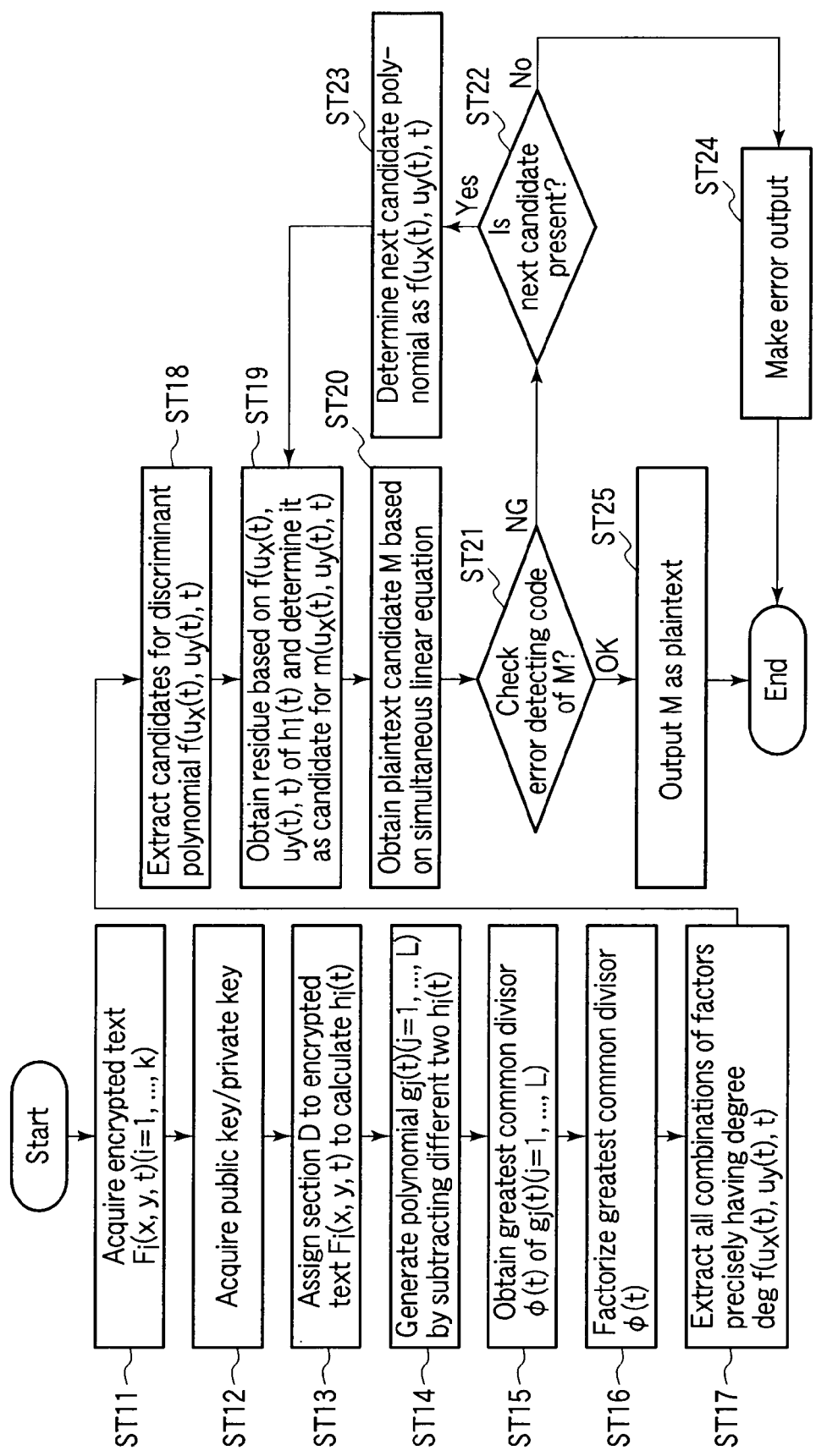
FIG. 6 is a flowchart of the decryption apparatus according to the first embodiment.

The decrypting unit 204 has a function of controlling the respective units 202 and 205 to 212 to execute operations at ST13 to ST25 in FIG. 6 based on the encrypted text $F_i(x,y,t)$ (i=1, ..., k), the public key x(x,y,t), and the section D received from the input unit 204 and the parameter p in the parameter storage unit.

The section assignment unit 205 has a function of assigning the section D to the encrypted text $F_i(x,y,t)$ (i=1, ..., k) to obtain a one-variable polynomial $h_i(t)$ (i=1, ..., k) upon receiving the encrypted text $F_i(x,y,t)$ (i=1, ..., k) and the section D, and a function of transmitting the obtained $h_i(t)$ (i=1, ..., k) to the decrypting unit 204.

The one-variable polynomial arithmetic unit 206 has a function of executing adding/subtracting/multiplying/dividing arithmetic operations with respect a one-variable polynomial received from the section assignment unit 205 or the decrypting unit 204, and a function of transmitting an arithmetic operation result to the decrypting unit 204.

The greatest common divisor arithmetic unit 207 has a function of obtaining the greatest common divisor $\phi(t)$ of a polynomial $g_j(t)$ (j=1, ..., L) upon receiving the polynomial $g_j(t)$ (j=1, ..., L) from the decrypting unit, and a function of transmitting the obtained greatest common divisor $\phi(t)$ to the decrypting unit 204.

The one-variable polynomial factoring unit 208 has a function of factorizing a one-variable polynomial, e.g., the greatest common divisor $\phi(t)$ received from the decrypting unit 204 and a function of transmitting a factorization result to the decrypting unit 204 as an ordered array of factors.

The one-variable polynomial residue arithmetic unit 209 has a function of executing a residue arithmetic operation of a one-variable polynomial as a dividend polynomial and a divisor polynomial received from the decrypting unit 204 and a function of transmitting a residue as an arithmetic result to the decrypting unit 204.

The simultaneous linear equation solution obtaining unit 210 has a function of solving a simultaneous linear equation received from the decrypting unit 204 by using a matrix operation and a function of transmitting an obtained solution to the decrypting unit 204.

The plaintext inspecting unit 211 has a function of inspecting an error detecting code in a plaintext candidate M received from the decrypting unit 204 and a function of transmitting an inspection result to the decrypting unit 204.

The output unit 212 has a function of outputting a plaintext m received from the decrypting unit 204.

As shown in FIG. 4, in the key generation apparatus 300, a fixed parameter storage unit 301, a memory 302, an input unit 303, a control unit 304, a section generating unit 305, a one-variable polynomial generating unit 306, an algebraic surface generating unit 307, a polynomial arithmetic unit 308, a parameter generating unit 309, a frame generating unit 310, a plaintext polynomial generating unit 311, a matrix generating unit 312, a rank arithmetic unit 313, and an output unit 314 are connected with each other through a bus 315.

The fixed parameter storage unit 301 is a memory from which information can be read by the control unit 304, and stores a prime p and a maximum degree d of a section as fixed parameters.

The memory 302 is a storage apparatus from/into which information can be read/written by the respective units 303 to 312.

The input unit 303 has a function of temporarily storing in the memory 302 a degree $\deg_t X'$ of a term other than a constant term of a fibration $X(x,y,t)$ input from the outside and a coefficient set $\Lambda_X$ of two variables x and y in the fibration $X(x,y,t)$ and transmitting the degree $\deg_t X'$ and the coefficient set $\Lambda_X$ in the memory 302 to the control unit 304.

Figure 7:
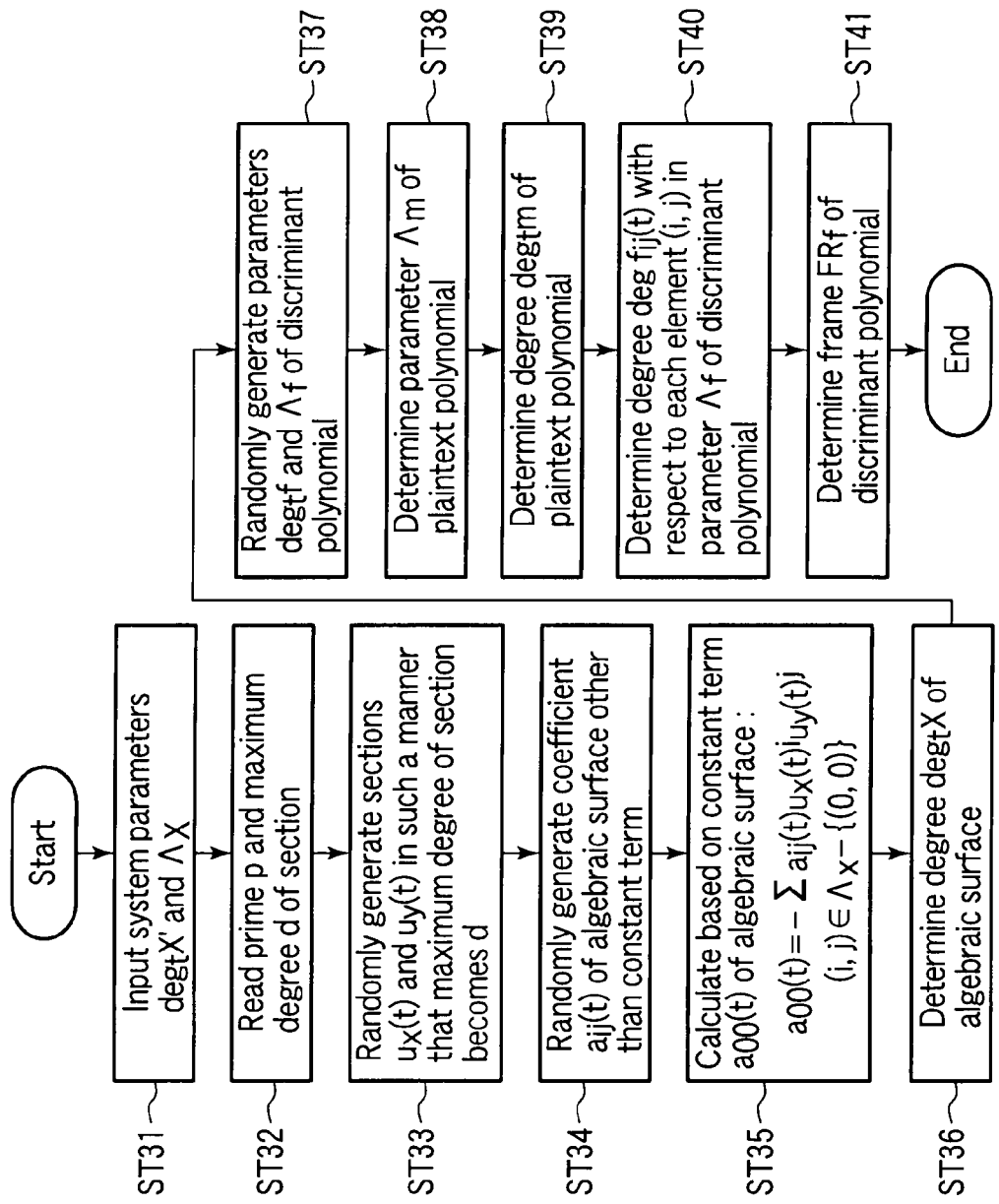
FIGS. 7 and 8 are flowcharts of the key generation apparatus according to the first embodiment.
Figure 8:
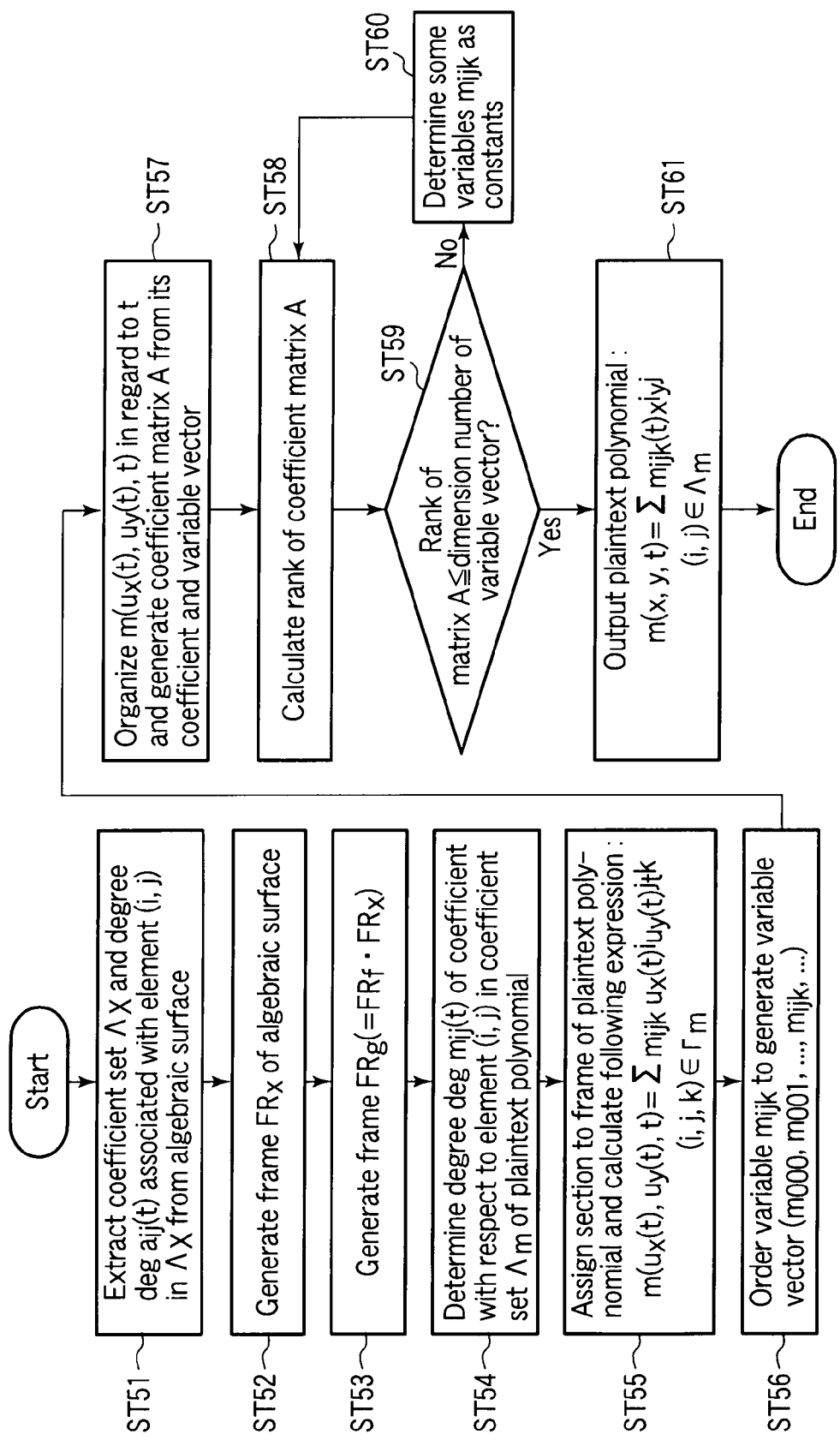

The control unit 304 has a function of controlling the respective units 302 and 305 to 314 to execute operations at ST34 to ST37 in FIG. 7 based on the degree $\deg_t X'$ and the coefficient set $\Lambda_X$ received from the input unit 303 and the fixed parameters p and d in the fixed parameter storage unit 301, and a function of controlling the respective units 302 and 305 to 312 to execute operations at ST44 to ST50 in FIG. 8 based on a coefficient set $\Lambda_m$ and a degree $\deg m_{ij}(t)$ of coefficients in a plaintext polynomial received from the input unit 303 and the fixed parameter p in the fixed parameter storage unit 301.

The section generating unit 305 has a function of generating a section $D:(x,y,t)=(u_x(t),u_y(t),t)$ from two one-variable polynomials $u_x(t)$ and $u_y(t)$ generated by the one-variable polynomial generating unit 306 based on the fixed parameters p and d received from the control unit 304 and transmitting this section to the control unit 304.

The one-variable polynomial generating unit 306 has a function of generating one-variable polynomials $u_x(t)$ and $u_y(t)$ having a degree d in the prime field $F_p$ based the fixed parameters p and d received from the section generating unit 305 and transmitting these one-variable polynomials $u_x(t)$ and $u_y(t)$ to the section generating unit 305.

The algebraic surface generating unit 307 has a function of generating a term other than a constant term by randomly generating coefficients of the term other than the constant term based on the section D, the system parameters $\deg_t X'$ and $\Lambda_x$, and the prime p received from the control unit 304, a function of generating a constant term having a negative sign by assigning the section D to the term other than the constant term by using the polynomial arithmetic unit 308, determining a degree $\deg_t X=\max\{\deg_t X', \deg a_{00}(t)\}$ of an algebraic surface X, and generating the algebraic surface X as a fibration $X(x,y,t)$ including the term other than the constant term and the constant term, and a function of transmitting this algebraic surface X to the control unit 304.

The parameter generating unit 309 has a function of randomly generating parameters $\deg_t f$ and $\Lambda_f$ of a discriminant polynomial based on $\deg_t X$ and $\Lambda_X$ under the condition (4), a function of calculating $\Lambda_f \Lambda_X$ to determine a coefficient set $\Lambda_m$ of a plaintext polynomial within a subset thereof to satisfy the condition (4), a function of determining $\deg_t m$ of the plaintext polynomial in the range of $\deg_t X < \deg_t m < \deg_t f$, and a function of determining $\deg f_{ij}(t)$ with respect to each element (i,j) included in the set $\Lambda_f$ based on the above-described parameters to determine a frame $FR_f$ of the discriminant polynomial.

The frame generating unit 310 has a function of extracting a coefficient set $\Lambda_X$ and a degree $\deg a_{ij}(t)$ of coefficients associated with elements (i,j) in $\Lambda_X$ from the generated algebraic surface and generating a frame $FR_X$ of the algebraic surface from the coefficient set $\Lambda_X$ and the degree $\deg a_{ij}(t)$ of the coefficients, a function of integrating the respective frames $FR_f$ and $FR_X$ to generate a frame $FR_g(=FR_f FR_X)$, and a function of determining a degree $\deg m_{ij}(t)$ of coefficients associated with elements (i,j) included in the coefficient set $\Lambda_m$ of the plaintext polynomial as $\deg m_{ij}(t)=\min\{\deg_t m, \deg g_{ij}\}$.

The polynomial arithmetic unit 308 is controlled by the algebraic surface generating unit 307 and has a function of executing a polynomial arithmetic operation and transmitting an arithmetic result to the algebraic surface generating unit 307.

The plaintext polynomial generating unit 311 has a function of assigning the section with a coefficient $m_{ijk}$ of the plaintext polynomial being used as a variable based on data of the prime p and a frame $FR_m$ of the plaintext polynomial determined from the coefficient set $\Lambda_m$ and the degree $\deg m_{ij}(t)$ of the coefficients of the plaintext polynomial received from the control unit 304 and the section in the memory 302, a function of transmitting a variable vector acquired as a result of assignment and a polynomial having t as a variable to the matrix generating unit 312, a function of transmitting an instruction for calculating a rank of a coefficient matrix A received from the matrix generating unit 312 to the rank arithmetic unit 313, a function of comparing the rank received from the rank arithmetic unit 313 with a dimension number of the variable vector and judging whether the rank coincides with the dimension number of the variable vector, a function of determining some of the variables $m_{ijk}$ as constants and reissuing an instruction to the rank arithmetic unit 313 when the rank does not coincide with the dimension number as a result of the judgment, and a function of transmitting the frame of the plaintext polynomial to the control unit 304 when the rank coincides with the dimension number as a result of the judgment.

The matrix generating unit 312 has a function of organizing a plaintext polynomial $m(u_x(t),u_y(t),t)$ in relation to the variable t and generating the coefficient matrix A in which coefficients including the variables $m_{ijk}$ are represented as the variable vector $(m_{000}, m_{001}, \ldots, m_{ijk}, \ldots)$ upon receiving the variable vector and the plaintext polynomial $m(u_x(t), u_y(t), t)$ from the plaintext polynomial generating unit 311, and a function of transmitting the coefficient matrix A to the plaintext polynomial generating unit 311.

The rank arithmetic unit 313 has a function of calculating a rank of the coefficient matrix A and transmitting it to the plaintext polynomial generating unit 311 based on an instruction for calculating the rank of the coefficient matrix A upon receiving this instruction from the plaintext polynomial generating unit 311.

The output unit 314 has a function of outputting the frame of the plaintext polynomial $m(x,y,t)$ received from the plaintext polynomial generating unit 311.

Operations of the encryption apparatus, the decryption apparatus, and the key generation apparatus having the above-described configurations will now be described with reference to flowcharts of FIGS. 5 to 8.

(Encryption Processing)

As shown in FIG. 5, in the encryption apparatus 100, when a plaintext m is acquired from the input unit 103 (ST1) and a fibration $X(x,y,t)$ of an algebraic surface, a frame of a plaintext polynomial $m(x,y,t)$, and a frame of a discriminant polynomial $f(x,y,t)$ as public keys are acquired from the input unit 3 (ST2), processing is started. Here, each of these frames is constituted of a set $\Lambda_m$ or $\Lambda_f$ which can be identified as a set of non-zero terms and a degree deg $m_{ij}(t)$ or deg $f_{ij}(t)$ of a coefficient of each term. Further, a characteristic p of a prime as the system parameter is acquired from the parameter storage unit 101 (ST3) and transmitted to the plaintext embedding unit 104.

The plaintext embedding unit 104 divides the plaintext m separately received from the input unit 103 into blocks like $m = m_{00} \| m_{10} \| \ldots \| m_{ij}$ based on the frame of the plaintext polynomial received from the input unit 103. Here, assuming that $L = \deg m_{ij}(t)$, the following expression is set:

$$|mij| \leq (|p|)(L+1)$$

It is assumed that the coefficient $m_{ijk}$ of $t^k$ of $m_{ij}(t)$ is obtained by dividing $m_{ij}$ every $|p|-1$ bit. That is, the following expression is achieved:

$$m_{ij} = m_{ij0} \| m_{ij1} \| \ldots \| m_{ijL}$$

Here, $|p|$ represents a bit length of p. In this manner, the plaintext m is embedded in the coefficient of the plaintext polynomial $m(x,y,t)$ (ST4).

The plaintext embedding unit 104 transmits the plaintext polynomial $m(x,y,t)$ to the encrypting unit 105. On the other hand, the input unit 103 transmits the public key to the encrypting unit 105. The parameter storage unit 101 transmits the parameter p to the encrypting unit 105.

Upon receiving the plaintext polynomial $m(x,y,t)$, the parameter p, and the public key, the encrypting unit 105 writes them in the memory 102. Then, the encrypting unit 105 transmits a frame of a discriminant polynomial $f(x,y,t)$ in the memory 102 and the parameter p to the discriminant polynomial generating unit 106.

The discriminant polynomial generating unit 106 randomly generates the discriminant polynomial $f(x,y,t)$ based on the frame of the discriminant polynomial $f(x,y,t)$ and the parameter p (ST5), and transmits the obtained discriminant polynomial $f(x,y,t)$ to the encrypting unit 105.

The encrypting unit 105 stores this discriminant polynomial $f(x,y,t)$ in the memory 102, and then transmits an instruction for generating three or more pairs of polynomials $r_i(x,y,t)$ and $s_i(x,y,t)$ (i=1, . . . , k) to the polynomial generating unit 107.

The polynomial generating unit 107 repeatedly issues a request to output a random value with respect to the random value generating unit 108, and utilizes the random value as its output to generate 2k polynomials $r_i(x,y,t)$ and $s_i(x,y,t)$ (i=1, . . . , k) (ST6). The generated polynomials $r_i(x,y,t)$ and $s_i(x,y,t)$ (i=1, . . . , k) are transmitted to the encrypting unit 105 from the polynomial generating unit 107.

The encrypting unit 105 stores the received polynomials $r_i(x,y,t)$ and $s_i(x,y,t)$ (i=1, . . . , k) in the memory 102, and then calculates k encrypted texts $F_i(x,y,t)$ (i=1, . . . , k) based on the following expression while sequentially transmitting the polynomials and an instruction for calculating these polynomials to the polynomial arithmetic unit 109 (ST7):

$$F_i(x,y,t) = m(x,y,t) + f(x,y,t)s_i(x,y,t) + X(x,y,t)r_i(x,y,t)$$

The encrypting unit 105 stores the calculated encrypted text $F_i(x,y,t)$ (i=1, . . . , k) in the memory 102.

Thereafter, the encrypting unit 105 transmits the encrypted text $F_i(x,y,t)$ (i=1, . . . , k) in the memory 102 to the output unit 110. The output unit 110 (deforms this encrypted text in accordance with a predetermined text as required) outputs this encrypted text $F_i(x,y,t)$ (i=1, . . . , k) (ST8).

With these operations, the encryption apparatus 100 terminates the encryption processing.

(Decryption Processing)

In the decryption apparatus 200, as shown in FIG. 6, an encrypted text $F_i(x,y,t)$ (i=1, . . . , k) is acquired from the input unit 203 (ST11), a public key $X(x,y,t)$ and a private key are acquired from the input unit 203 (ST12), and p is obtained from the parameter storage unit 201 to start processing. Here, the private key means a section D. The acquired encrypted text and key information are transmitted to the decrypting unit 204. The decrypting unit 204 stores the encrypted text, the key information, and others in the memory 202.

The decrypting unit 204 transmits the encrypted text $F_i(x,y,t)$ (i=1, . . . , k) and the section D in the memory 202 to the section assignment unit 205.

The section assignment unit 205 assigns the section D to the encrypted text $F_i(x,y,t)$ (i=1, . . . , k) and utilizes the one-variable polynomial arithmetic unit 206 as required to obtain $h_i(t)$ (i=1, . . . , k) (ST13). Here, the one-variable polynomial arithmetic unit 206 executes addition/subtraction/multiplication/division arithmetic operations for a one-variable polynomial. The section assignment unit 205 transmits obtained $h_i(t)$ (i=1, . . . , k) to the decrypting unit 204.

The decrypting unit 204 extracts different L pairs from the obtained k polynomials $h_i(t)$ (i=1, . . . , k) and transmits $h_e(t)$ and $h_w(t)$ (i=1, . . . , e, . . . , w, . . . , k) in each of the L pairs to the one-variable polynomial arithmetic unit 206. The one-variable polynomial arithmetic unit 206 subtracts one of $h_e(t)$ and $h_w(t)$ from the other of the same in each of the L pairs to generate a polynomial $g_j(t)\{=h_e(t)-h_w(t)\}$ (j=1, . . . , L) (ST14), and transmits each polynomial $g_j(t)$ (j=1, . . . , L) as a subtraction result to the decrypting unit 204.

The decrypting unit 204 transmits each polynomial $g_j(t)$ (j=1, . . . , L) as the subtraction result to the greatest common divisor arithmetic unit 207. The greatest common divisor arithmetic unit 207 obtains the greatest common divisor $\phi(t)$ of the polynomials $g_j(t)$ (j=1, . . . , L) as the subtraction result (ST15) and transmits the greatest common divisor $\phi(t)$ to the decrypting unit 204.

The decrypting unit 204 transmits the greatest common divisor $\phi(t)$ to the one-variable polynomial factorizing unit 208. The one-variable polynomial factorizing unit 208 factorizes this greatest common divisor $\phi(t)$ (ST16), and transmits a factorization result to the decrypting unit 204 as an array of ordered factors.

The decrypting unit 204 extracts all combinations precisely having a degree deg $f(u_x(t),u_y(t),t)$ as candidates for a discriminant polynomial from these combinations of the factors (ST17). Specifically, the decrypting unit 204 can use a technique of sequentially obtaining all combinations of the factors ordered as the array in ascending order and extracting the combinations precisely having the degree deg $f(u_x(t),u_y(t),t)$ alone from these combinations. However, when executing this technique, assuming that the number of the factor is 1, $2^1$ combinations are present. Thus, in addition to this technique, combinations each having a degree exceeding deg $f(u_x(t),u_y(t),t)$ are prevented from being further combined with the factors, thereby extracting the combinations of the factors in a shorter processing time.

Then, the decrypting unit 204 sequentially extracts candidates for the discriminant polynomial $f(u_x(t),u_y(t),t)$ (ST18), and sequentially transmits them to the one-variable polynomial residue arithmetic unit 209 together with $h_1(t)$.

The one-variable polynomial residue arithmetic unit 209 obtains a residue by dividing $h_1(t)$ by each candidate for the discriminant polynomial $f(u_x(t),u_y(t),t)$ (ST19), and transmits a result to the decrypting unit 204.

$$m(u_x(t),u_y(t),t) = h_1(t) (\mathrm{mod}\, f(u_x(t),u_y(t),t))$$

Here, based on the condition (6), since $\deg m(u_x(t),u_y(t),t) < \deg f(u_x(t),u_y(t),t)$ is achieved, it can be understood that correct $m(u_x(t),u_y(t),t)$ can be obtained on the premise that correct $f(u_x(t),u_y(t),t)$ is acquired.

Then, the decrypting unit 204 determines the coefficient $m_{ijk}$ of the plaintext polynomial $m(x,y,t)$ as a variable, generates a simultaneous linear equation having $m_{ijk}$ as a variable based on coefficient comparison between $m(u_x(t),u_y(t),t)$ obtained at the step ST19 and $t^k$ in $m_{ijk} u_x(t)^i u_y(t)^j t^k$, and transmits the obtained equation to the simultaneous linear equation solution obtaining unit 210.

$$\sum_{(i,j,k) \in \Lambda_m} m_{ijk} x^i y^j t^k$$

The simultaneous linear equation solution obtaining unit 210 solves this simultaneous linear equation by a matrix operation, and outputs a solution to the decrypting unit 204.

The decrypting unit 204 restores this solution to a message format and generates a plaintext candidate M (ST20). This restoration method is as explained above.

Then, the decrypting unit 204 transmits the plaintext candidate M to the plaintext inspecting unit 211. The plaintext inspecting unit 211 inspects an error detecting code included in the plaintext candidate M (ST21), and transmits an inspection result to the decrypting unit 204. When the inspection result at the step ST21 is indicative of rejection, the decrypting unit 204 judges whether the next candidate for the discriminant polynomial is present (ST22), determines the next candidate for the discriminant polynomial as $f(u_x(t),u_y(t),t)$ if the next candidate is present, and repeats the steps ST19 to ST21 (ST23). When the candidate for the discriminant polynomial is not present as a result of the judgment at the step ST22, the decrypting unit 204 outputs an error (ST24) to terminate the processing.

On the other hand, when the inspection result at the step ST20 is indicative of acceptance, the decrypting unit 204 determines the plaintext candidate M as the correct plaintext m and outputs it from the output unit 212 (ST25).

With these operations, the decryption apparatus 200 terminates the decryption processing.

(Key Generation Processing)

Generation of an algebraic surface will be first described, and then generation of a frame of a plaintext polynomial will be explained.

[Generation of Algebraic Surface and Parameters]

As shown in FIG. 7, the key generation apparatus 300 starts processing when system parameters $\deg_t X'$ and $\Lambda_x$ are input from the input unit 308 (ST31).

The input unit 303 temporarily stores the system parameters $\deg_t X'$ and $\Lambda_x$ in the memory 302, and transmits the system parameters $\deg_t X'$ and $\Lambda_x$ in the memory 302 to the control unit 304.

Upon receiving the system parameters $\deg_t X'$ and $\Lambda_x$, the control unit 304 reads a prime p and a maximum degree d of a section as fixed parameters from the fixed parameter storage unit 301 (ST32), and then transmits these fixed parameters p and d to the section generating unit 305.

The section generating unit 305 generates one-variable polynomials $u_x(t)$ and $u_y(t)$ having the degree d in the prime field $F_p$, and generates a section $D:(x,y,t)=(u_x(t),u_y(t),t)$ from the two one-variable polynomials $u_x(t)$ and $u_y(t)$ by using the one-variable polynomial generating unit 306 to be transmitted to the control unit 304 (ST33).

The control unit 304 transmits the section D, the system parameters $\deg_t X'$ and $\Lambda_x$, and the prime p to the algebraic surface generating unit 307.

Upon receiving the section D, the system parameters $\deg_t X'$ and $\Lambda_x$, and the prime p, the algebraic surface generating unit 307 randomly generates $a_{ij}(t)$ other than a constant term (ST34). Further, the algebraic surface generating unit 307 assigns the section $D:(x,y,t)=(u_x(t),u_y(t),t)$ to a part other than the constant term of an algebraic surface X, gives an assignment result a negative sign to generate a constant term $a_{00}(t)$ (ST35), and determines a degree $\deg_t X = \max\{\deg_t X', \deg a_{00}(t)\}$ of the algebraic surface X (ST36).

As a result, the algebraic surface generating unit 307 generates an algebraic surface including the part other than the constant term and the constant term $a_{00}(t)$. It is to be noted that an instruction is transmitted to the polynomial arithmetic unit 308 to execute addition/subtraction/multiplication/division at the time of this calculation. Furthermore, the algebraic surface X generated here is a fibration $X(x,y,t)$ in the algebraic surface X.

The generated algebraic surface X is transmitted to the control unit 304 from the algebraic surface generating unit 307. The control unit 304 writes the algebraic surface X and the section D in the memory 302.

Subsequently, in the key generation apparatus 300, the parameter generating unit 309 randomly generates parameters $\deg_t f$ and $\Lambda_f$ of a discriminant polynomial based on $\deg_t X$ and $\Lambda_x$ under the condition (4) (ST37). Then, the parameter generating unit 309 calculates $\Lambda_f \Lambda_X$, and determines a coefficient set $\Lambda_m$ of a plaintext polynomial in a subset thereof to satisfy the condition (4) (ST38). Here, when the coefficient set $\Lambda_m$ which satisfies the condition (4) is not present, the control returns to the step ST37 to redo the processing from generation of the parameters $\deg_t f$ and $\Lambda_f$.

Subsequently, the parameter generating unit 309 determines a degree $\deg_t m$ of a plaintext polynomial in the range of $\deg_t X < \deg_t m < \deg_t f$ (ST39). Here, when $\deg_t m$ that satisfies this range cannot be determined when, e.g., $\deg_t f = (\deg_t X)+1$, the control returns to the step ST37 to redo the processing from determination of $\deg_t f$ and $\Lambda_f$.

Subsequently, the parameter generation unit 309 determines $\deg f_{ij}(t)$ with respect to each element (i,j) included in the set $\Lambda_f$ (ST40). However, $\deg f_{ij}(t) = \deg_t f$ is set when the element $(i,j) = (\deg_x f, \deg_y f)$, and $\deg f_{ij}(t)$ is randomly generated in the range of $0 \leq \deg f_{ij}(t) \leq \deg_t f$ in any other case. As a result, the parameter generating unit 309 determines a frame $FR_f$ of a discriminant polynomial (ST41).

[Generation of Frame of Plaintext Polynomial]

In the key generation apparatus 300, as shown in FIG. 8, the frame generating unit 310 extracts a coefficient set $\Lambda_X$ and a degree deg $a_{ij}(t)$ of a coefficient associated with an element (i,j) in $\Lambda_X$ from the algebraic surface generated at the step 36 (ST51), and generates a frame $FR_X$ of this coefficient set $\Lambda_X$ and the degree deg $a_{ij}(t)$ of the coefficient (ST52).

Subsequently, the frame generating unit 310 integrates the respective frames $FR_f$ and $FR_X$ obtained at the steps ST41 and ST52 to generate a frame $FR_g(=FR_f \cdot FR_X)$ (ST53).

Additionally, the frame generating unit 310 determines a degree deg $m_{ij}(t)$ of a coefficient associated with each element (i,j) included in a coefficient set $\Lambda_m$ of a plaintext polynomial as deg $m_{ij}(t)$–min{deg$_t$ m, deg $g_{ij}$} (ST54).

The input unit 303 temporarily stores the coefficient set $\Lambda_m$ of the plaintext polynomial and the degree deg $m_{ij}(t)$ of the coefficient in the memory 302, and transmits the coefficient set $\Lambda_m$ of the plaintext polynomial and the degree deg $m_{ij}(t)$ of the coefficient in the memory 302 to the control unit 304.

Upon receiving the coefficient set $\Lambda_m$ of the plaintext polynomial and the degree deg $m_{ij}(t)$ of the coefficient, the control unit 304 reads a prime p as a fixed parameter from the fixed parameter storage unit 301. The control unit 304 transmits data of the coefficient set $\Lambda_m$ of the plaintext polynomial, the degree deg $m_{ij}(t)$ of the coefficient, and the prime p to the plaintext generating unit 311.

The plaintext polynomial generating unit 311 assigns a section $(x,y,t)=(u_x(t),u_y(t),t)$ in the memory 302 to a frame $FR_m$ of the plaintext polynomial determined from the coefficient set $\Lambda_m$ of the plaintext polynomial and the degree deg $m_{ij}(t)$ of the coefficient to calculate $m(u_x(t),u_y(t),t)$ of the following expression (ST55):

$$m(x, y, t) = \sum_{(i,j,k) \in \Gamma_m} m_{ijk} u_x(t)^i u_y(t)^j t^k$$

Here, $m_{ijk}$ is a variable. The plaintext polynomial generating unit 311 orders the variables $m_{ijk}$ to generate a variable vector $(m_{000}, m_{001}, \ldots, m_{ijk}, \ldots)$ (ST56), and transmits the variable vector $(m_{000}, m_{001}, \ldots, m_{ijk}, \ldots)$ and the one-variable polynomial $m(u_x(t),u_y(t),t)$ to the matrix generating unit 312.

The matrix generating unit 312 organizes $m(u_x(t),u_y(t),t)$ in regard to a variable t and generates a coefficient matrix A in which coefficients $m_{ijk}u_x(t)^i u_y(t)^j$ including the variables $m_{ijk}$ are represented by using the variable vector $(m_{000}, m_{001}, \ldots, m_{ijk}, \ldots)$ (ST57). Specifically, the matrix generating unit 312 extracts a polynomial that provides the coefficient $m_{ijk}u_x(t)^i u_y(t)^j$ of t from the polynomials organized in regard to the variable t, and generates a coefficient matrix in such a manner that a product of the polynomial and the variable vector $(m_{000}, m_{001}, \ldots, m_{ijk}, \ldots)$ precisely becomes the coefficient $m_{ijk}u_x(t)^i u_y(t)^j$ of t. The generated coefficient matrix A is transmitted to the plaintext generating unit 311 from the matrix generating unit 312.

The plaintext polynomial generating unit 311 transmits an instruction for calculating a rank of this coefficient matrix A to the rank arithmetic unit 313. The rank arithmetic unit 313 calculates the rank of the coefficient matrix A based on this instruction, and transmits the calculated rank to the plaintext polynomial generating unit 311 (ST58).

The plaintext polynomial generating unit 311 compares this rank with a dimension number of the variable vector and judges whether the rank coincides with the dimension number of the variable vector (ST59).

Since a unique solution cannot be obtained if these members do not coincide with each other as a result of this judgment, the plaintext polynomial generating unit 311 determines some of the variables $m_{ijk}$ as constants (ST60) and redoes the processing from the calculation of the rank at the step ST47. Further, since a unique solution can be obtained if the rank coincides with the dimension number of the vector as a result of the judgment at the step ST48, a frame of the plaintext polynomial m(x,y,t) associated with the one-variable polynomial $m(u_x(t),u_y(t),t)$ is output to the control unit 304.

The control unit 304 outputs the frame of the plaintext polynomial m(x,y,t) from the output unit 314 (ST61).

With these operations, the key generation apparatus 300 terminates the key generation processing.

As explained above, according to this embodiment, as different from the conventional example where a polynomial {$h_1(t)-h_2(t)$} having a high degree is factorized to extract a factor, the encryption apparatus, the decryption apparatus, and the key generation apparatus that obtain the greatest common divisor $\phi(t)$ having a low degree from a polynomial $h_i(t)$ having a high degree and factorize the maximum common equation $\phi(t)$ having the low degree to extract a factor are realized.

Therefore, in the public key cryptography using an algebraic surface, using the greatest common divisor $\phi(t)$ having the low degree to reduce a burden on the factorization processing and the factor extraction processing enables realizing the efficiency of the decryption processing.

<Variations of First Embodiment>

A first variation can be realized when the encrypting unit 105 creates an encrypted text based on, e.g., the following expression in place of Expression (7) at the step ST7:

$$F(x,y,t)=m(x,y,t)-f(x,y,t)s(x,y,t)-X(x,y,t)r(x,y,t)$$

On the other hand, the decryption processing can be also realized by providing a modification in a self-evident manner in accordance with an encryption arithmetic operation in this variation.

A second variation can be realized by adding an irreducibility judging function of judging irreducibility to the discriminant polynomial generating unit 106 of the encryption apparatus 100, judging whether the discriminant polynomial f(x,y,t) generated at the step ST5 is an irreducible polynomial, and again repeating the processing at the step ST5 when this polynomial is not the irreducible polynomial. It is to be noted that, as the judgment on the irreducibility, for example, whether the discriminant polynomial f(x,y,t) can be factorized can be judged, the discriminant polynomial can be determined as a non-irreducible polynomial to set aside the discriminant polynomial if a judgment result indicates that factorization is possible, and the discriminant polynomial can be determined as the irreducible polynomial if the judgment result indicates that factorization is impossible.

A third variation can be realized when the plaintext embedding unit 104 divides the plaintext m for a coefficient of the plaintext polynomial m(x,y,t) and a coefficient of the discriminant polynomial f(x,y,t) to be embedded in place of the processing of embedding the plaintext m in the plaintext polynomial m(x,y,t) at the step ST4 in the encryption processing. In this case, in the decryption processing, the same processing as generating the plaintext candidate M to obtain the plaintext m can be executed with respect to the discriminant polynomial f(x,y,t) by solving a simultaneous linear equation produced by coefficient comparison between the plaintext polynomial m(u$_x$(t),u$_y$(t),t) and the plaintext polynomial candidate M with the coefficient of the plaintext polynomial m(x,y,t) being used as a variable. That is, in the decryption processing, like the decryption processing form the plaintext polynomial, the plaintext candidate M can be generated to obtain the plaintext m by solving the simultaneous linear equation generated by the coefficient comparison between the discriminant polynomial f(u$_x$(t),u$_y$(t),t) and the discriminant polynomial candidate M with the coefficient of the discriminant polynomial f(x,y,t) being used as a variable. In a case where this variation is used together with the second variation, the plaintext m can be embedded in some coefficients of f(x,y,t) when embedding the plaintext m in the discriminant polynomial f(x,y,t), and a method of performing adjustment can be executed so that remaining coefficients can form an irreducible polynomial.

In regard to a fourth variation, when the polynomial generating unit 107 generates polynomials r(x,y,t) and s(x,y,t) at the step ST6, it is good enough to satisfy conditions that X(x,y,t)r(x,y,t) and f(x,y,t)s(x,y,t) include the same similar terms as polynomials of x and y and degrees of one-variable polynomials each having a variable t that serves as a coefficient in the polynomials of x and y coincide with each other. The conditions can be satisfied by conforming a frame of one polynomial r(x,y,t) to a frame of a discriminant polynomial f(x,y,t) and conforming a frame of the other polynomial r(x,y,t) to a frame of a fibration X(x,y,t) to generate the polynomials r(x,y,t) and s(x,y,t). Specifically, the polynomial r(x,y,t) can be generated in such a manner that each term has the same degree of x and y as a degree of x and y in each term in the discriminant polynomial f(x,y,t), and the polynomial s(x,y,t) can be generated in such a manner that each term has the same degree of x and y as a degree of x and y in each term in the fibration X(x,y,t).

In regard to a fifth variation, at a timing between the step ST17 and the ST18 in the decryption processing, a value k of a non-illustrated counter is set to 0, the plaintext candidate M is stored in the memory 202 when the inspection at the step ST results in acceptance, the value k of the counter is incremented by "+1", and the same processing starting from the step ST19 is carried out with respect to f(u$_x$(t),u$_y$(t),t) as the next candidate. When there is no next candidate f(u$_x$(t),u$_y$(t),t), an error is output if the value k of the counter is not smaller than 2 or equal to 0, or the plaintext candidate M in the memory 202 is output as a plaintext m when if the value k of the counter is 1. The fifth variation is realized as explained above.

In regard to a sixth variation, the steps ST13 to ST23 in the decryption processing (however, ST21 is omitted) are repeated for the number of sections D, a set Ml of plaintext candidates associated with the respective sections D$_l$ (l=1, ..., n) is obtained, and the plaintext candidates included in the set Ml are stored in the memory 202. Thereafter, a plaintext candidate common in the plaintext candidate set Ml is output as a plaintext m to the output unit 212.

Giving an additional description to supplement, at the step ST13 of the sixth variation, the section assignment unit 205 assigns each section D$_l$ (l=1, ..., n) to each input encrypted text F$_i$(x,y,t) (i=1, ..., k) to generate k one-variable polynomials $\{h_{11}(t), h_{21}(t), \ldots, h_{k1}(t)\}, \ldots, \{h_{1n}(t),h_{2n}(t), \ldots, h_{kn}(t)\}$. These one-variable polynomials $\{h_{11}(t),h_{21}(t), \ldots, h_{k1}(t)\}, \ldots, \{h_{1n}(t),h_{2n}(t), \ldots, h_{kn}(t)\}$ are transmitted to the decrypting unit 204 from the section assignment unit 205.

At the steep ST14, the decrypting unit 204 transmits each one-variable polynomial $\{h_{11}(t),h_{21}(t), \ldots, h_{k1}(t)\}, \ldots, \{h_{1n}(t),h_{2n}(t), \ldots, h_{kn}(t)\}$ to the one-variable polynomial arithmetic unit 206 to be subjected to subtraction, thereby obtaining a polynomial g$_l$(t) $(=\{h_{i1l}(t)-h_{i2l}(t)\})$ (i1,i2∈i, i1≠i2, l=1, ..., n) indicative of a subtraction result $\{h_{11}(t)-h_{21}(t)\}, \ldots, \{h_{1n}(t),h_{2n}(t)\}, \ldots$ obtained by subtracting each one-variable polynomial $\{h_{11}(t),h_{21}(t), \ldots, h_{k1}(t)\}, \ldots, \{h_{1n}(t),h_{2n}(t), \ldots, h_{kn}(t)\}$.

At the step ST15, the decrypting unit 204 transmits the polynomial g$_l$(t) (l=1, ..., n) indicative of the subtraction result to the greatest common divisor arithmetic unit 207 to calculate the greatest common divisor φl(t) indicative of the subtraction result, thereby obtaining the greatest common divisor φl(t).

At the step ST16, the decrypting unit 204 transmits the greatest common divisor φl(t) to the one-variable polynomial factorizing unit 208 where factorization is executed.

The one-variable polynomial factorizing unit 208 transmits a factorization result to the decrypting unit 204 as an array in which factors are ordered.

At the step ST17, the decrypting unit 204 combines the factors produced from the factorization result to extract all discriminant polynomial candidates f(u$_{xl}$(t),u$_{yl}$(t),t) precisely having a degree deg f(u$_{xl}$(t),u$_{yl}$(t),t).

At the step ST18, the decrypting unit 204 sequentially extracts candidates for the discriminant polynomial f(u$_{xl}$(t), u$_{yl}$(t),t) and sequentially transmits them together with $h_{11}(t), \ldots, h_{1n}(t)$ to the one-variable polynomial residue arithmetic unit 209.

At the step ST19, the one-variable polynomial residue arithmetic unit 209 divides each of the one-variable polynomials $h_{11}(t), \ldots, h_{1n}(t)$ by each discriminant polynomial candidate f(u$_{xl}$(t),u$_{yl}$(t),t) and transmits each plaintext polynomial candidate m(u$_{xl}$(t),u$_{yl}$(t),t) obtained as a residue to the decrypting unit 204.

Like the above description, the decrypting unit 204 derives a simultaneous linear equation having a coefficient of the plaintext polynomial m(x,y,t) as a variable based on the plaintext polynomial candidate m(u$_{xl}$(t),u$_{yl}$(t),t) and a previously disclosed frame of the plaintext polynomial m(x,y,t).

At the step ST20, the simultaneous linear equation solution solving unit 210 solves this simultaneous linear equation, whereby the decrypting unit 204 generates a plaintext candidate Ml from this solution. This plaintext candidate Ml is transmitted to the plaintext inspecting unit 211 from the decrypting unit 204.

At the step ST21, the plaintext inspecting unit 211 judges whether there is a plaintext candidate M common to n plaintext candidates Ml obtained from n plaintext polynomial candidates m(u$_{xl}$(t),u$_{yl}$(t),t) acquired by dividing each of the one-variable polynomials $h_{11}(t), \ldots, h_{1n}(t)$.

At the step ST25, when there is a common plaintext candidate M as a result of the judgment made by the plaintext inspecting unit 211, the decrypting unit 204 outputs the plaintext candidate M as a plaintext from the output unit 212.

The sixth variation can be realized as described above. It is to be noted that an error output may be made when there are a plurality of plaintext candidates, but the error output can be possibly avoided by using this variation together with the fifth variation and narrowing down the plaintext candidates by using inspection of error detecting codes with respect to the plurality of plaintext candidates.

In regard to a seventh variation, when performing encryption by using m(x,y,t), r$_i$(x,y,t), s$_i$(x,y,t), and f(x,y,t) and a public key X(x,y,t) in the encryption processing, at least one encrypted text is calculated in accordance with Expression (7), and the other encrypted texts are calculated in accordance with the following expression obtained by deleting addition of a plaintext polynomial m(x,y,t) in Expression (7):

$$F_i(x,y,t)=f(x,y,t)s_i(x,y,t)+X(x,y,t)r_i(x,y,t)$$

Further, in the decryption processing, as indicated by broken like representing processing of the variation in FIG. 9, after the step ST12, the section assignment unit 205 assigns a section D to an encrypted text $F_i(x,y,t)$ (i=1, . . . , k). When a polynomial $h_i(t)$ (i=$F_i(u_x(t),u_y(t),t)$) associated with this encrypted text $F_i(u_x(t),u_y(t),t)$ is obtained (ST13), $h_i(t)$ mentioned above is stored in the memory as $g_j(t)$ in regard to the encrypted text $F_i(u_x(t),u_y(t),t)$ (i=1, . . . , k) to which a plaintext polynomial is not added (ST14v1). Furthermore, in regard to the polynomial $h_i(t)$ of the encrypted text $F_i(u_x(t),u_y(t),t)$ (i=1, . . . , k) to which a plaintext polynomial is added, a plurality of pairs of different polynomials $h_e(t)$ and $h_w(t)$ are extracted from the polynomial $h_i(t)$, $h_e(t)$ and $h_w(t)$ of each pair are transmitted to the one-variable polynomial arithmetic unit 206, one polynomial $h_w(t)$ is subtracted from the other $h_e(t)$, and a plurality of subtraction results are stored in the memory 202 as $g_j(t)$ (ST14v2). An order of executing these steps ST14v1 and ST14v2 may be reversed. In any case, after the steps ST14v1 and ST14v2, processing at the step ST15 and subsequent steps is executed as described above.

In regard to an eighth variation, in the decryption processing, as indicated by a broken line representing processing of the variation in FIG. 10, after the decrypting unit 204 obtains the greatest common divisor $\phi(t)$ at the step ST15, processing that the decrypting unit 204 compares a degree deg $\phi(t)$ of the greatest common divisor $\phi(t)$ with a degree deg $f(u_x(t),u_y(t),t)$ of a discriminant polynomial $f(u_x(t),u_y(t),t)$ (ST15v) is added. When both the degrees coincide with each other (ST15v: YES), $f(u_x(t),u_y(t),t)=\phi(t)$ is determined, and the control advances to processing that the decrypting unit 204 obtains a residue of $h_i(t)$ based on $f(u_x(t),u_y(t),t)$ (ST19). When both the degrees do not coincide with each other (ST15v: NO), the decrypting unit 204 advances to the step ST16 where the factorization processing of the greatest common divisor $\phi(t)$ and subsequent processing are sequentially executed as explained above.

(Specific Configuration of Second Embodiment)

Figure 11:
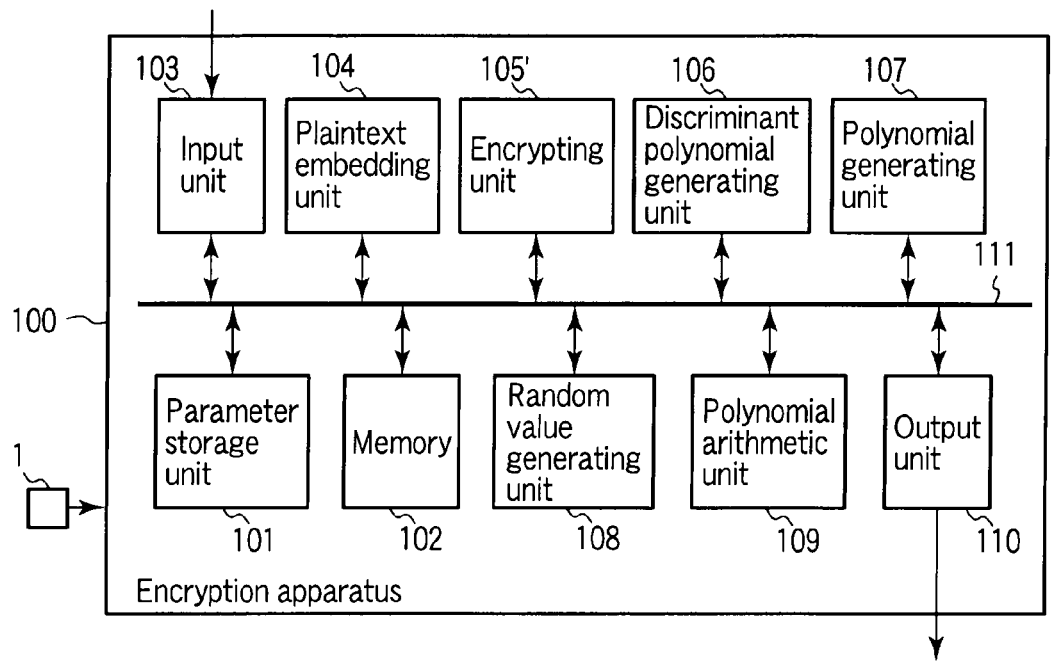
FIG. 11 is a view showing an encryption apparatus according to a second embodiment of the present invention.
Figure 12:
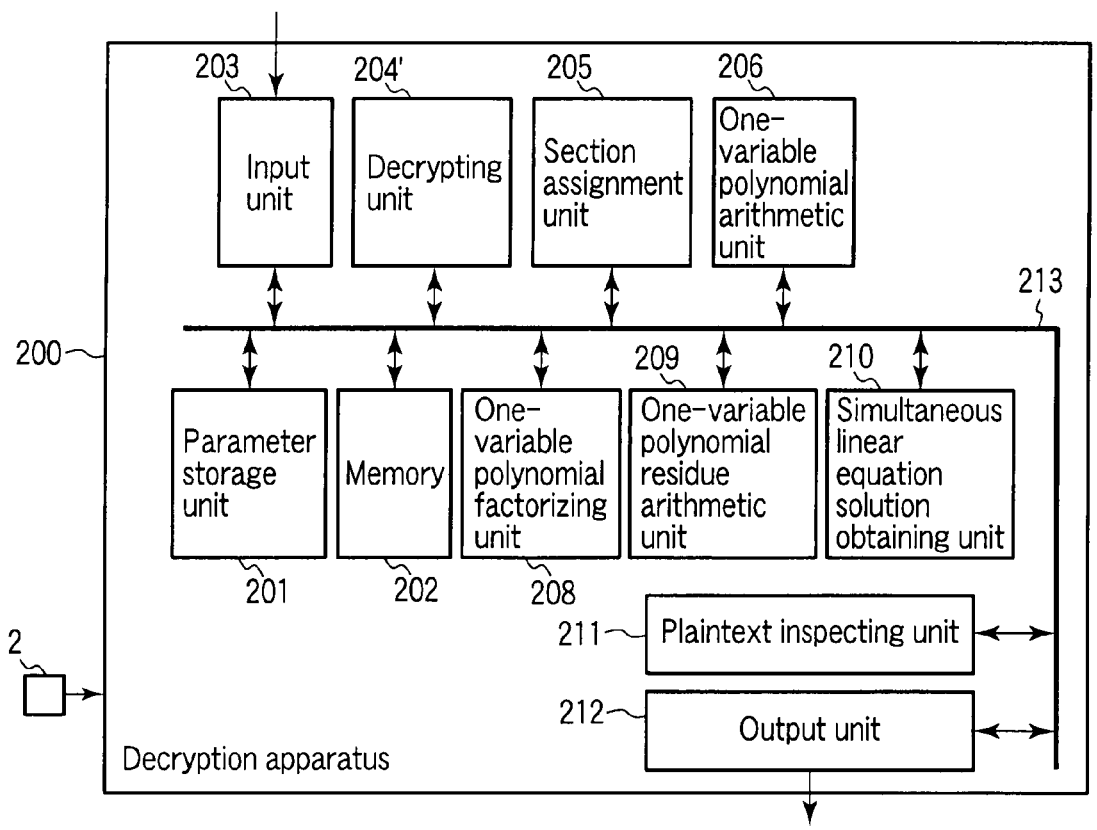
FIG. 12 is a view showing a decryption apparatus according to the second embodiment.

A second embodiment according to the present invention will now be specifically described hereinafter. FIG. 11 is an overall block diagram of an encryption apparatus according to the second embodiment of the present invention, and FIG. 12 is an overall block diagram of a decryption apparatus according to the second embodiment. Like reference numerals denote parts equal to those in FIGS. 2 and 3 to omit a detailed description thereof, and different parts will be mainly explained. Moreover, a key generation apparatus 300 according to this embodiment is as explained above in the first embodiment.

Here, the encryption apparatus 200 according to this embodiment includes an encrypting unit 105' in place of the encrypting unit 105 depicted in FIG. 2.

The encrypting unit 105' has a function of controlling respective units 102 and 106 to 109 so that operations at ST5 to ST8v in FIG. 13 can be executed based on a public key received from an input unit 103 and a parameter p in a parameter storage unit 101.

The decryption apparatus 200 according to this embodiment includes a decrypting unit 204' in place of the decrypting unit 204 and the greatest common divisor arithmetic unit 207 depicted in FIG. 3.

Figure 14:
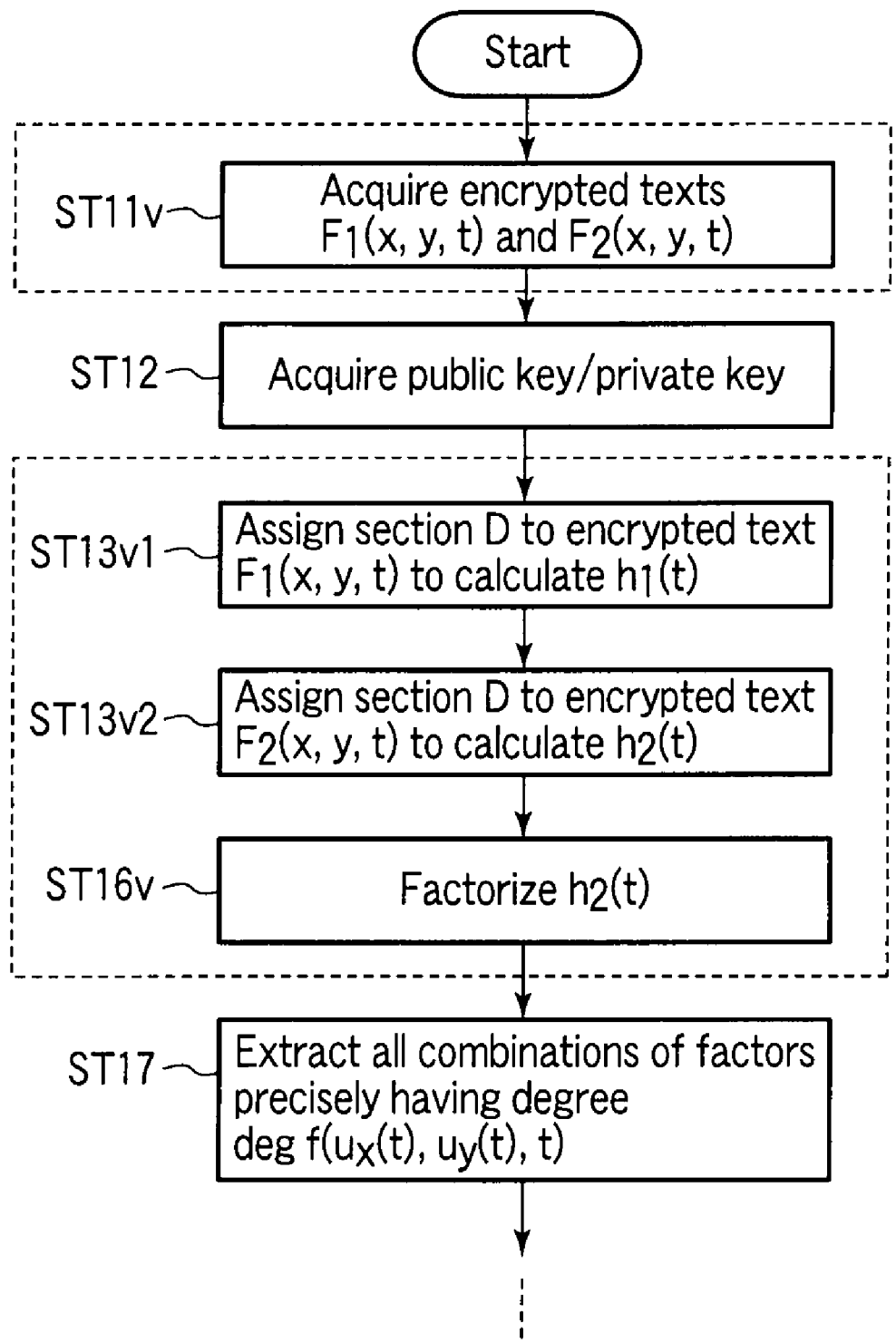
FIG. 14 is a flowchart of the decryption apparatus according to the second embodiment.

The decrypting unit 204' has a function of controlling respective units 202 and 205 to 212 so that operations at ST13v1 ST17 in FIG. 14 and at ST17 to ST25 in FIG. 6 based on encrypted texts $F_1(x,y,t)$ and $F_2(x,y,t)$, a public key x(x,y,t), and a section D received from an input unit 203 and a parameter p in a parameter storage unit.

Operations of the encryption apparatus and the decryption apparatus having the above-described configurations will now be described with reference to flowcharts of FIGS. 13 and 14.

(Encryption Processing)

In the encryption apparatus 100, as indicated by a broken line representing intrinsic processing of this embodiment in FIG. 13, after the step ST5, the encrypting unit 105' stores a discriminant polynomial f(x,y,t) in a memory 102 and then transmits an instruction for generating two pairs of polynomials $r_i(x,y,t)$ and $s_i(x,y,t)$ (i=1,2) to a polynomial generating unit 107.

The polynomial generating unit 107 utilizes random values from a random value generating unit 108 to generate four $r_1(x,y,t)$, $s_1(x,y,t)$, $r_2(x,y,t)$, and $s_2(x,y,t)$ (ST6v). The generated polynomials $r_1(x,y,t)$, $s_1(x,y,t)$, $r_2(x,y,t)$, and $s_2(x,y,t)$ are transmitted from the polynomial generating unit 107 to the encrypting unit 105'.

The encrypting unit 105' stores the received polynomials $r_1(x,y,t)$, $s_1(x,y,t)$, $r_2(x,y,t)$, and $s_2(x,y,t)$ in the memory 102, and then calculates two encrypted texts $F_1(x,y,t)$ and $F_2(x,y,t)$ based on the following expression while sequentially transmitting polynomials and arithmetic instructions thereof to a polynomial arithmetic unit 109 (ST7v1 and ST7v2):

$$F_1(x,y,t)=m(x,y,t)+f(x,y,t)s_1(x,y,t)+X(x,y,t)r_1(x,y,t)$$

$$F_2(x,y,t)=f(x,y,t)s_2(x,y,t)+X(x,y,t)r_2(x,y,t)$$

The encrypting unit 105' stores the calculated encrypted texts $F_1(x,y,t)$ and $F_2(x,y,t)$ in the memory 102.

Thereafter, the encrypting unit 105' transmits the encrypted texts $F_1(x,y,t)$ and $F_2(x,y,t)$ in the memory 102 to an output unit 110. The output unit 110 (deforms these encrypted texts in accordance with a predetermined format as required and) outputs the encrypted texts $F_1(x,y,t)$ and $F_2(x,y,t)$ (ST8v).

With these operations, the encryption apparatus 100 terminates the encryption processing.

(Decryption Processing)

In the decryption apparatus 200, as indicated by a broken line representing intrinsic processing of this embodiment in FIG. 14, when encrypted texts $F_1(x,y,t)$ and $F_2(x,y,t)$ are acquired from the input unit 203 (ST11v), a public key X(x, y,t) and a private key are acquired from the input unit 203 (ST12), and p is obtained from the parameter storage unit 201, processing is started. The acquired encrypted texts and the key information are transmitted to the decrypting unit 204'. The encrypting unit 204' stores the encrypted texts, the key information, and others in the memory 202.

The decrypting unit 204' transmits the encrypted texts $F_1(x, y,t)$ and $F_2(x,y,t)$ in the memory 202 and a section D to a section assignment unit 205.

The section assignment unit 205 sequentially assigns the section D to the encrypted texts $F_1(x,y,t)$ and $F_2(x,y,t)$ and utilizes a one-variable polynomial arithmetic unit 206 as required to obtain $h_i(t)$ and $h_2(t)$ (ST13v1 and ST13v2). Here, the one-variable arithmetic unit 206 executes addition/subtraction/multiplication/division operations with respect to one-variable polynomials. The obtained $h_1(t)$ and $h_2(t)$ are transmitted to the decrypting unit 204 from the section assignment unit 205.

The decrypting unit 204' transmits the polynomial $h_2(t)$ which does not include $m(u_x(t),u_y(t),t)$ in the obtained polynomials $h_1(t)$ and $h_2(t)$ to a one-variable polynomial factorizing unit 208. The one-variable polynomial factorizing unit 208 factorizes this polynomial $h_2(t)$ (ST16v), and transmits a factorization result to the decrypting unit 204' as an array in which factors are ordered. The subsequent decryption processing is as described above.

(Key Generation Processing)

A key generating operation performed by the key generation apparatus 300 is as described in conjunction with the first embodiment.

As explained above, according to this embodiment, as different from the conventional technology, since a second encrypted text $F_2(x,y,t)$ is generated without using a plaintext polynomial $m(x,y,t)$ in the encryption processing, single addition or subtraction processing with respect to the plaintext polynomial $m(x,y,t)$ can be omitted, and hence a burden on the arithmetic processing in the encryption processing can be reduced, thereby realizing the efficiency of the entire processing.

Further, as different from the conventional technology, since a polynomial $h_2(t)$ generated from the second encrypted text $F_2(x,y,t)$ which does not use the plaintext polynomial $m(x,y,t)$ is factorized in the decryption processing, subtraction processing $\{h_1(t)-h_2(t)\}$ that is used to cancel a conventional plaintext polynomial $m(u_x(t),u_y(t),t)$ can be omitted to execute the factorization, thus realizing the efficiency of the entire processing.

Giving an additional description to supplement, according to this embodiment, since only one polynomial $h_2(t)$ which does not include $m(x,y,t)$ is used, the processing of obtaining the greatest common divisor $\phi(t)$ described in the first embodiment can be omitted in addition to the subtraction processing, thereby further increasing a speed.

<Variations of Second Embodiment>

A first variation can be realized when the encrypting unit 105' uses subtraction as well as addition as follows at the time of generating encrypted texts $F_1(x,y,t)$ and $F_2(x,y,t)$ at the steps ST7v1 and ST7v2:

$$F_1(x,y,t)=m(x,y,t)-f(x,y,t)s_1(x,y,t)-X(x,y,t)r_1(x,y,t)$$

$$F_2(x,y,t)=f(x,y,t)s_2(x,y,t)-X(x,y,t)r_2(x,y,t)$$

On the other hand, the decryption processing can be realized by making a modification in accordance with encryption arithmetic operations in this variation in a self-evident manner. Specifically, one-variable polynomials $h_1(t)$ and $h_2(t)$ obtained at the steps ST13v1 and ST13v2 become as follows. It is to be noted that $h_2(t)$ is the same as that in this embodiment.

$$h_1(t)=F_1(u_x(t),u_y(t),t)=m(u_x(t),u_y(t),t)-f(u_x(t),u_y(t),t)s_1(u_x(t),u_y(t),t)$$

$$h_2(t)=F_2(u_x(t),u_y(t),t)=f(u_x(t),u_y(t),t)s_2(u_x(t),u_y(t),t)$$

As described above, in regard to the first variation, although the processing at the steps ST7v1 and ST7v2 is somewhat different from the processing at ST13v1 and ST13v2, the other processing can be executed like this embodiment to obtain the same effects.

Furthermore, according to the second embodiment, when executing the second, third, fourth, or fifth variation, each variation can be executed like each variation of the first embodiment to obtain the above-described effect.

Moreover, according to the second embodiment, when executing a sixth variation, the steps ST13v1 to ST23 (however, ST21 is omitted) in the decryption processing are repeated for the number of the sections D, a set Ml of plaintext candidates associated with the respective sections $D_l$ (l= 1, ..., n) is obtained, and the plaintext candidates included in the set Ml are stored in the memory 202. Thereafter, a plaintext candidate common in the plaintext candidate set Ml is output to the output unit 212 as a plaintext m.

Giving an additional description to supplement, at the steps ST13v1 and ST13v2 in the second embodiment, the section assignment unit 205 assigns each section $D_l$ (l=1, ..., n) to each of input encrypted texts $F_1(x,y,t)$ and $F_2(x,y,t)$ to generate two one-variable polynomials $\{h_{11}(t), h_{21}(t)\}, ..., \{h_{1n}(t),h_{2n}(t)\}$. These one-variable polynomials $\{h_{11}(t),h_{21}(t)\}, ..., \{h_{1n}(t),h_{2n}(t)\}$ are transmitted to the decrypting unit 204' from the section assignment unit 205.

The step ST16v, the decrypting unit 204' transmits a polynomial $\{h_{21}(t), ..., h_{2n}(t)\}$ which does not include $m(u_x(t), u_y(t),t)$ in these one-variable polynomials $\{h_{11}(t), h_{21}(t)\}, ..., \{h_{1n}(t),h_{2n}(t)\}$ to the one-variable polynomial factorizing unit 208. The one-variable polynomial factoring unit 208 factorizes this polynomial $\{h_{21}(t), ..., h_{2n}(t)\}$ (ST16v), and transmits a factorization result to the decrypting unit 204' as an array in which factors are ordered. The subsequent decryption processing is as described in the sixth variation of the first embodiment. The sixth variation can be realized as explained above.

The technique described above for the embodiment can be stored as a program to be executed by a computer in memory mediums including magnetic disks (Floppy™ disks, hard disks, etc.), optical disks (CD-ROMs, DVDs, etc.), magneto-optical disks (MOs) and semiconductor memories for distribution.

Memory mediums that can be used for the purpose of the present invention are not limited to those listed above and memory mediums of any type can also be used for the purpose of the present invention so long as they are computer-readable ones.

Additionally, the operating system (OS) operating on a computer according to the instructions of a program installed in the computer from a memory medium, data base management software and/or middleware such as network software may take part in each of the processes for realizing the above embodiment.

Still additionally, memory mediums that can be used for the purpose of the present invention are not limited to those independent from computers but include memory mediums adapted to download a program transmitted by LANs and/or the Internet and permanently or temporarily store it.

It is not necessary that a single memory medium is used with the above described embodiment. In other words, a plurality of memory mediums may be used with the above-described embodiment to execute any of the above described various processes. Such memory mediums may have any configuration.

For the purpose of the present invention, a computer executes various processes according to one or more than one programs stored in the memory medium or mediums as described above for the preferred embodiment. More specifically, the computer may be a stand alone computer or a system realized by connecting a plurality of computers by way of a network.

For the purpose of the present invention, computers include not only personal computers but also processors and microcomputers contained in information processing apparatus. In other words, computers generally refer to apparatus and appliances that can realize the functional features of the present invention by means of a computer program.

The present invention is by no means limited to the above described embodiment, which may be modified in various different ways without departing from the spirit and scope of the invention. Additionally, any of the components of the above described embodiment may be combined differently in various appropriate ways for the purpose of the present invention. For example, some of the components of the above described embodiment may be omitted. Alternatively, components of different embodiments may be combined appropriately in various different ways for the purpose of the present invention.

What is claimed is:

1. An encryption apparatus including:
an embedding device configured to embed a message m as a coefficient of a three-variable plaintext polynomial $m(x,y,t)$ when encrypting the message m if a fibration $X(x,y,t)$ of an algebraic surface X is a public key and one or more sections corresponding to the fibration $X(x,y,t)$ are private keys;
a first generation device configured to generate a three-variable discriminant polynomial $f(x,y,t)$ in such a manner that a degree of a one-variable polynomial obtained when assigning the section becomes larger than a degree of a one-variable polynomial obtained when assigning the section to the plaintext polynomial;
a second generation device configured to randomly generate three or more pairs of polynomials $r_i(x,y,t)$ and $s_i(x,y,t)$ ($i=1, \ldots, k$); and
an encryption device configured to generate three or more encrypted texts $F_i(x,y,t)=E(m,s_i,r_i,f,X)$ ($i=1, \ldots, k$) by processing of adding or subtracting a multiplication result $f(x,y,t)s_i(x,y,t)$ of the discriminant polynomial $f(x,y,t)$ and the polynomial $s_i(x,y,t)$ and a multiplication result $X(x,y,t)r_i(x,y,t)$ of the fibration $X(x,y,t)$ and the polynomial $r_i(x,y,t)$ with respect to the plaintext polynomial $m(x,y,t)$.

2. The apparatus according to claim 1,
wherein the embedding device divides the message m to be separately embedded in a coefficient of the three-variable plaintext polynomial $m(x,y,t)$ and a coefficient of the three-variable discriminant polynomial $f(x,y,t)$.

3. The apparatus according to claim 1,
wherein the first generation device includes:
a third generation device configured to generate the polynomial $r_i(x,y,t)$ ($i=1, \ldots, k$) in such a manner that each term has the same degree of x and y as the degree of x and y in each term of the discriminant polynomial $f(x,y,t)$; and
a fourth generation device configured to generate the polynomial $s_i(x,y,t)$ ($i=1, \ldots, k$) in such a manner that each term has the same degree of x and y as the degree of x and y in each term of the fibration $X(x,y,t)$.

4. An encryption apparatus including:
an embedding device configured to embed a message m as a coefficient of a three-variable plaintext polynomial $m(x,y,t)$ when encrypting the message m if a fibration $X(x,y,t)$ of an algebraic surface X is a public key and one or more sections corresponding to the fibration $X(x,y,t)$ are private keys;
a first generation device configured to generate a three-variable discriminant polynomial $f(x,y,t)$ in such a manner that a degree of a one-variable polynomial obtained when assigning the section becomes larger than a degree of a one-variable polynomial obtained when assigning the section to the plaintext polynomial;
a second generation device configured to randomly generate two pairs of polynomials $r_1(x,y,t)$, $s_1(x,y,t)$, $r_2(x,y,t)$, and $s_2(x,y,t)$;
a first encryption device configured to generate one encrypted text $F_1(x,y,t)=E(m,s_1,r_1,f,X)$ by processing of adding or subtracting a multiplication result $f(x,y,t)s_1(x,y,t)$ of the discriminant polynomial $f(x,y,t)$ and the polynomial $s_1(x,y,t)$ and a multiplication result $X(x,y,t)r_1(x,y,t)$ of the fibration $X(x,y,t)$ and the polynomial $r_1(x,y,t)$ with respect to the plaintext polynomial $m(x,y,t)$; and
a second encryption device configured to generate one encrypted text $F_2(x,y,t)=E(s_2,r_2,f,X)$ by processing of adding or subtracting a multiplication result $f(x,y,t)s_2(x,y,t)$ of the discriminant polynomial $f(x,y,t)$ and the polynomial $s_2(x,y,t)$ and a multiplication result $X(x,y,t)r_2(x,y,t)$ of the fibration $X(x,y,t)$ and the polynomial $r_2(x,y,t)$ without using the plaintext polynomial $m(x,y,t)$.

5. The apparatus according to claim 4,
wherein the embedding device divides the message m to be separately embedded in a coefficient of the three-variable plaintext polynomial $m(x,y,t)$ and a coefficient of the three-variable discriminant polynomial $f(x,y,t)$.

6. The apparatus according to claim 4,
wherein the first generation device includes:
a third generation device configured to generate the polynomial $r_i(x,y,t)$ ($i=1,2$) in such a manner that each term has the same degree of x and y as the degree of x and y in each term of the discriminant polynomial $f(x,y,t)$; and
a fourth generation device configured to generate the polynomial $s_i(x,y,t)$ ($i=1,2$) in such a manner that each term has the same degree of x and y as the degree of x and y in each term of the fibration $X(x,y,t)$.

7. An encryption apparatus including:
an embedding device configured to embed a message m as a coefficient of a three-variable plaintext polynomial $m(x,y,t)$ when encrypting the message m if a fibration $X(x,y,t)$ of an algebraic surface X is a public key and one or more sections corresponding to the fibration $X(x,y,t)$ are private keys;
a first generation device configured to generate a three-variable discriminant polynomial $f(x,y,t)$ in such a manner that a degree of a one-variable polynomial obtained when assigning the section becomes larger than a degree of a one-variable polynomial obtained when assigning the section to the plaintext polynomial;
a second generation device configured to randomly generate three or more pairs of polynomials $r_i(x,y,t)$ and $s_i(x,y,t)$ ($i=1, \ldots, k$); and
a first encryption device configured to generate at least one encrypted text $F_i(x,y,t)=E(m,s_i,r_i,f,X)$ ($i=1, \ldots, k$) by processing of adding or subtracting a multiplication result $f(x,y,t)s_i(x,y,t)$ of the discriminant polynomial $f(x,y,t)$ and the polynomial $s_i(x,y,t)$ and a multiplication result $X(x,y,t)r_i(x,y,t)$ of the fibration $X(x,y,t)$ and the polynomial $r_i(x,y,t)$ with respect to the plaintext polynomial $m(x,y,t)$; and
a second encryption device configured to generate two or more encrypted texts $F_i(x,y,t)=E(s_i,r_i,f,X)$ ($i=1, \ldots, k$) by processing of adding or subtracting a multiplication result $f(x,y,t)s_i(x,y,t)$ of the discriminant polynomial $f(x,y,t)$ and the polynomial $s_i(x,y,t)$ and a multiplication result $X(x,y,t)r_i(x,y,t)$ of the fibration $X(x,y,t)$ and the polynomial $r_i(x,y,t)$ without using the plaintext polynomial $m(x,y,t)$.

8. The apparatus according to claim 7,
wherein the embedding device divides the message m to be separately embedded in a coefficient of the three-variable plaintext polynomial $m(x,y,t)$ and a coefficient of the three-variable discriminant polynomial $f(x,y,t)$.

9. The apparatus according to claim 7,
wherein the first generation device includes:
a third generation device configured to generate the polynomial $r_i(x,y,t)$ ($i=1, \ldots, k$) in such a manner that each term has the same degree of x and y as the degree of x and y in each term of the discriminant polynomial $f(x,y,t)$; and a fourth generation device configured to generate the polynomial $s_i(x,y,t)$ ($i=1, \ldots, k$) in such a manner that each term has the same degree of x and y as the degree of x and y in each term of the fibration $X(x,y,t)$.

10. A decryption apparatus including:

an input device configured to receive three or more encrypted texts $F_i(x,y,t)=E(m,s_i,r_i,f,X)$ ($i=1, \ldots, k$) generated by processing of adding or subtracting a multiplication result $f(x,y,t)s_i(x,y,t)$ of a three-variable discriminant polynomial $f(x,y,t)$ and a polynomial $s_i(x,y,t)$ and a multiplication result $X(x,y,t)r_i(x,y,t)$ of a fibration $X(x,y,t)$ and a polynomial $r_i(x,y,t)$ with respect to a three-variable polynomial $m(x,y,t)$ having a message m embedded therein as a coefficient when the fibration $X(x,y,t)$ of an algebraic surface X is a public key and one or more sections associated with the fibration $X(x,y,t)$ are private keys;

an assignment device configured to generate three or more one-variable polynomials $h_i(t)$ ($i=1, \ldots, k$) by assigning the sections to the respective input encrypted texts $F_i(x,y,t)$ ($i=1, \ldots, k$);

a subtraction device configured to subtract two pairs of different polynomials in respective one-variable polynomials $h_i(t)$ ($i=1, \ldots, k$) to obtain a plurality of polynomials $g_j(t)$ ($j=1, \ldots, L$) as a subtraction result;

an arithmetic device configured to obtain the greatest common divisor $\phi(t)$ of two or more polynomials in each polynomial $g_j(t)$ ($j=1, \ldots, L$);

a factorization device configured to factorize the greatest common divisor $\phi(t)$;

an extraction device configured to extract all discriminant polynomial candidates $f(u_x(t),u_y(t),t)$ precisely having deg $f(u_x(t),u_y(t),t)$ as a degree by combining factors generated as a result of the factorization;

a residue arithmetic device configured to obtain a plaintext polynomial candidate $m(u_x(t),u_y(t),t)$ as a residue by dividing at least one one-variable polynomial $h_i(t)$ in the one-variable polynomials $h_i(t)$ ($i=1, \ldots, k$) by the discriminant polynomial candidate $f(u_x(t),u_y(t),t)$;

a first candidate generation device configured to derive a simultaneous linear equation having a coefficient of the plaintext polynomial $m(x,y,t)$ as a variable based on the plaintext polynomial candidate $m(u_x(t),u_y(t),t)$ and a previously disclosed frame of the plaintext polynomial $m(x,y,t)$, and generate a plaintext candidate M by solving the simultaneous linear equation;

an inspection device configured to inspect whether the plaintext candidate M is a true plaintext by using an error detecting code included in the plaintext candidate M; and an output device configured to output the plaintext candidate M as a plaintext when the plaintext candidate M as the true plaintext is present as a result of the inspection.

11. The apparatus according to claim 10, wherein the message m is divided to be separately embedded in a coefficient of the three-variable plaintext polynomial $m(x,y,t)$ and a coefficient of the three-variable discriminant polynomial $f(x,y,t)$, and the first candidate generation device includes:

a second candidate generation device configured to derive a simultaneous linear equation having the coefficient of the plaintext polynomial $m(x,y,t)$ as a variable based on the plaintext polynomial candidate $m(u_x(t),u_y(t),t)$ and the previously disclosed frame of the plaintext polynomial $m(x,y,t)$, and generate the plaintext candidate M by solving the simultaneous linear equation; and a third candidate generation device configured to derive a simultaneous linear equation having the coefficient of the discriminant polynomial $f(x,y,t)$ as a variable based on the discriminant polynomial candidate $f(u_x(t),u_y(t),t)$ and a previously disclosed frame of the discriminant polynomial $f(x,y,t)$, and obtain the plaintext candidate M by solving the simultaneous linear equation.

12. The decryption apparatus according to claim 10, including:

a comparison device configured to compare a degree deg $\phi(t)$ of the greatest common divisor $\phi(t)$ obtained by the arithmetic device with a degree deg $f(u_x(t),u_y(t),t)$ of the discriminant polynomial $f(u_x(t),u_y(t),t)$; and a second control device configured to control the residue arithmetic device to execute the division with the greatest common divisor $\phi(t)$ being used as the discriminant polynomial candidate $f(u_x(t),u_y(t),t)$ without carrying out the factorization device and the extraction device when both the degrees coincide with each other.

13. A decryption apparatus including:

a first input device configured to receive at least one encrypted text $F_i(x,y,t)=E(m,s_i,r_i,f,X)$ ($i=1, \ldots, k$) generated by processing of adding or subtracting a multiplication result $f(x,y,t)s_i(x,y,t)$ of a three-variable discriminant polynomial $f(x,y,t)$ and a polynomial $s_i(x,y,t)$ and a multiplication result $X(x,y,t)r_i(x,y,t)$ of a fibration $X(x,y,t)$ and a polynomial $r_i(x,y,t)$ with respect to a three-variable polynomial $m(x,y,t)$ having a message m embedded therein as a coefficient when the fibration $X(x,y,t)$ of an algebraic surface X is a public key and one or more sections associated with the fibration $X(x,y,t)$ are private keys;

a second input device configured to receive one or more encrypted texts $F_i(x,y,t)=E(s_i,r_i,f,X)$ ($i=1, \ldots, k$) generated by processing of adding or subtracting a multiplication result $f(x,y,t)s_i(x,y,t)$ of the discriminant polynomial $f(x,y,t)$ and the polynomial $s_i(x,y,t)$ and a multiplication result $X(x,y,t)r_i(x,y,t)$ of the fibration $X(x,y,t)$ and the polynomial $r_i(x,y,t)$ without using the plaintext polynomial $m(x,y,t)$;

an assignment device configured to generate three or more one-variable polynomials $h_i(t)$ ($i=1, \ldots, k$) by assigning the sections to the respective input encrypted texts $F_i(x,y,t)$ ($i=1, \ldots, k$);

a subtraction device configured to subtract two pairs of different polynomials in respective one-variable polynomials $h_i(t)$ ($i=1, \ldots, k$) to obtain a plurality of polynomials $g_j(t)$ ($j=1, \ldots, L$) as a subtraction result;

a first control device configured to obtain the one-variable polynomial $h_i(t)$ ($i=1, \ldots, k$) as the polynomial $g_j(t)$ ($j=1, \ldots, L$) by controlling the subtraction device to avoid execution of the subtraction in regard to the one-variable polynomial $h_i(t)$ ($i=1, \ldots, k$) generated by assigning the section D to the encrypted text $F_i(x,y,t)=E(s_i,r_i,f,X)$ ($i=1, \ldots, k$) without using the plaintext polynomial $m(x,y,t)$;

an arithmetic device configured to obtain the greatest common divisor $\phi(t)$ of two or more polynomials in each polynomial $g_j(t)$ ($j=1, \ldots, L$);

a factorization device configured to factorize the greatest common divisor $\phi(t)$;

an extraction device configured to extract all discriminant polynomial candidates $f(u_x(t),u_y(t),t)$ precisely having deg $f(u_x(t),u_y(t),t)$ as a degree by combining factors generated as a result of the factorization;

a residue arithmetic device configured to obtain a plaintext polynomial candidate $m(u_x(t),u_y(t),t)$ as a residue by dividing at least one one-variable polynomial $h_i(t)$ in the one-variable polynomials $h_i(t)$ (i=1, . . . , k) by the discriminant polynomial candidate $f(u_x(t),u_y(t),t)$;

a first candidate generation device configured to derive a simultaneous linear equation having a coefficient of the plaintext polynomial $m(x,y,t)$ as a variable based on the plaintext polynomial candidate $m(u_x(t),u_y(t),t)$ and a previously disclosed frame of the plaintext polynomial $m(x,y,t)$, and generate a plaintext candidate M by solving the simultaneous linear equation;

an inspection device configured to inspect whether the plaintext candidate M is a true plaintext by using an error detecting code included in the plaintext candidate M; and an output device configured to output the plaintext candidate M as a plaintext when the plaintext candidate M as the true plaintext is present as a result of the inspection.

14. A decryption apparatus including:

a first input device configured to receive one encrypted text $F_1(x,y,t)=E(m,s_1,r_1,f,X)$ generated by processing of adding or subtracting a multiplication result $f(x,y,t)s_1(x,y,t)$ of a three-variable discriminant polynomial $f(x,y,t)$ and a polynomial $s_1(x,y,t)$ and a multiplication result $X(x,y,t)r_1(x,y,t)$ of a fibration $X(x,y,t)$ and a polynomial $r_1(x,y,t)$ with respect to a three-variable polynomial $m(x,y,t)$ having a message m embedded therein as a coefficient when the fibration $X(x,y,t)$ of an algebraic surface X is a public key and one or more sections associated with the fibration $X(x,y,t)$ are private keys;

a second input device configured to receive one encrypted text $F_2(x,y,t)=E(s_2,r_2,f,X)$ generated by processing of adding or subtracting a multiplication result $f(x,y,t)s_2(x,y,t)$ of the discriminant polynomial $f(x,y,t)$ and the polynomial $s_2(x,y,t)$ and a multiplication result $X(x,y,t)r_2(x,y,t)$ of the fibration $X(x,y,t)$ and the polynomial $r_2(x,y,t)$ without using the plaintext polynomial $m(x,y,t)$;

an assignment device configured to generate two one-variable polynomials $h_1(t)$ and $h_2(t)$ by assigning the section to the respective input encrypted texts $F_1(x,y,t)$ and $F_2(x,y,t)$;

a factorization device configured to factorize a one-variable polynomial $h_2(t)$ generated from the encrypted text $F_2(x,y,t)$ in the respective one-variable polynomials $h_1(t)$ and $h_2(t)$;

an extraction device configured to extract all discriminant polynomial candidates $f(u_x(t),u_y(t),t)$ precisely having deg $f(u_x(t),u_y(t),t)$ as a degree by combining factors generated as a result of the factorization;

a residue arithmetic device configured to obtain a plaintext polynomial candidate $m(u_x(t),u_y(t),t)$ as a residue by dividing the one-variable polynomial $h_1(t)$ generated from the encrypted text $F_1(x,y,t)$ in the one-variable polynomials $h_1(t)$ and $h_2(t)$ by the discriminant polynomial candidate $f(u_x(t),u_y(t),t)$;

a first candidate generation device configured to derive a simultaneous linear equation having a coefficient of the plaintext polynomial $m(x,y,t)$ as a variable based on the plaintext polynomial candidate $m(u_x(t),u_y(t),t)$ and a previously disclosed frame of the plaintext polynomial $m(x,y,t)$, and generate a plaintext candidate M by solving the simultaneous linear equation;

an inspection device configured to inspect whether the plaintext candidate M is a true plaintext by using an error detecting code included in the plaintext candidate M; and an output device configured to output the plaintext candidate M as a plaintext when the plaintext candidate M as the true plaintext is present as a result of the inspection.

15. The apparatus according to claim 14, wherein the message m is divided to be separately embedded in a coefficient of the three-variable plaintext polynomial $m(x,y,t)$ and a coefficient of the three-variable discriminant polynomial $f(x,y,t)$, and the first candidate generation device includes:

a second candidate generation device configured to derive a simultaneous linear equation having the coefficient of the plaintext polynomial $m(x,y,t)$ as a variable based on the plaintext polynomial candidate $m(u_x(t),u_y(t),t)$ and the previously disclosed frame of the plaintext polynomial $m(x,y,t)$, and generate the plaintext candidate M by solving the simultaneous linear equation; and a third candidate generation device configured to derive a simultaneous linear equation having the coefficient of the discriminant polynomial $f(x,y,t)$ as a variable based on the discriminant polynomial candidate $f(u_x(t),u_y(t),t)$ and a previously disclosed frame of the discriminant polynomial $f(x,y,t)$, and obtain the plaintext candidate M by solving the simultaneous linear equation.

16. A decryption apparatus including:

an input device configured to receive three or more encrypted texts $F_i(x,y,t)=E(m,s_i,r_i,f,X)$ (i=1, . . . , k) generated by processing of adding or subtracting a multiplication result $f(x,y,t)s_i(x,y,t)$ of a three-variable discriminant polynomial $f(x,y,t)$ and a polynomial $s_i(x,y,t)$ and a multiplication result $X(x,y,t)r_i(x,y,t)$ of a fibration $X(x,y,t)$ and a polynomial $r_i(x,y,t)$ with respect to a three-variable plaintext polynomial $m(x,y,t)$ having a message m embedded therein as a coefficient when the fibration $X(x,y,t)$ of an algebraic surface is a public key and n sections $D_l$ (l=1, . . . , n) associated with the fibration $X(x,y,t)$ are private keys;

an assignment device configured to generate k one-variable polynomials $\{h_{11}(t),h_{21}(t), \ldots, h_{k1}(t)\}, \ldots, \{h_{1n}(t),h_{2n}(t), \ldots, h_{kn}(t)\}$ by assigning the respective sections $D_l$ (l=1, . . . , n) to the respective input encrypted texts $F_i(x,y,t)$ (i=1, . . . , k);

an arithmetic device configured to obtain the greatest common divisor $\phi l(t)$ of two or more polynomials in subtraction results $\{h_{1l}(t)-h_{2l}(t)\}, \ldots, \{h_{(k-1)l}(t)-h_{kl}(t)\}$ acquired by subtracting each one-variable polynomial having the same section assigned thereto from each of the one-variable polynomials $\{h_{11}(t),h_{21}(t), \ldots, h_{k1}(t)\}, \ldots, \{h_{1n}(t),h_{2n}(t), \ldots, h_{kn}(t)\}$;

a factorization device configured to factorize the greatest common divisor $\phi l(t)$;

an extraction device configured to extract all discriminant polynomial candidates $f(u_{xl}(t),u_{yl}(t),t)$ precisely having deg $f(u_{xl}(t),u_{yl}(t),t)$ as a degree by combining factors generated as a results of the factorization;

a residue arithmetic device configured to obtain n plaintext polynomial candidates $m(u_{xl}(t),u_{yl}(t),t)$ as residues by dividing the one-variable polynomials $h_{11}(t), \ldots, h_{1n}(t)$ by the discriminant polynomial candidates $f(u_{xl}(t),u_{yl}(t),t)$, respectively;

a first candidate generation device configured to derive a simultaneous linear equation having a coefficient of the plaintext polynomial $m(x,y,t)$ as a variable based on each plaintext polynomial candidate $m(u_{xl}(t),u_{yl}(t),t)$ and a previously disclosed frame of the plaintext polynomial $m(x,y,t)$, and generate each plaintext candidate Ml by solving the simultaneous linear equation;

a judgment device configured to judge whether there is a plaintext candidate M common to the n plaintext candidates Ml obtained from the n plaintext polynomial candidates $m(u_{xl}(t),u_{yl}(t),t)$ acquired by dividing the respective one-variable candidates $h_{11}(t), \ldots, h_{1n}(t)$; and an output device configured to output the common plaintext M as a plaintext when there is the common plaintext candidate M as a result of the judgment.

17. The apparatus according to claim 16,
wherein the message m is divided to be separately embedded in a coefficient of the three-variable plaintext polynomial $m(x,y,t)$ and a coefficient of the three-variable discriminant polynomial $f(x,y,t)$, and
the first candidate generation device includes:
a second candidate generation device configured to derive a simultaneous linear equation having the coefficient of the plaintext polynomial $m(x,y,t)$ as a variable based on the plaintext polynomial candidate $m(u_{xl}(t),u_{yl}(t),t)$ and the previously disclosed frame of the plaintext polynomial $m(x,y,t)$, and generate the plaintext candidate Ml by solving the simultaneous linear equation; and
a third candidate generation device configured to derive a simultaneous linear equation having the coefficient of the discriminant polynomial $f(x,y,t)$ as a variable based on the discriminant polynomial candidate $f(u_{xl}(t),u_{yl}(t),t)$ and a previously disclosed frame of the discriminant polynomial $f(x,y,t)$, and obtain the plaintext candidate Ml' by solving the simultaneous linear equation, and
the judgment device judges whether there is a plaintext candidate M common to respective plaintext candidates Ml and Ml' obtained by the second an third candidate generation devices.

18. The decryption apparatus according to claim 16, including:
a comparison device configured to compare a degree deg $\phi l(t)$ of the greatest common divisor $\phi l(t)$ obtained by the arithmetic device with a degree deg $f(u_{xl}(t),u_{yl}(t),t)$ of the discriminant polynomial $f(u_{xl}(t),u_{yl}(t),t)$; and
a second control device configured to control the residue arithmetic device to execute the division with the greatest common divisor $\phi l(t)$ being used as the discriminant polynomial candidate $f(u_{xl}(t),u_{yl}(t),t)$ without carrying out the factorization device and the extraction device when both the degrees coincide with each other.

19. A decryption apparatus including:
a first input device configured to receive at least one encrypted text $F_i(x,y,t)=E(m,s_i,r_i,f,X)$ (i=1, ..., k) generated by processing of adding or subtracting a multiplication result $f(x,y,t)s_i(x,y,t)$ of a three-variable discriminant polynomial $f(x,y,t)$ and a polynomial $s_i(x,y,t)$ and a multiplication result $X(x,y,t)r_i(x,y,t)$ of a fibration $X(x,y,t)$ and a polynomial $r_i(x,y,t)$ with respect to a three-variable polynomial $m(x,y,t)$ having a message m embedded therein as a coefficient when the fibration $X(x,y,t)$ of an algebraic surface X is a public key and n sections $D_l$ (l=1, ..., n) associated with the fibration $X(x,y,t)$ are private keys;
a second input device configured to receive one or more encrypted texts $F_i(x,y,t)=E(s_i,r_i,f,X)$ (i=1, ..., k) generated by processing of adding or subtracting a multiplication result $f(x,y,t)s_i(x,y,t)$ of the discriminant polynomial $f(x,y,t)$ and the polynomial $s_i(x,y,t)$ and a multiplication result $X(x,y,t)r_i(x,y,t)$ of the fibration $X(x,y,t)$ and the polynomial $r_i(x,y,t)$ without using the plaintext polynomial $m(x,y,t)$;
an assignment device configured to generate k one-variable polynomials $\{h_{11}(t),h_{21}(t), \ldots, h_{k1}(t)\}, \ldots, \{h_{1n}(t),h_{2n}(t), \ldots, h_{kn}(t)\}$ by assigning the respective sections $D_l$ (l=1, ..., n) to the respective input encrypted texts $F_i(x,y,t)$ (i=1, ..., k);

an arithmetic device configured to obtain the greatest common divisor $\phi l(t)$ of two or more polynomials in subtraction results $\{h_{1l}(t)-h_{2l}(t)\}, \ldots, \{h_{(k-1)l}(t)-h_{kl}(t)\}$ acquired by subtracting each one-variable polynomial having the same section assigned thereto from each of the one-variable polynomials $\{h_{11}(t),h_{21}(t), \ldots, h_{k1}(t)\}, \ldots, \{h_{1n}(t),h_{2n}(t), \ldots, h_{kn}(t)\}$;

a first control device configured to obtain the greatest common divisor $\phi l(t)$ by controlling the subtraction device to avoid execution of the subtraction with respect to the one-variable polynomials $\{h_{i1}(t),h_{i2}(t), \ldots, h_{in}(t)\}$ generated by assigning the respective sections $D_l$ (l=1, ..., n) to the encrypted text $F_i(x,y,t)=E(s_i,r_i,f,X)$ (i=1, ..., k) produced without using the plaintext polynomial $m(x,y,t)$;

a factorization device configured to factorize the greatest common divisor $\phi l(t)$;

an extraction device configured to extract all discriminant polynomial candidates $f(u_{xl}(t),u_{yl}(t),t)$ precisely having deg $f(u_{xl}(t),u_{yl}(t),t)$ as a degree by combining factors generated as a results of the factorization;

a residue arithmetic device configured to obtain n plaintext polynomial candidates $m(u_{xl}(t),u_{yl}(t),t)$ as residues by dividing the one-variable polynomials $h_{11}(t), \ldots, h_{1n}(t)$ by the discriminant polynomial candidates $f(u_{xl}(t),u_{yl}(t),t)$, respectively;

a first candidate generation device configured to derive a simultaneous linear equation having a coefficient of the plaintext polynomial $m(x,y,t)$ as a variable based on each plaintext polynomial candidate $m(u_{xl}(t),u_{yl}(t),t)$ and a previously disclosed frame of the plaintext polynomial $m(x,y,t)$, and generate each plaintext candidate Ml by solving the simultaneous linear equation;

a judgment device configured to judge whether there is a plaintext candidate M common to the n plaintext candidates Ml obtained from the n plaintext polynomial candidates $m(u_{xl}(t),u_{yl}(t),t)$ acquired by dividing the respective one-variable candidates $h_{11}(t), \ldots, h_{1n}(t)$; and an output device configured to output the common plaintext M as a plaintext when there is the common plaintext candidate M as a result of the judgment.

20. A decryption apparatus including:
a first input device configured to receive one encrypted text $F_1(x,y,t)=E(m,s_1,r_1,f,X)$ generated by processing of adding or subtracting a multiplication result $f(x,y,t)s_1(x,y,t)$ of a three-variable discriminant polynomial $f(x,y,t)$ and a polynomial $s_1(x,y,t)$ and a multiplication result $X(x,y,t)r_1(x,y,t)$ of a fibration $X(x,y,t)$ and a polynomial $r_1(x,y,t)$ with respect to a three-variable polynomial $m(x,y,t)$ having a message m embedded therein as a coefficient when the fibration $X(x,y,t)$ of an algebraic surface X is a public key and n sections $D_l$ (l=1, ..., n) associated with the fibration $X(x,y,t)$ are private keys;

a second input device configured to receive one encrypted text $F_2(x,y,t)=E(s_2,r_2,f,X)$ generated by processing of adding or subtracting a multiplication result $f(x,y,t)s_2(x,y,t)$ of the discriminant polynomial $f(x,y,t)$ and the polynomial $s_2(x,y,t)$ and a multiplication result $X(x,y,t)r_2(x,y,t)$ of the fibration $X(x,y,t)$ and the polynomial $r_2(x,y,t)$ without using the plaintext polynomial $m(x,y,t)$;

an assignment device configured to generate two one-variable polynomials $\{h_{11}(t),h_{21}(t)\}, \ldots, \{h_{1n}(t),h_{2n}(t)\}$ by assigning the respective sections $D_l$ (l=1, ..., n) to the respective input encrypted texts $F_1(x,y,t)$ and $F_2(x,y,t)$;

a factorization device configured to factorize a one-variable polynomial $h_{21}(t), \ldots, h_{2n}(t)$ generated from the encrypted text $F_2(x,y,t)$ in the respective one-variable polynomials $\{h_{11}(t), h_{21}(t)\}, \ldots, \{h_{1n}(t), h_{2n}(t)\}$;

an extraction device configured to extract all discriminant polynomial candidates $f(u_{xl}(t), u_{yl}(t), t)$ precisely having deg $f(u_{xl}(t), u_{yl}(t), t)$ as a degree by combining factors generated as a results of the factorization;

a residue arithmetic device configured to obtain a plaintext polynomial candidate $m(u_{xl}(t), u_{yl}(t), t)$ as a residue by dividing the one-variable polynomial $h_{11}(t), \ldots, h_{1n}(t)$ generated from the encrypted text $F_1(x,y,t)$ in the one-variable polynomials $\{h_{11}(t), h_{21}(t)\}, \ldots, \{h_{1n}(t), h_{2n}(t)\}$ by the discriminant polynomial candidate $f(u_{xl}(t), u_{yl}(t), t)$;

a first candidate generation device configured to derive a simultaneous linear equation having a coefficient of the plaintext polynomial $m(x,y,t)$ as a variable based on each plaintext polynomial candidate $m(u_{xl}(t), u_{yl}(t), t)$ and a previously disclosed frame of the plaintext polynomial $m(x,y,t)$, and generate each plaintext candidate Ml by solving the simultaneous linear equation;

a judgment device configured to judge whether there is a plaintext candidate M common to the n plaintext candidates Ml obtained from the n plaintext polynomial candidates $m(u_{xl}(t), u_{yl}(t), t)$ acquired by dividing the respective one-variable candidates $h_{11}(t), \ldots, h_{1n}(t)$; and an output device configured to output the common plaintext M as a plaintext when there is the common plaintext candidate M as a result of the judgment.

21. The apparatus according to claim 20,
wherein the message m is divided to be separately embedded in a coefficient of the three-variable plaintext polynomial $m(x,y,t)$ and a coefficient of the three-variable discriminant polynomial $f(x,y,t)$, and
the first candidate generation device includes:
a second candidate generation device configured to derive a simultaneous linear equation having the coefficient of the plaintext polynomial $m(x,y,t)$ as a variable based on the plaintext polynomial candidate $m(u_{xl}(t), u_{yl}(t), t)$ and the previously disclosed frame of the plaintext polynomial $m(x,y,t)$, and generate the plaintext candidate Ml by solving the simultaneous linear equation; and
a third candidate generation device configured to derive a simultaneous linear equation having the coefficient of the discriminant polynomial $f(x,y,t)$ as a variable based on the discriminant polynomial candidate $f(u_{xl}(t), u_{yl}(t), t)$ and a previously disclosed frame of the discriminant polynomial $f(x,y,t)$, and obtain the plaintext candidate Ml' by solving the simultaneous linear equation.

22. A key generation apparatus including:
an input device configured to receive a degree $\deg_t X'$ of a term other than a constant term of a fibration $X(x,y,t)$ and a coefficient set $\Lambda_X$ of two variables x and y in the fibration $X(x,y,t)$ when the fibration $X(x,y,t)$ of an algebraic surface X is a public key and one or more sections associated with the fibration $X(x,y,t)$ are private keys;
a section generation device configured to randomly generate the sections;
a first generation device configured to generate the term other than the constant term by randomly generating a coefficient of the term other than the constant term when the fibration $X(x,y,t)$ of the algebraic surface is regarded as a polynomial of the variables x and y based on the generated section and the input degree $\deg_t X'$ and coefficient set $\Lambda_X$;

a first calculation device configured to calculate the constant term by adding a negative sign to an assignment result obtained by assigning the section to the term other than the constant term;

a second generation device configured to determine a larger one of the degree $\deg_t X'$ of the term other than constant term and a degree $\deg_t a_{00}$ of the constant term as a degree $\deg_t X$ of the fibration and generate the fibration $X(x,y,t)$ including the term other than the constant term and the constant term;

a third generation device configured to randomly generate a degree $\deg_t f$ of a discriminant polynomial and the coefficient set $\Lambda_f$ of the two variables x and y under conditions that "$\deg_t X < \deg_t m < \deg_t f$" and "$(\deg_x f, \deg_y f) \in \Lambda_f$" based on the degree $\deg_t X$ of the fibration and the coefficient set $\Lambda_X$ (where $\deg_t m$ is a degree of a variable t in a plaintext polynomial, $\deg_t f$ is a degree of a variable t in the discriminant polynomial, $\deg_x f$ is a degree of a variable x in the discriminant polynomial, and $\deg_y f$ is a degree of a variable y in the discriminant polynomial);

a first determination device configured to calculate a product $\Lambda_f \Lambda_X$ of the coefficient sets $\Lambda_f$ and $\Lambda_X$ and determine a coefficient set $\Lambda_m$ of two variables x and y in a plaintext polynomial in a partial set of a result of the calculation under a condition that "$(\deg_x m, \deg_y m, \deg_t m) \in \Gamma_m$" (where $\Gamma_m$ is a set of non-zero monomials (an exponent x, an exponent y, and an exponent t) included in a plaintext polynomial $m(x,y,t)$);

a second determination device configured to determine a $\deg_t m$ of the plaintext polynomial under a condition "$\deg_t X < \deg_t m < \deg_t f$";

a third determination device configured to determine a frame $FR_f$ of the discriminant polynomial including the coefficient set $\Lambda_f$ and the degree $f_{ij}(t)$ by determining a degree $f_{ij}(t)$ of a coefficient of the discriminant polynomial as deg $f_{ij}(t) = \deg_t f$ in case of an element $(i,j) = (\deg_x f, \deg_y f)$ based on each element $(i,j)$ included in the coefficient set $\Lambda_f$ and randomly determining the degree $f_{ij}(t)$ in the range of $0 \leq \deg f_{ij}(t) \leq \deg_t f$ in case of the element $(i,j) \neq (\deg_x f, \deg_y f)$;

a fourth generation device configured to extract the coefficient set $\Lambda_X$ and a degree $a_{ij}(t)$ of a coefficient associated with the element $(i,j)$ in $\Lambda_X$ from the algebraic surface and generate a frame $FR_X$ of the algebraic surface from the coefficient set $\Lambda_X$ and the degree deg $a_{ij}(t)$ of the coefficient;

a fifth generation device configured to integrate the respective frames $FR_f$ and $FR_X$ to generate a frame $FR_g (= FR_f \cdot FR_X)$;

a fourth determination device configured to determine a degree deg $m_{ij}(t)$ of a coefficient associated with the element $(i,j)$ included in the coefficient set $\Lambda_m$ of the plaintext polynomial as deg $m_{ij}(t) = \min\{\deg_t m, \deg g_{ij}(t)\}$;

an assignment device configured to assign the section to a frame of the plaintext polynomial having a coefficient $m_{ijk}$ as a variable which is a frame including the coefficient set $\Lambda_m$ and the degree deg $m_{ij}(t)$;

a sixth generation device configured to generate a variable vector $(m_{000}, m_{001}, \ldots, m_{ijk}, \ldots)$ by ordering the variables $m_{ijk}$ obtained as a result of the assignment;

an extraction device configured to organize a one-variable polynomial $m(u_x(t), u_y(t), t)$ obtained as a result of the assignment in regard to t and extract a polynomial that becomes a coefficient $m_{ijk} u_x(t)^i u_y(t)^j$ of t;

a seventh generation device configured to generate a coefficient matrix in such a manner that a product of the variable matrix ($m_{000}, m_{001}, \ldots, m_{ijk}, \ldots$) precisely becomes the coefficient $m_{ijk}u_x(t)^i u_y(t)^j$ of t;

a second calculation device configured to calculate a rank of the coefficient matrix;

an adjustment device configured to set some variables $m_{ijk}$ in the one-variable polynomial $m(u_x(t), u_y(t), t)$ as constants when the rank does not coincide with a dimension number of the variable vector; and an output device configured to output as a frame $FR_m$ of the plaintext polynomial a frame of the three-variable polynomial $m(x,y,t)$ associated with the one-variable polynomial $m(u_x(t), u_y(t), t)$ when the rank coincides with the dimension number of the variable vector.

23. A non-transitory computer-readable storage medium storing a program executed by a computer having a memory, wherein the program includes:

a first program code which allows the computer to execute processing of embedding a message m as a coefficient of a three-variable plaintext polynomial $m(x,y,t)$ when encrypting the message m if a fibration $X(x,y,t)$ of an algebraic surface X is a public key and one or more sections associated with the fibration $X(x,y,t)$ are private keys;

a second program code which allows the computer to execute processing of writing the plaintext polynomial $m(x,y,t)$ having the coefficient embedded therein into the memory;

a third program code which allows the computer to execute processing of generating a three-variable discriminant polynomial $f(x,y,t)$ in such a manner that a degree of a one-variable polynomial obtained by assigning the section becomes larger than a degree of a one-variable polynomial obtained by assigning the section in the plaintext polynomial;

a fourth program code which allows the computer to execute processing of randomly generating three or more pairs of polynomials $r_i(x,y,t)$ and $s_i(x,y,t)$ ($i=1, \ldots, k$); and a fifth program code which allows the computer to execute processing of generating three or more encrypted texts $F_i(x,y,t) = E(m, s_i, r_i, f, X)$ ($i=1, \ldots, k$) by processing of adding or subtracting a multiplication result $f(x,y,t)s_i(x,y,t)$ of the discriminant polynomial $f(x,y,t)$ and the polynomial $s_i(x,y,t)$ and a multiplication result $X(x,y,t)r_i(x,y,t)$ of the fibration $X(x,y,t)$ and the polynomial $r_i(x,y,t)$ with respect to the plaintext polynomial $m(x,y,t)$ in the memory.

24. A non-transitory computer-readable storage medium storing a program executed by a computer having a memory, wherein the program includes:

a first program code which allows the computer to execute processing of embedding a message m as a coefficient of a three-variable plaintext polynomial $m(x,y,t)$ when encrypting the message m if a fibration $X(x,y,t)$ of an algebraic surface X is a public key and one or more sections corresponding to the fibration $X(x,y,t)$ are private keys;

a second program code which allows the computer to execute processing of writing the plaintext polynomial $m(x,y,t)$ having the coefficient embedded therein into the memory;

a third program code which allows the computer to execute processing of generating a three-variable discriminant polynomial $f(x,y,t)$ in such a manner that a degree of a one-variable polynomial obtained when assigning the section becomes larger than a degree of a one-variable polynomial obtained when assigning the section to the plaintext polynomial;

a fourth program code which allows the computer to execute processing of randomly generating two pairs of polynomials $r_1(x,y,t)$, $s_1(x,y,t)$, $r_2(x,y,t)$, and $s_2(x,y,t)$;

a fifth program code which allows the computer to execute processing of generating one encrypted text $F_1(x,y,t) = E(m, s_1, r_1, f, X)$ by processing of adding or subtracting a multiplication result $f(x,y,t)s_1(x,y,t)$ of the discriminant polynomial $f(x,y,t)$ and the polynomial $s_1(x,y,t)$ and a multiplication result $X(x,y,t)r_1(x,y,t)$ of the fibration $X(x,y,t)$ and the polynomial $r_1(x,y,t)$ with respect to the plaintext polynomial $m(x,y,t)$ in the memory; and a sixth program code which allows the computer to execute processing of generating one encrypted text $F_2(x,y,t) = E(s_2, r_2, f, X)$ by processing of adding or subtracting a multiplication result $f(x,y,t)s_2(x,y,t)$ of the discriminant polynomial $f(x,y,t)$ and the polynomial $s_2(x,y,t)$ and a multiplication result $X(x,y,t)r_2(x,y,t)$ of the fibration $X(x,y,t)$ and the polynomial $r_2(x,y,t)$ without using the plaintext polynomial $m(x,y,t)$.

25. A non-transitory computer-readable storage medium storing a program executed by a computer having a memory, wherein the program includes:

a first program code which allows the computer to execute processing of embedding a message m as a coefficient of a three-variable plaintext polynomial $m(x,y,t)$ when encrypting the message m if a fibration $X(x,y,t)$ of an algebraic surface X is a public key and one or more sections corresponding to the fibration $X(x,y,t)$ are private keys;

a second program code which allows the computer to execute processing of writing the plaintext polynomial $m(x,y,t)$ having the coefficient embedded therein into the memory;

a third program code which allows the computer to execute processing of generating a three-variable discriminant polynomial $f(x,y,t)$ in such a manner that a degree of a one-variable polynomial obtained when assigning the section becomes larger than a degree of a one-variable polynomial obtained when assigning the section to the plaintext polynomial;

a fourth program code which allows the computer to execute processing of randomly generating three or more pairs of polynomials $r_i(x,y,t)$ and $s_i(x,y,t)$ ($i=1, \ldots, k$); and a fifth program code which allows the computer to execute processing of generating at least one encrypted text $F_i(x,y,t) = E(m, s_i, r_i, f, X)$ ($i=1, \ldots, k$) by processing of adding or subtracting a multiplication result $f(x,y,t)s_i(x,y,t)$ of the discriminant polynomial $f(x,y,t)$ and the polynomial $s_i(x,y,t)$ and a multiplication result $X(x,y,t)r_i(x,y,t)$ of the fibration $X(x,y,t)$ and the polynomial $r_i(x,y,t)$ with respect to the plaintext polynomial $m(x,y,t)$ in the memory; and a sixth program code which allows the computer to execute processing of generating two or more encrypted texts $F_i(x,y,t) = E(s_i, r_i, f, X)$ ($i=1, \ldots, k$) by processing of adding or subtracting a multiplication result $f(x,y,t)s_i(x,y,t)$ of the discriminant polynomial $f(x,y,t)$ and the polynomial $s_i(x,y,t)$ and a multiplication result $X(x,y,t)r_i(x,y,t)$ of the fibration $X(x,y,t)$ and the polynomial $r_i(x,y,t)$ without using the plaintext polynomial $m(x,y,t)$.

26. A non-transitory computer-readable storage medium storing a program executed by a computer having a memory, wherein the program includes:

a first program code that allows the computer to execute processing of inputting three or more encrypted texts $F_i(x,y,t)=E(m,s_i,r_i,f,X)$ (i=1, ..., k) generated by processing of adding or subtracting a multiplication result $f(x,y,t)s_i(x,y,t)$ of a three-variable discriminant polynomial $f(x,y,t)$ and a polynomial $s_1(x,y,t)$ and a multiplication result $X(x,y,t)r_i(x,y,t)$ of a fibration $X(x,y,t)$ and a polynomial $r_i(x,y,t)$ with respect to a three-variable polynomial $m(x,y,t)$ having a message m embedded therein as a coefficient when the fibration $X(x,y,t)$ of an algebraic surface X is a public key and one or more sections associated with the fibration $X(x,y,t)$ are private keys;

a second program code that allows the computer to execute processing of writing the input encrypted texts $F_i(x,y,t)$ (i=1, ..., k) in the memory;

a third program code which allows the computer to execute processing of generating three or more one-variable polynomials $h_i(t)$ (i=1, ..., k) by assigning the sections to the respective encrypted texts $F_i(x,y,t)$ (i=1, ..., k) in the memory;

a fourth program code which allows the computer to execute processing of subtracting two pairs of different polynomials in respective one-variable polynomials $h_i(t)$ (i=1, ..., k) to obtain a plurality of polynomials $g_j(t)$ (j=1, ..., L) as a subtraction result;

a fifth program code which allows the computer to execute processing of obtaining the greatest common divisor $\phi(t)$ of two or more polynomials in each polynomial $g_j(t)$ (j=1, ..., L);

a sixth program code which allows the computer to execute processing of factorizing the greatest common divisor $\phi(t)$;

a seventh program code which allows the computer to execute processing of extracting all discriminant polynomial candidates $f(u_x(t),u_y(t),t)$ precisely having deg $f(u_x(t),u_y(t),t)$ as a degree by combining factors generated as a result of the factorization;

an eighth program code which allows the computer to execute processing of obtaining a plaintext polynomial candidate $m(u_x(t),u_y(t),t)$ as a residue by dividing at least one one-variable polynomial $h_i(t)$ in the one-variable polynomials $h_i(t)$ (i=1, ..., k) by the discriminant polynomial candidate $f(u_x(t),u_y(t),t)$;

a ninth program code which allows the computer to execute processing of deriving a simultaneous linear equation having a coefficient of the plaintext polynomial $m(x,y,t)$ as a variable based on the plaintext polynomial candidate $m(u_x(t),u_y(t),t)$ and a previously disclosed frame of the plaintext polynomial $m(x,y,t)$, and generating a plaintext candidate M by solving the simultaneous linear equation;

a tenth program code that allows the computer to execute processing of inspecting whether the plaintext candidate M is a true plaintext by using an error detecting code included in the plaintext candidate M; and an eleventh program code that allows the computer to execute processing of outputting the plaintext candidate M as a plaintext when the plaintext candidate M as the true plaintext is present as a result of the inspection.

27. A non-transitory computer-readable storage medium storing a program executed by a computer having a memory, wherein the program includes:

a first program code that allows the computer to execute processing of inputting one encrypted text $F_1(x,y,t)=E(m,s_1,r_1,f,X)$ generated by processing of adding or subtracting a multiplication result $f(x,y,t)s_1(x,y,t)$ of a three-variable discriminant polynomial $f(x,y,t)$ and a polynomial $s_1(x,y,t)$ and a multiplication result $X(x,y,t)r_1(x,y,t)$ of a fibration $X(x,y,t)$ and a polynomial $r_1(x,y,t)$ with respect to a three-variable polynomial $m(x,y,t)$ having a message m embedded therein as a coefficient when the fibration $X(x,y,t)$ of an algebraic surface X is a public key and one or more sections associated with the fibration $X(x,y,t)$ are private keys;

a second program code that allows the computer to execute processing of inputting one encrypted text $F_2(x,y,t)=E(s_2,r_2,f,X)$ generated by processing of adding or subtracting a multiplication result $f(x,y,t)s_2(x,y,t)$ of the discriminant polynomial $f(x,y,t)$ and the polynomial $s_2(x,y,t)$ and a multiplication result $X(x,y,t)r_2(x,y,t)$ of the fibration $X(x,y,t)$ and the polynomial $r_2(x,y,t)$ without using the plaintext polynomial $m(x,y,t)$;

a third program code that allows the computer to execute processing of writing the input encrypted texts $F_1(x,y,t)$ and $F_2(x,y,t)$ in the memory;

a fourth program code which allows the computer to execute processing of generating two one-variable polynomials $h_1(t)$ and $h_2(t)$ by assigning the section to the respective encrypted texts $F_1(x,y,t)$ and $F_2(x,y,t)$;

a fifth program code which allows the computer to execute processing of factorizing a one-variable polynomial $h_2(t)$ generated from the encrypted text $F_2(x,y,t)$ in the respective one-variable polynomials $h_1(t)$ and $h_2(t)$;

a sixth program code which allows the computer to execute processing of extracting all discriminant polynomial candidates $f(u_x(t),u_y(t),t)$ precisely having deg $f(u_x(t),u_y(t),t)$ as a degree by combining factors generated as a result of the factorization;

a seventh program code which allows the computer to execute processing of obtaining a plaintext polynomial candidate $m(u_x(t),u_y(t),t)$ as a residue by dividing the one-variable polynomial $h_1(t)$ generated from the encrypted text $F_1(x,y,t)$ in the one-variable polynomials $h_1(t)$ and $h_2(t)$ by the discriminant polynomial candidate $f(u_x(t),u_y(t),t)$;

an eighth program code which allows the computer to execute processing of deriving a simultaneous linear equation having a coefficient of the plaintext polynomial $m(x,y,t)$ as a variable based on the plaintext polynomial candidate $m(u_x(t),u_y(t),t)$ and a previously disclosed frame of the plaintext polynomial $m(x,y,t)$, and generate a plaintext candidate M by solving the simultaneous linear equation;

a ninth program code which allows the computer to execute processing of inspecting whether the plaintext candidate M is a true plaintext by using an error detecting code included in the plaintext candidate M; and a tenth program code which allows the computer to execute processing of outputting the plaintext candidate M as a plaintext when the plaintext candidate M as the true plaintext is present as a result of the inspection.

28. A non-transitory computer-readable storage medium storing a program executed by a computer having a memory, wherein the program includes:

a first program code that allows the computer to execute processing of inputting three or more encrypted texts $F_i(x,y,t)=E(m,s_i,r_i,f,X)$ (i=1, ..., k) generated by processing of adding or subtracting a multiplication result $f(x,y,t)s_i(x,y,t)$ of a three-variable discriminant polynomial $f(x,y,t)$ and a polynomial $s_i(x,y,t)$ and a multiplication result $X(x,y,t)r_i(x,y,t)$ of a fibration $X(x,y,t)$ and a polynomial $r_i(x,y,t)$ with respect to a three-variable plaintext polynomial $m(x,y,t)$ having a message m embedded therein as a coefficient when the fibration $X(x,y,t)$ of an algebraic surface is a public key and n sections $D_l$ (l=1, ..., n) associated with the fibration $X(x,y,t)$ are private keys;

a second program code that allows the computer to execute processing of writing the input encrypted texts $F_i(x,y,t)$ (i=1, ..., k) in the memory;

a third program code that allows the computer to execute processing of generating k one-variable polynomials $\{h_{11}(t),h_{21}(t),...,h_{k1}(t)\}, ..., \{h_{1n}(t),h_{2n}(t),...,h_{kn}(t)\}$ by assigning the respective sections $D_l$ (l=1,...,n) to the respective encrypted texts $F_i(x,y,t)$ (i=1, ..., k) in the memory;

a fourth program code that allows the computer to execute processing of obtaining the greatest common divisor $\phi l(t)$ of two or more polynomials in subtraction results $\{h_{1l}(t)-h_{2l}(t)\}, ..., \{h_{k-1,l}(t)-h_{kl}(t)\}$ acquired by subtracting each one-variable polynomial having the same section assigned thereto from each of the one-variable polynomials $\{h_{11}(t),h_{21}(t),...,h_{k1}(t)\}, ..., \{h_{1n}(t),h_{2n}(t),...,h_{kn}(t)\}$;

a fifth program code that allows the computer to execute processing of factorizing the greatest common divisor $\phi l(t)$;

a sixth program code that allows the computer to execute processing of extracting all discriminant polynomial candidates $f(u_{xl}(t),u_{yl}(t),t)$ precisely having deg $f(u_{xl}(t),u_{yl}(t),t)$ as a degree by combining factors generated as a results of the factorization;

a seventh program code that allows the computer to execute processing of obtaining n plaintext polynomial candidates $m(u_{xl}(t),u_{yl}(t),t)$ as residues by dividing the one-variable polynomials $h_{11}(t), ..., h_{1n}(t)$ by the discriminant polynomial candidates $f(u_{xl}(t),u_{yl}(t),t)$, respectively;

an eighth program code that allows the computer to execute processing of deriving a simultaneous linear equation having a coefficient of the plaintext polynomial $m(x,y,t)$ as a variable based on each plaintext polynomial candidate $m(u_{xl}(t),u_{yl}(t),t)$ and a previously disclosed frame of the plaintext polynomial $m(x,y,t)$, and generate each plaintext candidate Ml by solving the simultaneous linear equation;

a ninth program code that allows the computer to execute processing of judging whether there is a plaintext candidate M common to the n plaintext candidates Ml obtained from the n plaintext polynomial candidates $m(u_{xl}(t),u_{yl}(t),t)$ acquired by dividing the respective one-variable candidates $h_{11}(t), ..., h_{1n}(t)$; and a tenth program code that allows the computer to execute processing of outputting the common plaintext M as a plaintext when there is the common plaintext candidate M as a result of the judgment.

29. A non-transitory computer-readable storage medium storing a program executed by a computer having a memory, wherein the program includes:

a first program code that allows the computer to execute processing of inputting one encrypted text $F_1(x,y,t)=E(m,s_1,r_1,f,X)$ generated by processing of adding or subtracting a multiplication result $f(x,y,t)s_1(x,y,t)$ of a three-variable discriminant polynomial $f(x,y,t)$ and a polynomial $s_1(x,y,t)$ and a multiplication result $X(x,y,t)r_1(x,y,t)$ of a fibration $X(x,y,t)$ and a polynomial $r_1(x,y,t)$ with respect to a three-variable polynomial $m(x,y,t)$ having a message m embedded therein as a coefficient when the fibration $X(x,y,t)$ of an algebraic surface X is a public key and n sections $D_l$ (l=1, ..., n) associated with the fibration $X(x,y,t)$ are private keys;

a second program code that allows the computer to execute processing of inputting one encrypted text $F_2(x,y,t)=E(s_2,r_2,f,X)$ generated by processing of adding or subtracting a multiplication result $f(x,y,t)s_2(x,y,t)$ of the discriminant polynomial $f(x,y,t)$ and the polynomial $s_2(x,y,t)$ and a multiplication result $X(x,y,t)r_2(x,y,t)$ of the fibration $X(x,y,t)$ and the polynomial $r_2(x,y,t)$ without using the plaintext polynomial $m(x,y,t)$;

a third program code that allows the computer to execute processing of writing the input encrypted texts $F_1(x,y,t)$ and $F_2(x,y,t)$ in the memory;

a fourth program code that allows the computer to execute processing of generating two one-variable polynomials $\{h_{11}(t),h_{21}(t)\}, ..., \{h_{1n}(t),h_{2n}(t)\}$ by assigning the respective sections $D_l$ (l=1, ..., n) to the respective encrypted texts $F_1(x,y,t)$ and $F_2(x,y,t)$ in the memory;

a fifth program code that allows the computer to execute processing of factorizing a one-variable polynomial $h_{21}(t), ..., h_{2n}(t)$ generated from the encrypted text $F_2(x,y,t)$ in the respective one-variable polynomials $\{h_{11}(t), h_{21}(t)\}, ..., \{h_{1n}(t),h_{2n}(t)\}$;

a sixth program code that allows the computer to execute processing of extracting all discriminant polynomial candidates $f(u_{xl}(t),u_{yl}(t),t)$ precisely having deg $f(u_{xl}(t), u_{yl}(t),t)$ as a degree by combining factors generated as a results of the factorization;

a seventh program code that allows the computer to execute processing of obtaining a plaintext polynomial candidate $m(u_{xl}(t),u_{yl}(t),t)$ as a residue by dividing the one-variable polynomial $h_{11}(t), ..., h_{1n}(t)$ generated from the encrypted text $F_1(x,y,t)$ in the one-variable polynomials $\{h_{11}(t),h_{21}(t)\}, ..., \{h_{1n}(t),h_{2n}(t)\}$ by the discriminant polynomial candidate $f(u_{xl}(t),u_{yl}(t),t)$;

an eighth program code that allows the computer to execute processing of deriving a simultaneous linear equation having a coefficient of the plaintext polynomial $m(x,y,t)$ as a variable based on each plaintext polynomial candidate $m(u_{xl}(t),u_{yl}(t),t)$ and a previously disclosed frame of the plaintext polynomial $m(x,y,t)$, and generate each plaintext candidate Ml by solving the simultaneous linear equation;

a ninth program code that allows the computer to execute processing of judging whether there is a plaintext candidate M common to the n plaintext candidates Ml obtained from the n plaintext polynomial candidates $m(u_{xl}(t),u_{yl}(t),t)$ acquired by dividing the respective one-variable candidates $h_{11}(t), ..., h_{1n}(t)$; and a tenth program code that allows the computer to execute processing of outputting the common plaintext M as a plaintext when there is the common plaintext candidate M as a result of the judgment.

30. A non-transitory computer-readable storage medium storing a program executed by a computer having a memory, wherein the program includes:

a first program code that allows the computer to execute processing of inputting a degree $\deg_t X'$ of a term other than a constant term of a fibration $X(x,y,t)$ and a coefficient set $\Lambda_X$ of two variables x and y in the fibration $X(x,y,t)$ when the fibration $X(x,y,t)$ of an algebraic surface X is a public key and one or more sections associated with the fibration $X(x,y,t)$ are private keys;

a second program code to cause the computer to execute a process of writing a prime number p and a maximum degree d of the sections in the memory;

a third program code that allows the computer to execute processing of generating one-variable polynomials $u_x(t)$ and $u_y(t)$ having a degree d in the prime field $F_p$ based on the prime number p and the maximum degree in the memory and generating the section $(u_x(t), u_y(t), t)$ from the one-variable polynomials $u_x(t)$ and $u_y(t)$;

a fourth program code that allows the computer to execute processing of generating the term other than the constant term by randomly generating a coefficient of the term other than the constant term when the fibration $X(x,y,t)$ of the algebraic surface is regarded as a polynomial of the variables x and y based on the generated section and the input degree $\deg_t X'$ and coefficient set $\Lambda_{X'}$;

a fifth program code that allows the computer to execute processing of calculating the constant term by adding a negative sign to an assignment result obtained by assigning the section to the term other than the constant term;

a sixth program code that allows the computer to execute processing of determining a larger one of the degree $\deg_t X'$ of the term other than constant term and a degree $\deg_t a_{00}$ of the constant term as a degree $\deg_t X$ of the fibration and generate the fibration $X(x,y,t)$ including the term other than the constant term and the constant term;

a seventh program code that allows the computer to execute processing of randomly generating a degree $\deg_t f$ of a discriminant polynomial and the coefficient set $\Lambda_f$ of the two variables x and y under conditions that "$\deg_t X < \deg_t m < \deg_t f$" and "$(\deg_x f, \deg_y f) \in \Lambda_f$" based on the degree $\deg_t X$ of the fibration and the coefficient set $\Lambda_X$ (where $\deg_t m$ is a degree of a variable t in a plaintext polynomial, $\deg_t f$ is a degree of a variable t in the discriminant polynomial, $\deg_x f$ is a degree of a variable x in the discriminant polynomial, and $\deg_y f$ is a degree of a variable y in the discriminant polynomial);

an eighth program code that allows the computer to execute processing of calculating a product $\Lambda_f \Lambda_X$ of the coefficient sets $\Lambda_f$ and $\Lambda_X$ and determine a coefficient set $\Lambda_m$ of two variables x and y in a plaintext polynomial in a partial set of a result of the calculation under a condition that "$(\deg_x m, \deg_y m, \deg_t m) \in \Gamma_m$" (where $\Gamma_m$ is a set of non-zero monomials (an exponent x, an exponent y, and an exponent t) included in a plaintext polynomial $m(x,y,t)$);

a ninth program code that allows the computer to execute processing of determining a $\deg_t m$ of the plaintext polynomial under a condition "$\deg_t X < \deg_t m < \deg_t f$";

a tenth program code that allows the computer to execute processing of determining a frame $FR_f$ of the discriminant polynomial including the coefficient set $\Lambda_f$ and the degree $f_{ij}(t)$ by determining a degree $f_{ij}(t)$ of a coefficient of the discriminant polynomial as $\deg f_{ij}(t) = \deg_t f$ in case of an element $(i,j) = (\deg_x f, \deg_y f)$ based on each element $(i,j)$ included in the coefficient set $\Lambda_f$ and randomly determining the degree $f_{ij}(t)$ in the range of $0 \leq \deg f_{ij}(t) \leq \deg_t f$ in case of the element $(i,j) \neq (\deg_x f, \deg_y f)$;

an eleventh program code that allows the computer to execute processing of extracting the coefficient set $\Lambda_X$ and a degree $\deg a_{ij}(t)$ of a coefficient associated with the element $(i,j)$ in $\Lambda_X$ from the algebraic surface and generate a frame $FR_X$ of the algebraic surface from the coefficient set $\Lambda_X$ and the degree $\deg a_{ij}(t)$ of the coefficient;

a twelfth program code that allows the computer to execute processing of integrating the respective frames $FR_f$ and $FR_X$ to generate a frame $FR_g(=FR_f FR_X)$;

a thirteenth program code that allows the computer to execute processing of determining a degree $\deg m_{ij}(t)$ of a coefficient associated with the element $(i,j)$ included in the coefficient set $\Lambda_m$ of the plaintext polynomial as $\deg m_{ij}(t) = \min\{\deg_t m, \deg g_{ij}(t)\}$;

a fourteenth program code that allows the computer to execute processing of assigning the section to a frame of the plaintext polynomial having a coefficient $m_{ijk}$ as a variable which is a frame including the coefficient set $\Lambda_m$ and the degree $\deg m_{ij}(t)$;

a fifteenth program code that allows the computer to execute processing of generating a variable vector $(m_{000}, m_{001}, \ldots, m_{ijk}, \ldots)$ by ordering the variables $m_{ijk}$ obtained as a result of the assignment;

a sixteenth program code that allows the computer to execute processing of organizing a one-variable polynomial $m(u_x(t), u_y(t), t)$ obtained as a result of the assignment in regard to t and extract a polynomial that becomes a coefficient $m_{ijk} u_x(t)^i u_y(t)^j$ of t;

a seventeenth program code that allows the computer to execute processing of generating a coefficient matrix in such a manner that a product of the variable matrix $(m_{000}, m_{001}, \ldots, m_{ijk}, \ldots)$ precisely becomes the coefficient $m_{ijk} u_x(t)^i u_y(t)^j$ of t;

an eighteenth program code that allows the computer to execute processing of calculating a rank of the coefficient matrix;

a nineteenth program code that allows the computer to execute processing of setting some variables $m_{ijk}$ in the one-variable polynomial $m(u_x(t), u_y(t), t)$ as constants when the rank does not coincide with a dimension number of the variable vector; and a twentieth program code that allows the computer to execute processing of outputting as a frame $FR_m$ of the plaintext polynomial a frame of the three-variable polynomial $m(x,y,t)$ associated with the one-variable polynomial $m(u_x(t), u_y(t), t)$ when the rank coincides with the dimension number of the variable vector.

* * * * *